United States Patent [19]
Peddle et al.

[11] Patent Number: 5,016,121
[45] Date of Patent: May 14, 1991

[54] DISK DRIVE CONTROLLER SYSTEM

[75] Inventors: Charles I. Peddle, Scotts Valley; Robert G. Taylor, Jr., Santa Cruz; John R. Masters, Aptos; Glenn M. Stark, Santa Cruz; Kenneth M. Stein, San Jose; James M. Donohue, Los Alamitos; Michael T. Dugan, Thousand Oaks; William G. Swinton, Santa Cruz; Bruce A. Fairman, Woodside; Warren L. Dalziel, Monte Sereno, all of Calif.

[73] Assignee: Tandon Corporation, Moorpark, Calif.

[21] Appl. No.: 162,948

[22] Filed: Feb. 25, 1988

[51] Int. Cl.$^5$ ............................................. G11B 5/09
[52] U.S. Cl. ...................................................... 360/39
[58] Field of Search ......................... 360/39, 40, 60, 78

[56] References Cited

U.S. PATENT DOCUMENTS

| | | | |
|---|---|---|---|
| 4,399,503 | 8/1983 | Hawley | 364/200 |
| 4,424,539 | 1/1984 | Kiedl et al. | 360/69 |
| 4,490,782 | 12/1984 | Dixon et al. | 364/200 |
| 4,593,354 | 6/1986 | Ushiro | 364/200 |
| 4,819,203 | 4/1989 | Shiroyanagi et al. | 364/900 |
| 4,825,357 | 4/1989 | Ovies et al. | 364/200 |

Primary Examiner—Vincent P. Canney
Attorney, Agent, or Firm—Spensley Horn Jubas & Lubitz

[57] ABSTRACT

A disk drive system includes a disk controller system having separate head positioning and data transfer subsystems and supporting up to four disk drives, two of which may be removable, portable drive units and two of which may connect through a standard ST506 interface. The removable disk drives incorporate a read and write protected data cylinder for storing information such as the maintenance history of the drive, and a read only cylinder for storing a unique serial number as well as other write protected data. The system also features a high capacity, high speed sector buffer which allows continuous transfers of data to or from noninterleaved sectors and supports concurrent disk and system accesses.

9 Claims, 57 Drawing Sheets

COMPUTER SYSTEM ~10~

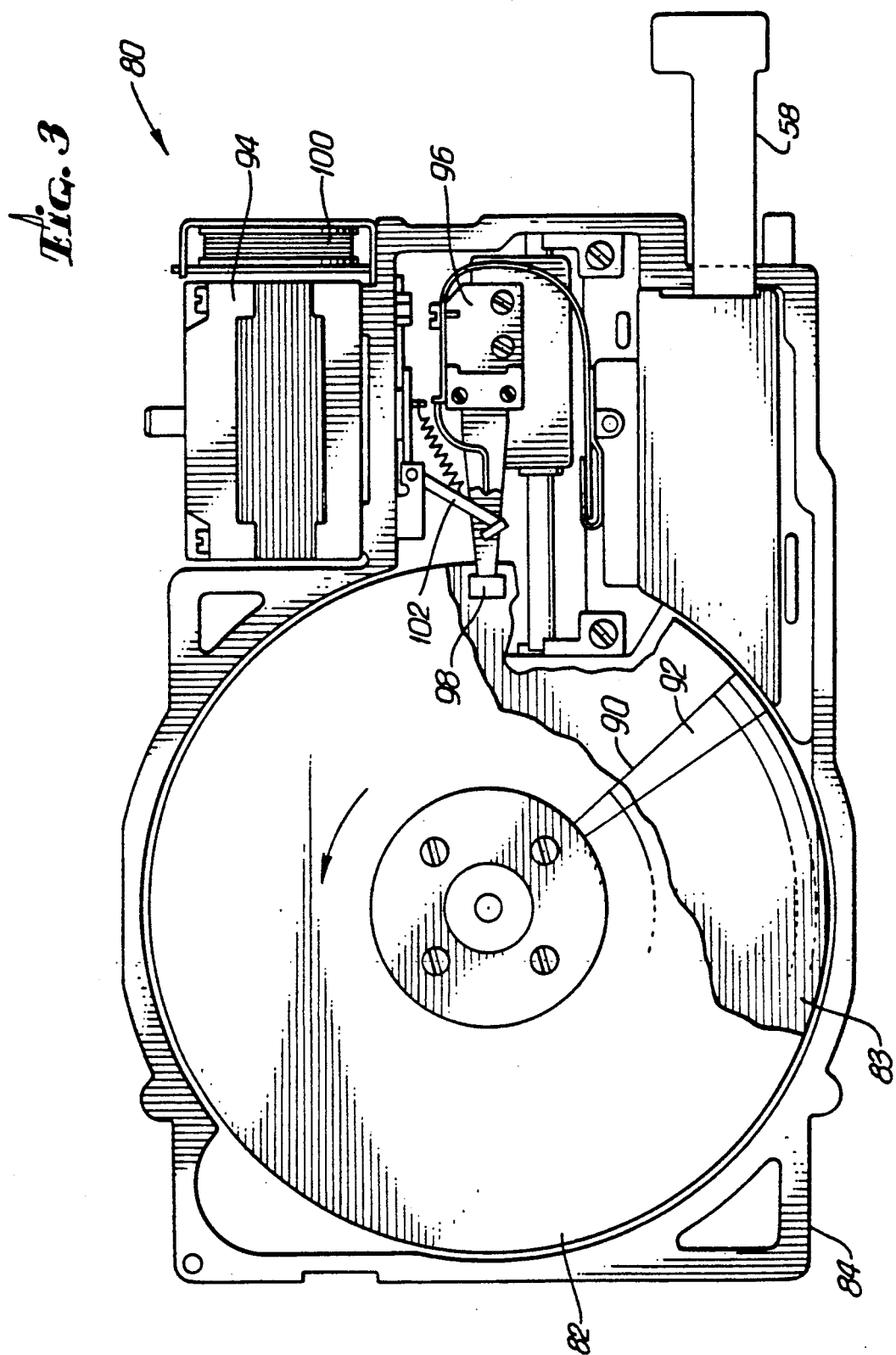

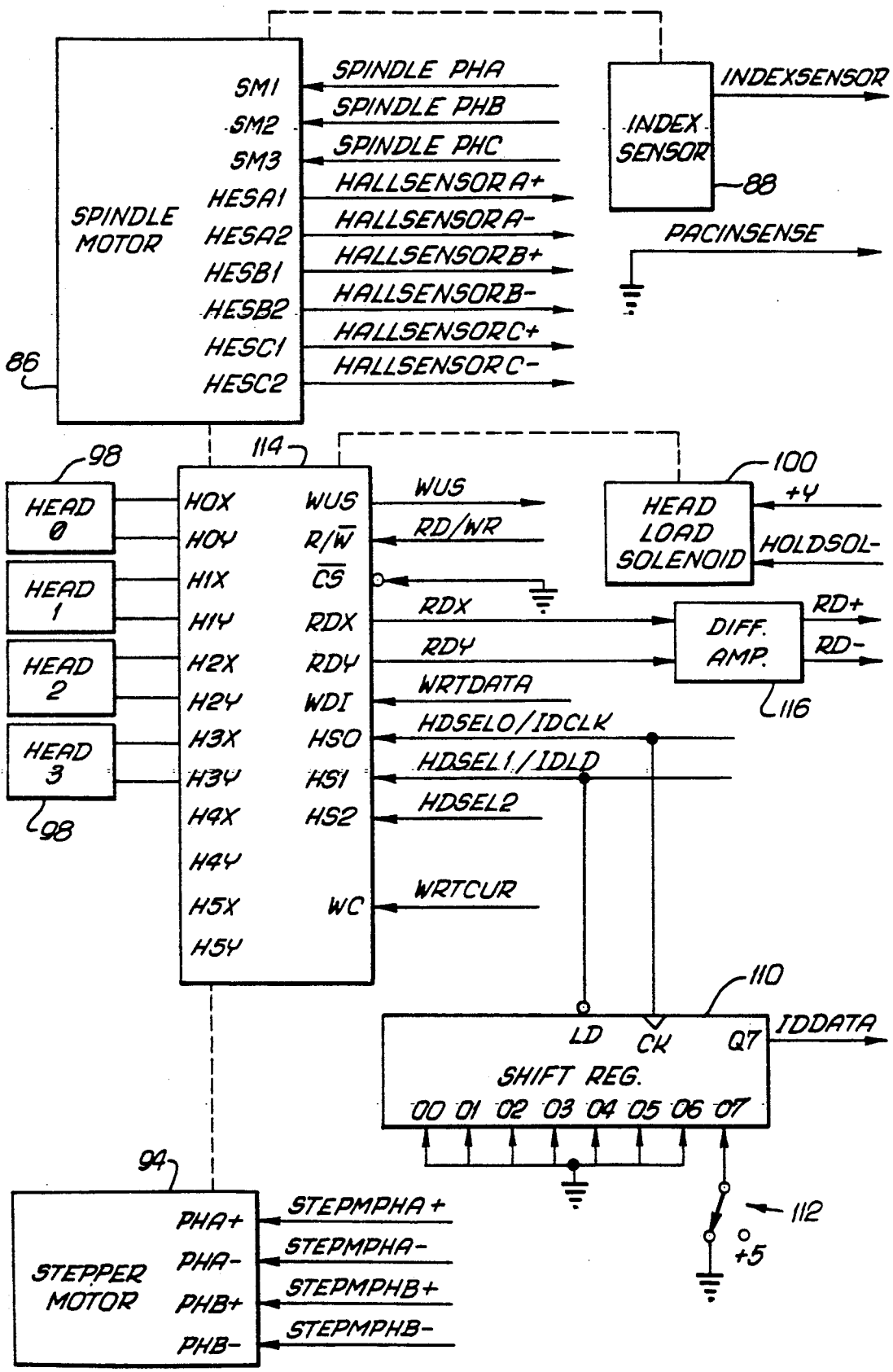

Fig. 5

| DRIVE 0 | RECEPTACLE 0 | ANALOG BD. |
|---|---|---|
| SPINDLE PHA | SM1 | DOSM1 |
| SPINDLE PHB | SM2 | DOSM2 |
| SPINDLE PHC | SM3 | DOSM3 |
| ID DATA | ID/DATA | IDDATA0 |
| HALL SENSOR A+ | HESA1 | DOHESA1 |
| HALLSENSOR A- | HESA2 | DOHESA2 |
| HALLSENSOR B+ | HESB1 | DOHESB1 |
| HALLSENSOR B- | HESB2 | DOHESB2 |
| HALLSENSOR C+ | HESC1 | DOHESC1 |
| HALLSENSOR C- | HESC2 | DOHESC2 |
| PACINSENSE | XIN | XIN0 |
| STEPMPHA+ | AM1 | DOAM1 |
| STEPMPHA- | AM2 | DOAM2 |
| STEPMPHB+ | BM1 | DOBM1 |
| STEPMPHB- | BM2 | DOBM2 |
| RD/WR | RW117 | BXDORW |
| WRTCUR | WRTCUR | DOWRTCUR |
| WUS | WUS | DOWUS |
| WRTDATA | WRTDATA | WRTDATA |
| HDSEL0/IDCLK | HDS0 | BXDOHD0 |
| HDSEL1/IDLD | HDS1 | BXDOHD1 |
| HDSEL2 | HDS2 | BXDOHD2 |
| INDEXSENSOR | INDEX | DOIDX |
| RD+ | RDI+ | DORDI+ |
| RD- | RDI- | DORDI- |
| HDLDSOL- | HLOAD- | DOHLOAD- |
|  | MODMTR+ | MODMTR0+ |
|  | MODMTR- | MODMTR0- |
|  | MODLD | HOMESENSE0 |
|  | MODINS | MODLD0+ |
|  | ACT+ | VCC |
|  | RDY+ | DODRDY0 |
|  |  | MODACT0 |

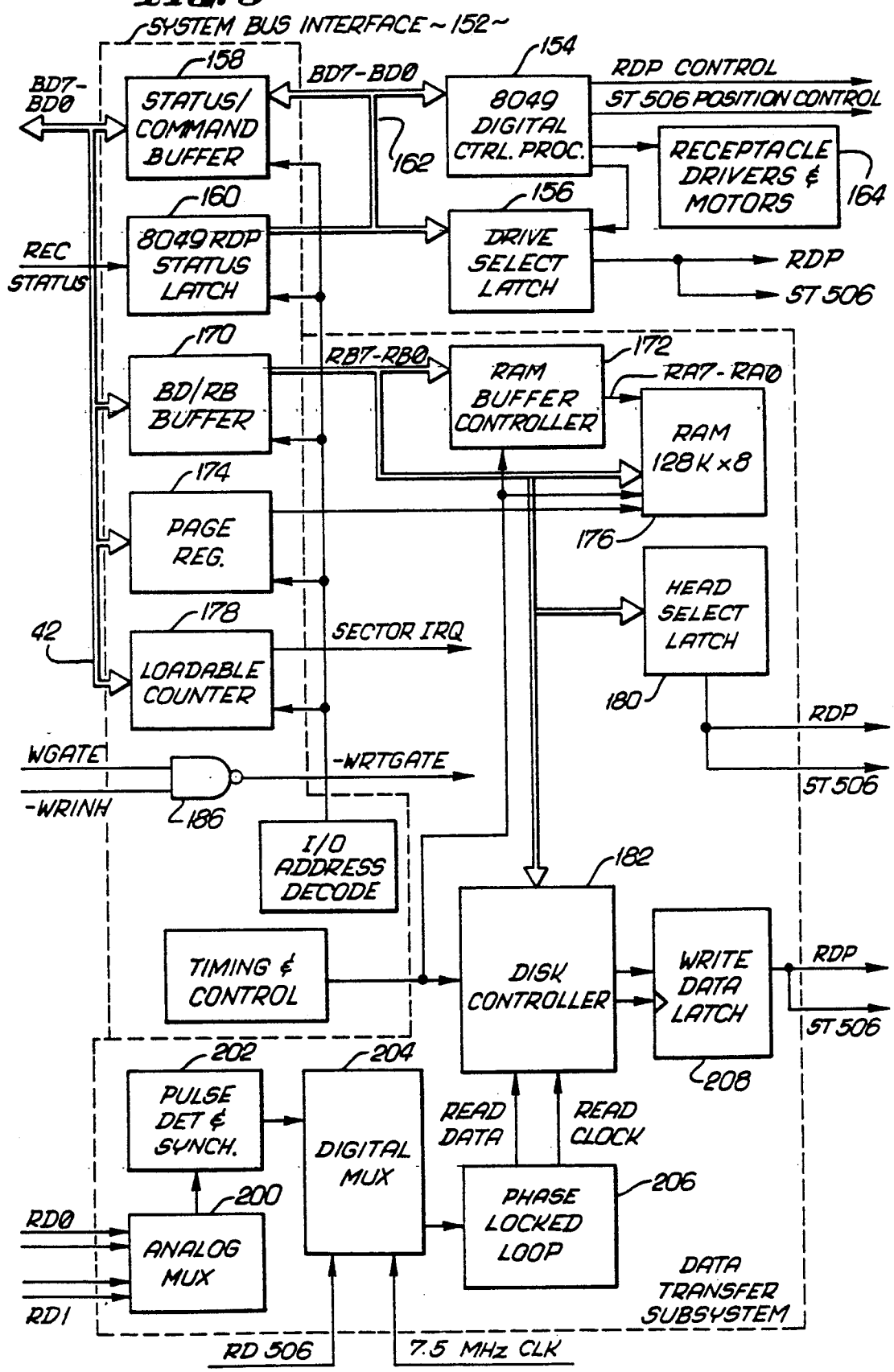

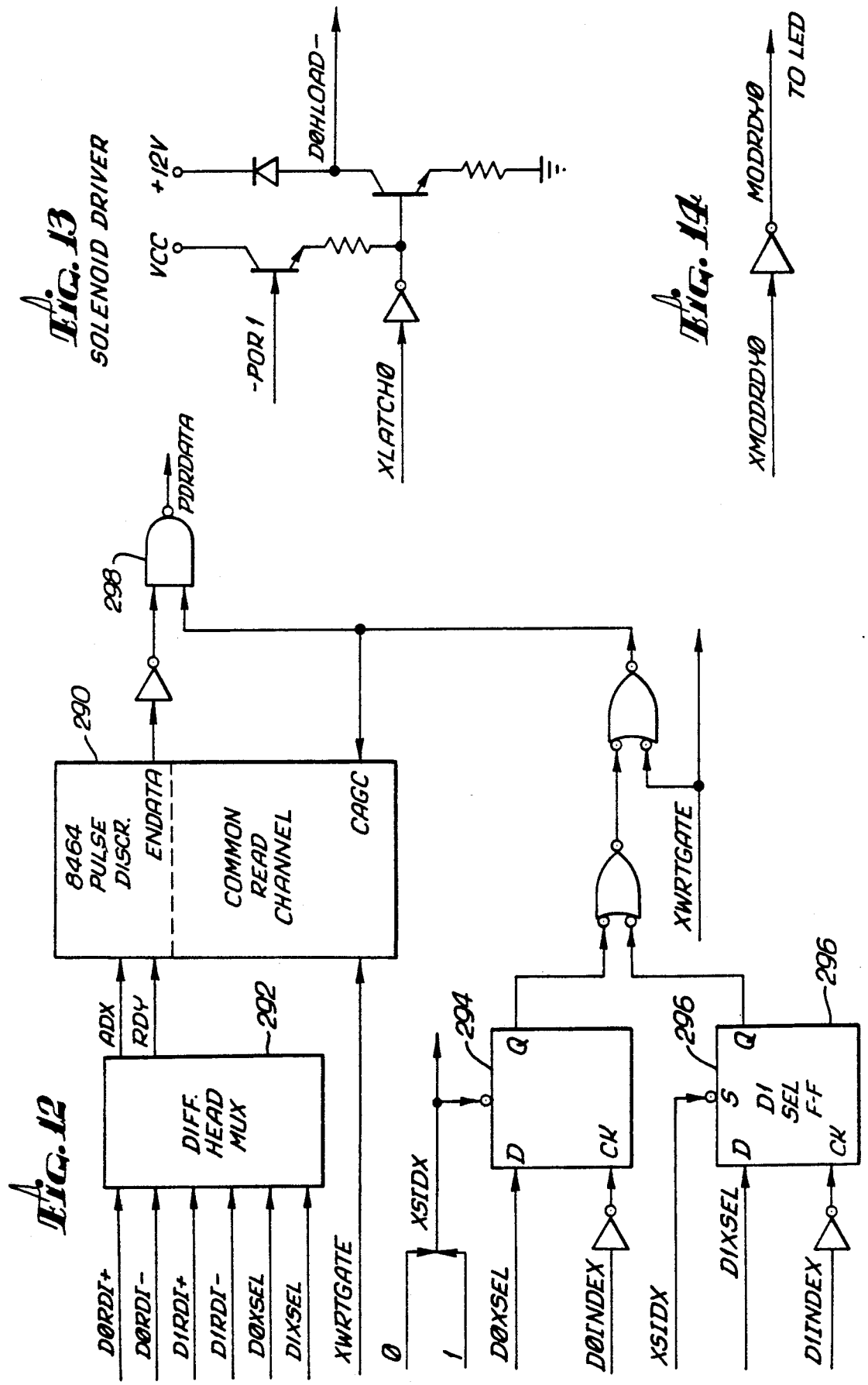

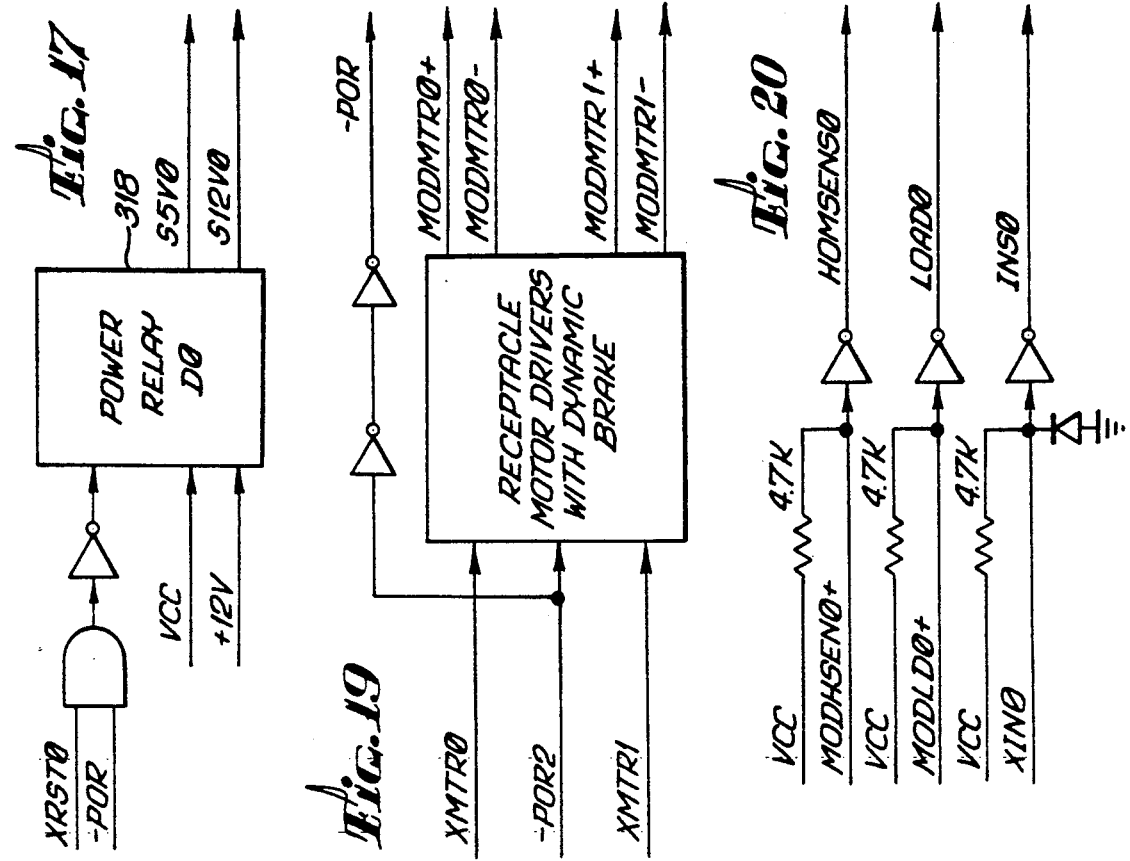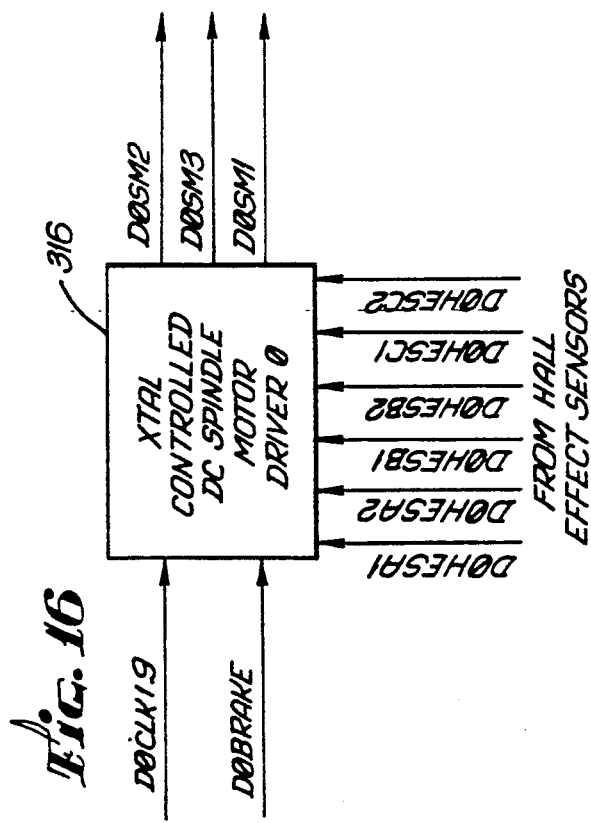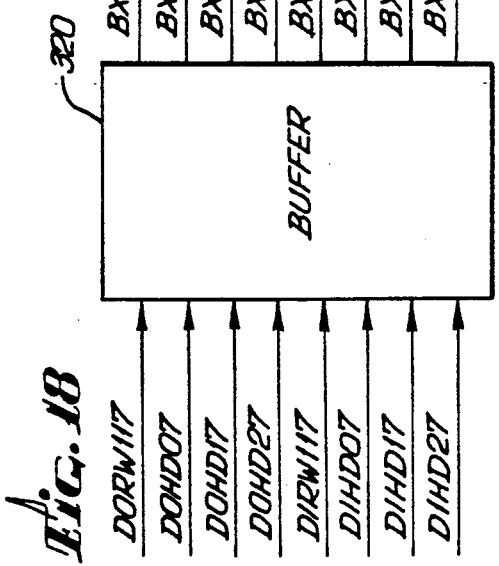

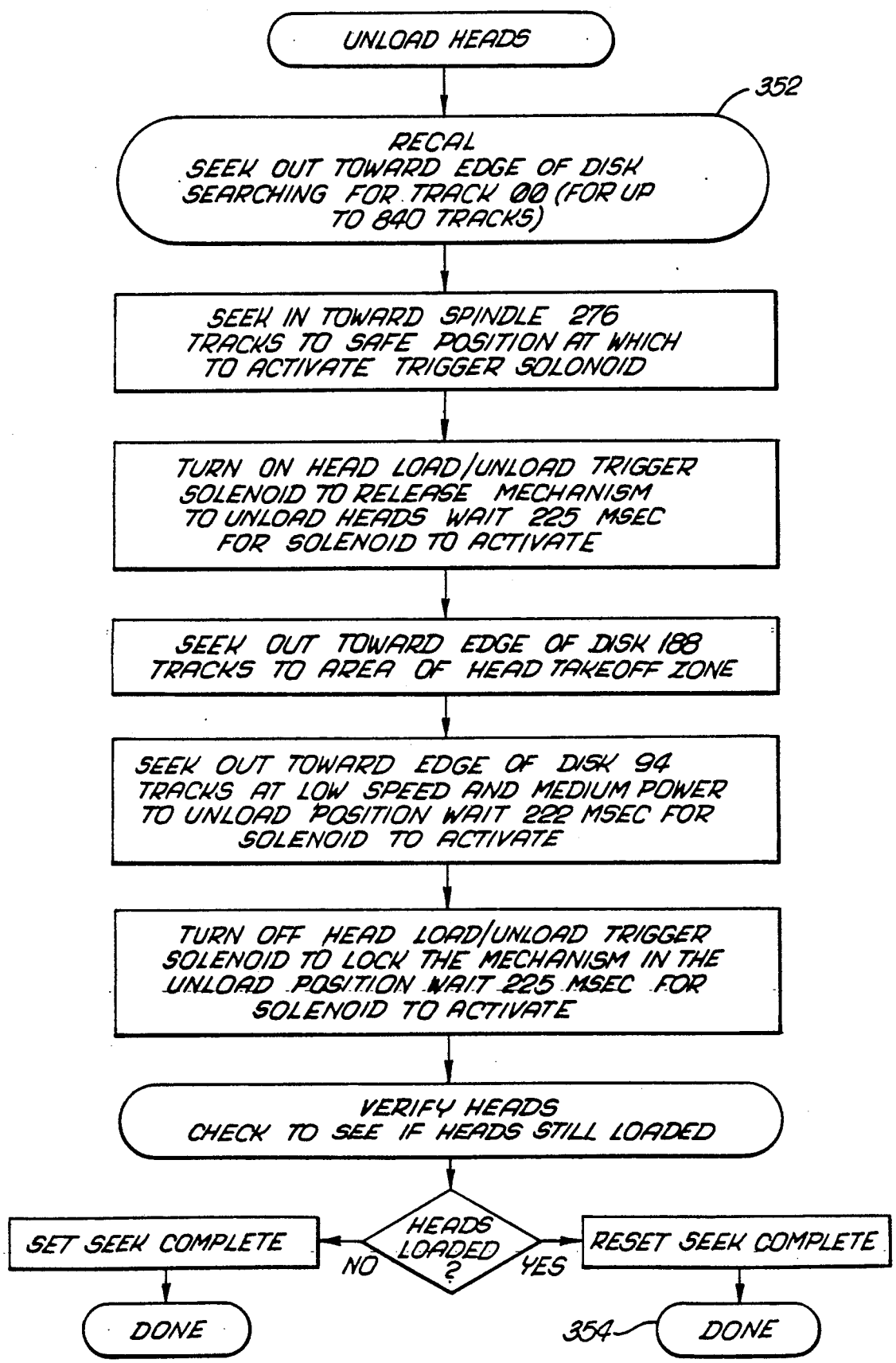
Fig. 21 HEAD UNLOAD ALGORITHM

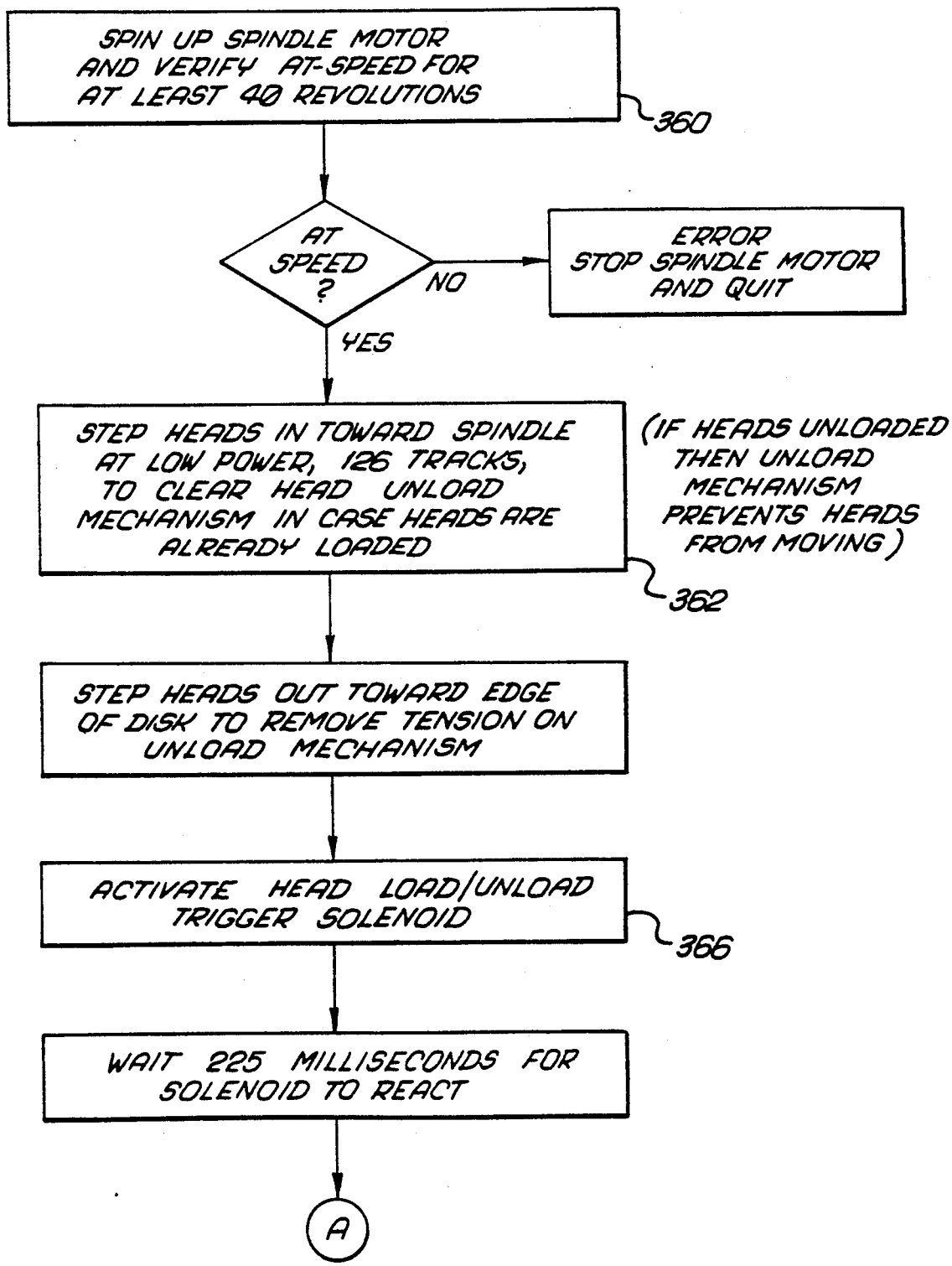

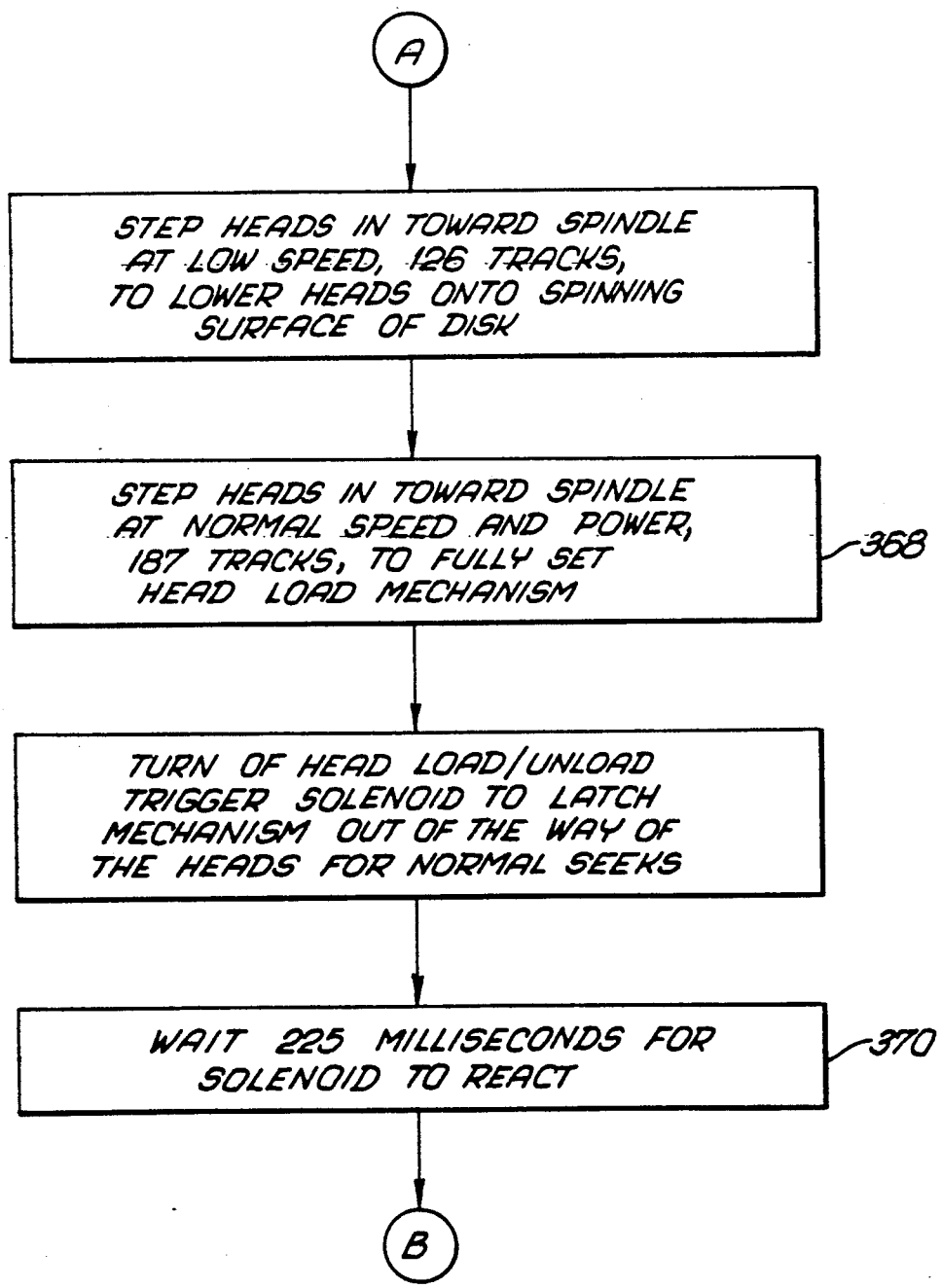

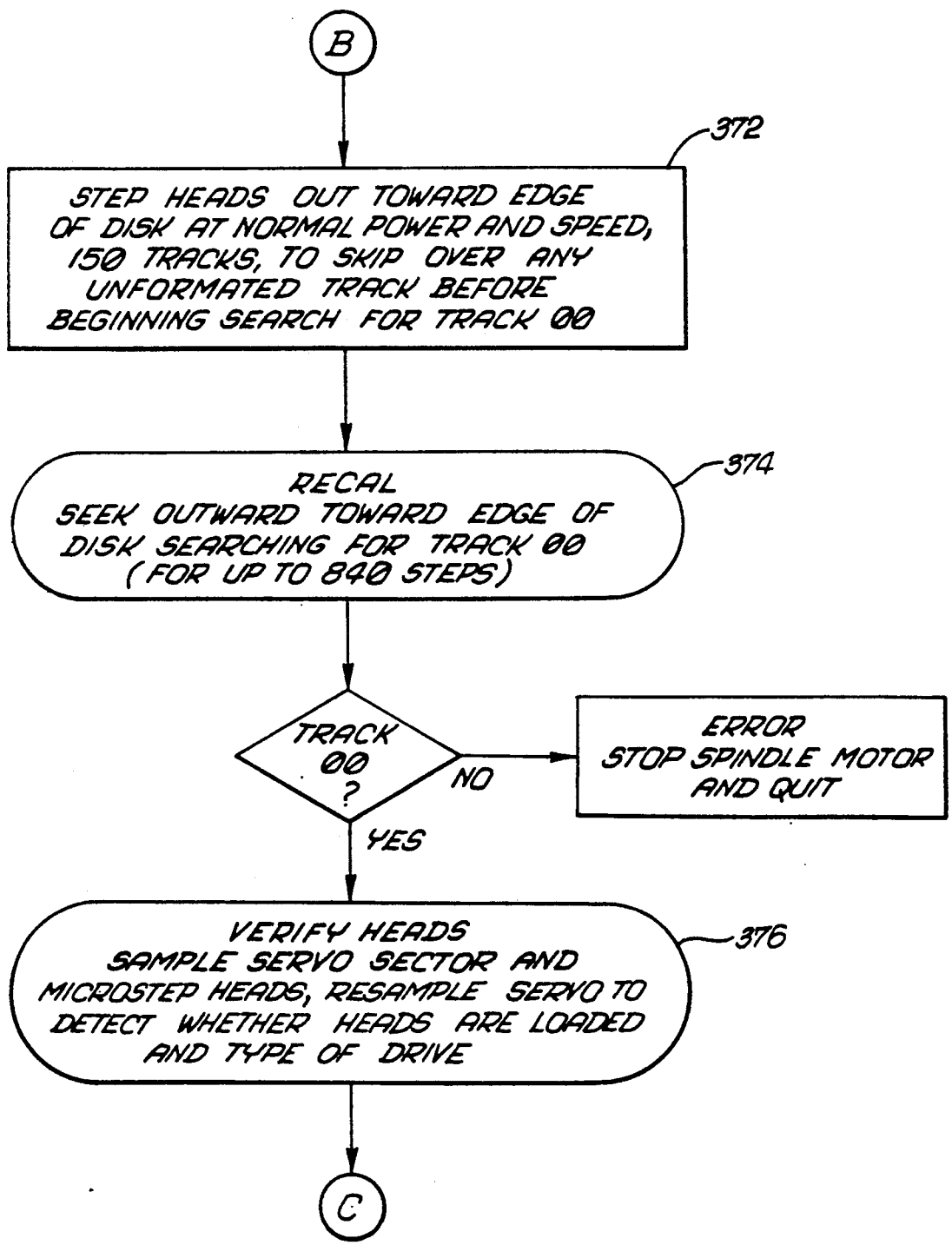

HEAD LOAD ALGORITHM

Fig. 29 HEAD LOAD ALGORITHM

Fig. 30 HEAD LOAD ALGORITHM

RECEPTACLE LOADING CYCLE STATES
MARK IV DIGITAL 8049

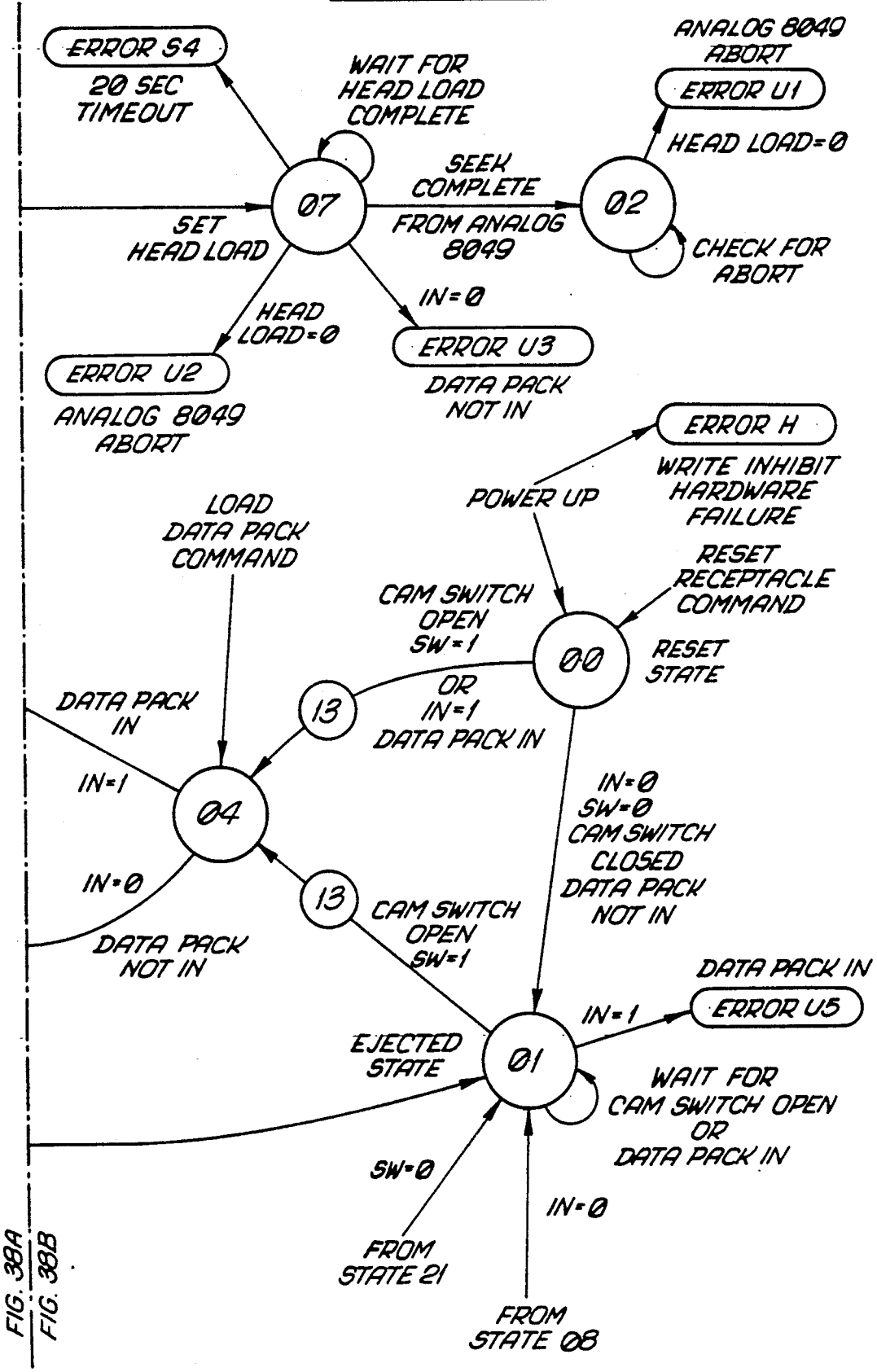
Fig. 38B MARK IV DIGITAL 8049 RECEPTACLE LOADING CYCLE STATES

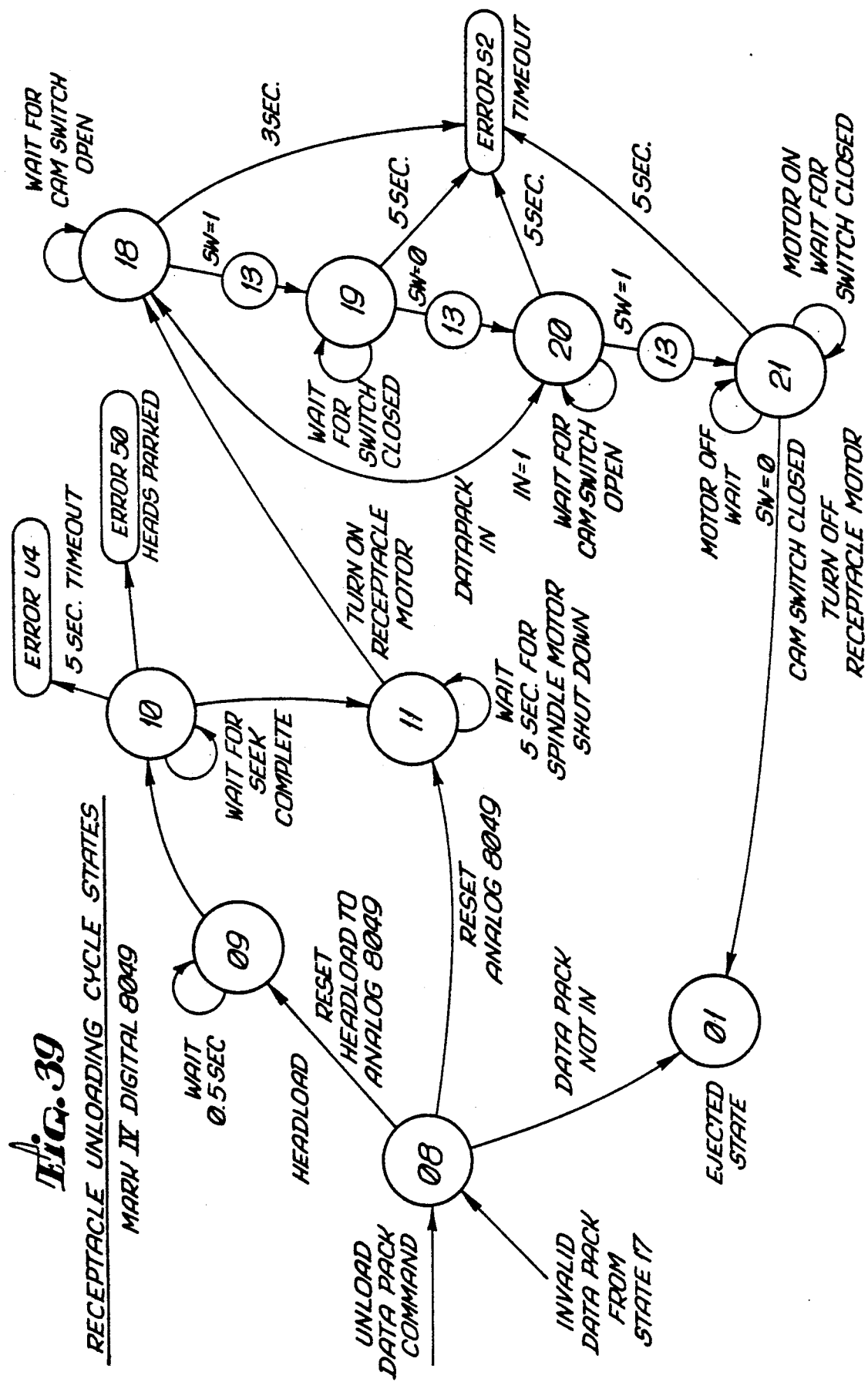

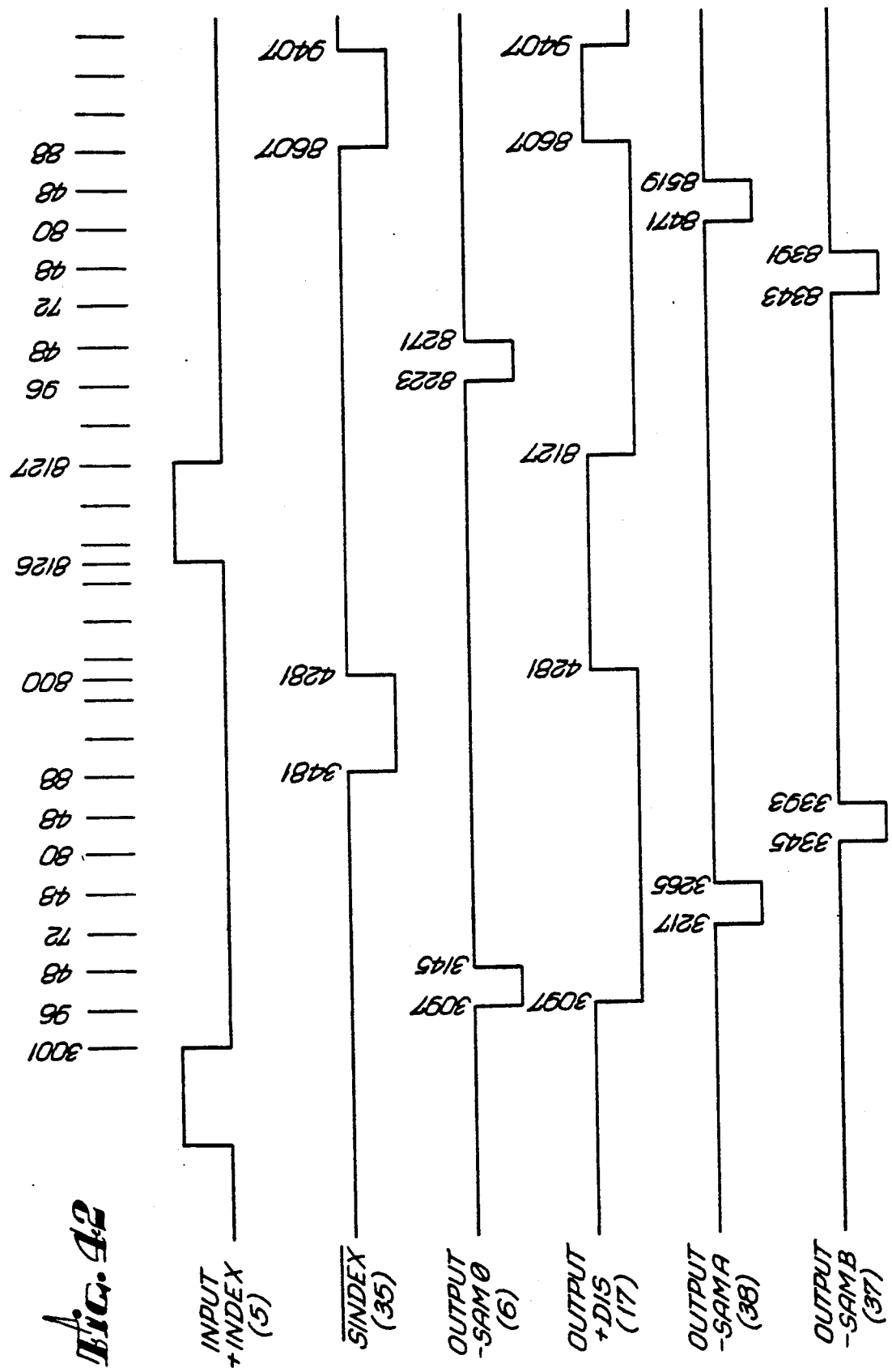

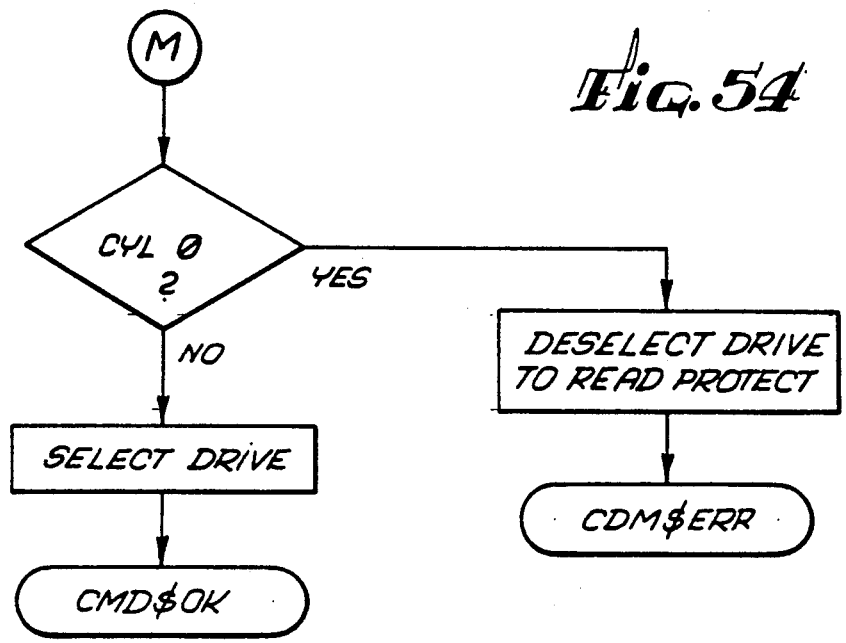
Fig. 54
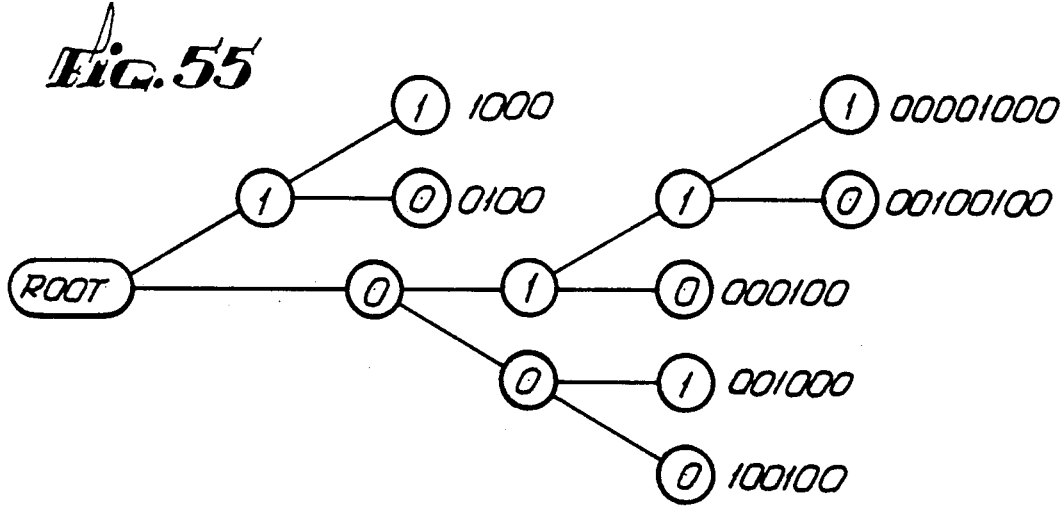
Fig. 55
| DATA | RLL (2,7) CODE |
|---|---|
| 11 | 1000 |
| 10 | 0100 |
| 000 | 100100 |
| 001 | 001000 |
| 010 | 000100 |
| 0110 | 00100100 |
| 0111 | 00001000 |
Fig. 56

DISK DRIVE CONTROLLER SYSTEM

CROSS REFERENCE TO RELATED APPLICATIONS

This application is related to application Ser. No. 759,900 filed July 29, 1985 for "Storage Media Transducer/Unloading and Carriage Lock Mechanism," now abandoned; to copending application Ser. No. 159,709 filed Feb. 24, 1988 for "Storage Media Transducer/Unloading and Carriage Lock Mechanism"; to copending application Ser. No. 363,651 filed June 8, 1989 for "Storage Media Transducer/Unloading and Carriage Lock Mechanism"; to copending application Ser. No. 896,762 filed Aug. 14, 1986 for "Mechanism for Preventing Shock Damage to Head Slider Assemblies and Disks in Rigid Disk Drive" now U.S. Pat. No. 4,724,500 issued Feb. 9, 1988; and to copending application Ser. No. 018,499 filed Feb. 25, 1987 for "Hard Disk Drive Module and Receptacle Therefor" now U.S. Pat. No. 4,833,554 issued May 23, 1989.

BACKGROUND OF THE INVENTION

In recent years improvements in computer and semiconductor technology have enabled the prices of relatively sophisticated personal computers to be reduced to the point that they may be used in a wide variety of applications. As a consequence, personal computers have become enormously popular.

Much of the popularity of these personal computers results from the ability of magnetic disk drives to provide permanent storage for large amounts of data at a reasonable cost. To accommodate conflicting demands, a personal computer typically includes both a floppy disk drive and a hard disk drive. A floppy disk drive is advantageous in that it is less expensive and the disks that store the data can be easily removed and reinserted so that data stored on hundreds of different disks can be made available to the computer. However, the data transfer rate between a floppy disk and the computer is relatively slow, each floppy disk can only hold 1.2 MByte or less data and the manual loading of and unloading of floppy disks is relatively inconvenient and time consuming.

In contrast, hard disks tend to be more expensive, but they typically hold 30 MBytes or more of data and the data transfer rate between the disk drive and the computer control processing unit random access memory is much faster than with a floppy disk so that a data processing task can proceed much more quickly. Although it is known to provide removable hard disks, the extreme sensitivity of hard disks to dust particles and damage has precluded such removable disks from becoming popular in personal computers. The typical hard disk associated with a personal computer thus has a nonremovable disk media that is sealed within a dust free environment.

The present invention relates to a hard disk controller system which can accommodate either fixed hard disks or removable disks. The removable hard disks are removed as a sealed unit so as to avoid problems of dust contamination and damage to the media. A hard disk may thus be removed and substituted by another hard disk or used on another computer much like a floppy disk. At the same time the advantages of high data transfer rate and large storage capacity are maintained.

The hard disk control system of the present invention provides data buffering to further increase data transfer rates, high speed continuous noninterleaved access, disk storage locations that may be write-protected or even fully masked from application programs or even the operating system. Techniques are provided to assure proper insertion of a disk drive and to verify that a proper disk drive model has been inserted. A computer user may thus transport a complete software environment including operating system, programs and data to any computer having a compatible receptacle in a small box having the size of a full height 5¼ inch disk drive or less.

SUMMARY OF THE INVENTION

A disk drive system in accordance with the invention connects to a computer system bus and includes a disk controller system that connects to up to four magnetic disk drives.

Two of the hard disk drives may be removable from a receptacle and interchanged with themselves or other removable disk drives. Two of the drives may be interfaced to the controller system through a standard ST-506 interface. Each removable drive has an identification shift register which may be interrogated using signals which are multiplexed onto conventional head select signal conductors. By interrogating the identification register associated with a particular removable drive the controller system can distinguish among different drives and support more than one removable drive type. For example, variations in storage capacity, track density, number of disk surfaces and number of cylinders can all be accommodated.

Among the features of the controller system are a separation of the data channel from the head positioning subsystem. This enables implementation of a secure system providing one or more read and write protected cylinders plus one or more read only cylinders. The positioning system controls assertion of separate drive enable signals for each drive as well as a write inhibit signal. Whenever the heads of a removable drive are positioned at a read and write protected track such as at physical cylinder zero, the corresponding drive is deselected and the write inhibit signal is asserted to block reading or writing of the deselected drive. When the heads are positioned at a read only track such as at cylinder 1 the drive is selected but the write inhibit signal is asserted to preclude writing at any drive.

The read and write protected tracks may be used to store factory information such as an identification code, repair history or other information that may be useful in repairing the drive or analyzing drive performance. The read only track may be used to store an identification number, a unique serial number, or other information that could usefully be made available to the system basic input/output system (BIOS) but should not normally be available to application programs. One bit of the identification register may be connected to a write protect switch on a disk drive. The switch status may thus be interrogated and the write inhibit signal asserted any time the drive select signal is asserted if the switch is in a write protect position. The disk controller system includes a high speed 128K by 8 high speed buffer in the data channel. This buffer can store data for more than 8 tracks separate from system memory to reduce disk accesses and improve data storage and retrieval times. The contents of the sector buffer are managed by the system BIOS. The sector buffer is sufficiently fast to support continuous reading or writing of a full track of data with sequential, noninterleaved sectors. Four DMA channels support concurrent access to the sector buffer by one disk transfer channel, two system I/O access channels and a refresh channel.

BRIEF DESCRIPTION OF THE DRAWINGS

A better understanding of the invention may be had from a consideration of the following detailed description taken in conjunction with the accompanying drawings, in which:

FIG. 3 is a plan view of a disk drive used in a disk drive system in accordance with the invention;

FIG. 4 is a block diagram illustration of a disk drive used in the disk drive system in accordance with the invention;

FIG. 5 is a block diagram illustration of a disk drive receptacle used in the disk drive system in accordance with the invention;

FIG. 6 is a high level block diagram representation of a portion of a disk drive system in accordance with the invention which is common to all drives;

FIGS. 11-20 provide a block diagram representation of one occurrence of duplicate circuits used on an analog board that is used in a disk controller system in accordance with the invention;

FIG. 21 is a flow chart illustrating a head unload algorithm;

FIGS. 22-25 show a flow chart illustrating a head load algorithm;

FIG. 42 is a timing chart representation of timing signals used in the sequence controller and ST-506 interface circuit shown in FIGS. 41A and 41B;

FIGS. 51-55 are a flow diagram illustrating a SEEK_HIGH procedure; and

DETAILED DESCRIPTION OF THE INVENTION

Figure 1:
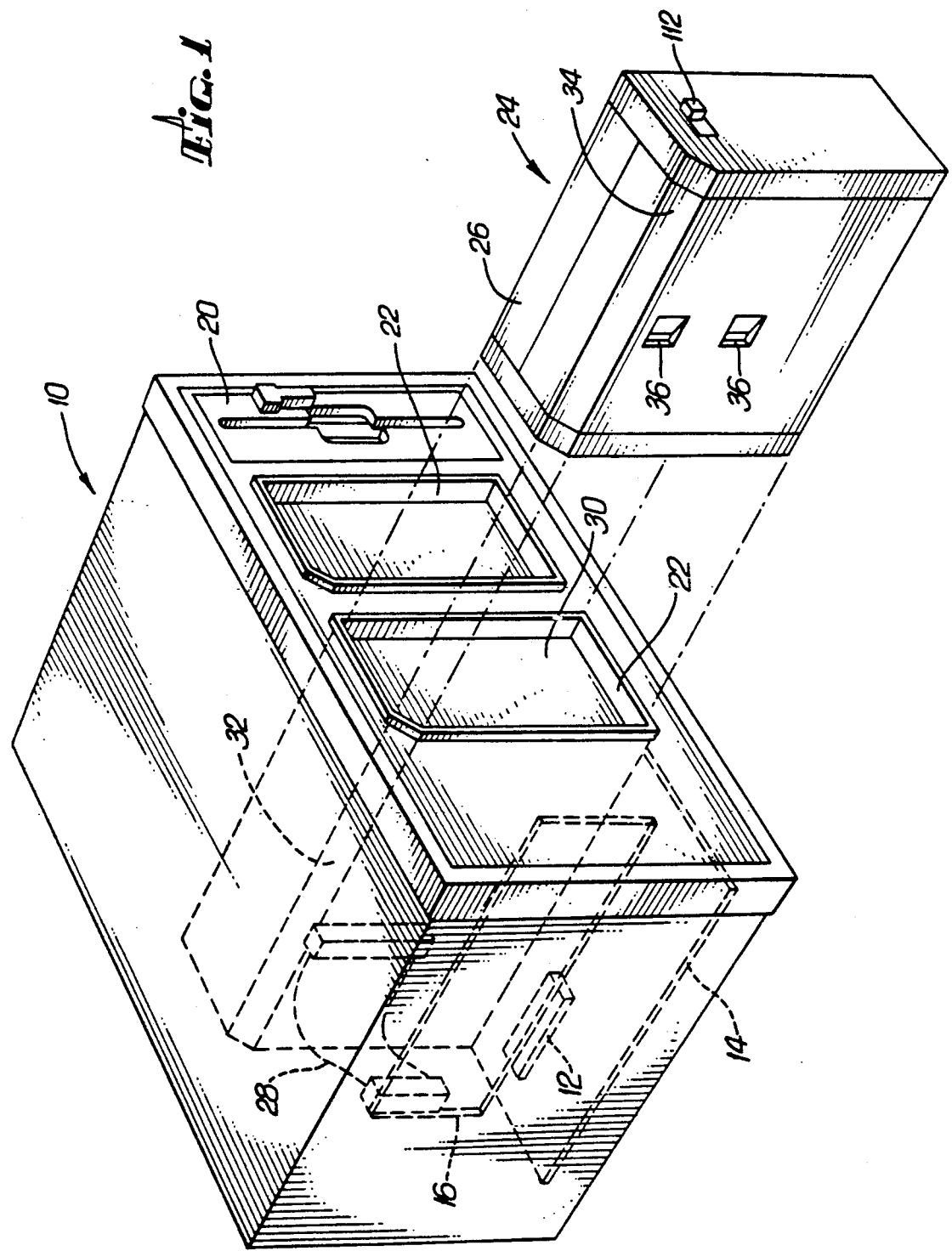
FIG. 1 is a phantom perspective view showing a computer system having removable data packs in accordance with the present invention.

Referring now to FIG. 1, a computer system 10 in accordance with the invention is shown in simplified form as including a mother board 14 which would typically contain the central processing unit, main RAM memory, and other circuits required for implementation of the computer system 10. A plurality of edge connectors 12 are provided to connect a plurality of expansion printed circuit boards 16 (only one being shown in this simplified example) and a system bus on the mother board 14 to permit the computer system 10 to be expanded by implementation of additional functions that are not initially included on the mother board. In a typical computer system 10, five or more of the expansion connectors 12 are provided on the mother board and each may receive and connect a corresponding expansion board 16 to the mother board.

The computer system 10 is shown as including a floppy disk drive 20 and two hard disk drive systems having receptacles 22 each of which receives a removable data pack 24.

Each removable data pack 24 is a hard disk drive that is shock mounted within a container 26. The container 26 has an electrical connector (not shown on the interior end therein) which engages a mating electrical connector on one of the receptacles 22 when the removable data pack 24 is inserted into a receptacle 22.

A ribbon connector cable 28 provides electrical connection between the disk controller printed circuit board 16 and the receptacle 22 while the receptacle 22 in turn interconnects with the removable disk pack 24 as explained previously. It should be appreciated that while the disk controller printed circuit board 16 is shown in FIG. 1 as a single board for ease of understanding, in the principle embodiment, the disk controller is actually implemented physically as two separate printed circuit boards which are mounted side by side on connectors 12 and interconnected by a ribbon cable similar to the cable 28.

The receptacles 22 each have a hinged door 30 which closes the front of the receptacle 22 when a removable data pack 24 is not in place but is easily forced open to permit receipt of a removable data pack 24 upon insertion of a pack. The receptacles 22 have in the upper left hand corner thereof a beveled corner 32 which mates with a beveled corner 34 on the housing 26 of the removable data pack 24. The mating bevels 32 and 34 assure that a removable data pack 24 can be inserted into a receptacle 22 only in a proper orientation.

The removable data pack 24 has two gripping notches 36. Upon insertion of the removable data pack 24 part way into a receptacle 22 an arm within the receptacle 22 engages the notches 36 and a sensor detects the insertion of the data pack 24. Upon detection of the partial insertion by the sensor, a receptacle motor is actuated to move the arm which engages notches 36 and automatically draw the removable data pack 24 into the receptacle 22 at a controlled velocity and force to produce proper engagement and alignment of electrical connectors between the removable data pack 24 and the receptacle 22. Similarly, upon issuance of an eject command through the computer 10, the receptacle motor is activated to eject outward the removable data pack 24 a sufficient distance that it can be manually grasped and fully removed from a receptacle 22. While the controller 16 is shown in FIG. 1 for ease of explanation as being connected only to the receptacle 22, it should be appreciated that in actual practice the controller board 16 would be connected to both of the receptacles and in addition has connectors for providing connection to two hard disk drives having standard ST-506 drive interface connections.

Figure 2:
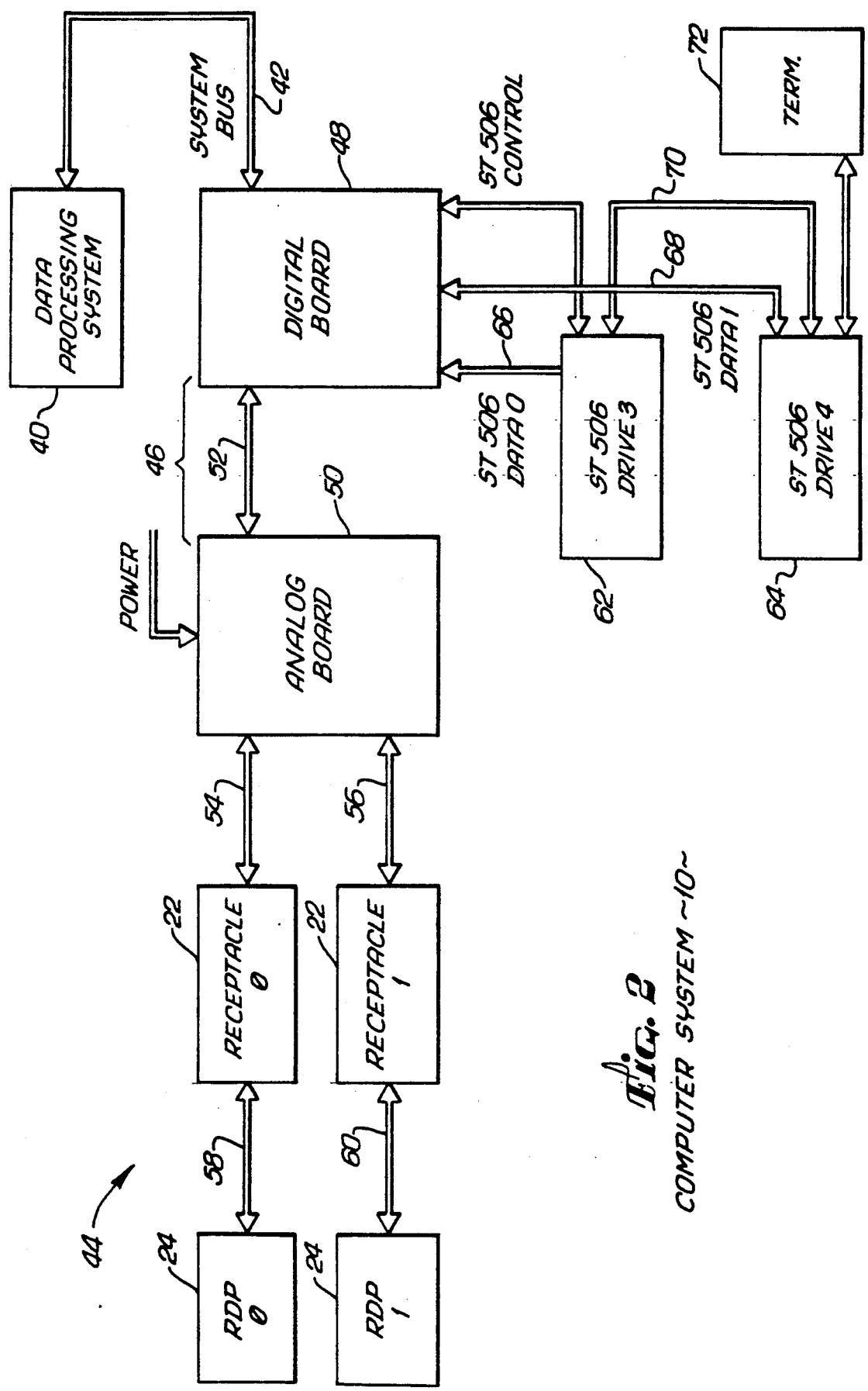
FIG. 2 is a block diagram illustration of a computer system having a disk drive system in accordance with the invention.

Referring now to FIG. 2, the computer system 10 is shown as including a data processing system 40 connected by a system bus 42 to a disk drive system 44.

In the preferred example, the disk drive system includes a disk controller system 46 implemented on two printed circuit boards designated digital board 48 and analog board 50. The digital board is connected for communication over system bus 42 while analog board 50 is connected to receive power from the system power supply with data and control signals being communicated with digital board 40 over a multipin connection 52. Analog board 50 further provides signal communication over multipin connectors 54, 56 to two receptacles 22 designated receptacle 0 and receptacle 1.

Receptacle 0 further connects through a multipin connector 58 to a removable data pack 24 designated RDP0. Similarly, receptacle 1 communicates over a multipin connector 60 with a removable data pack 24 designated RDP1. It should be appreciated that the designations of the removable data packs 24 as 0 or 1 is made only in response to the respective receptacle 0 or 1 to which they are connected. A given removable data pack 24 may in fact be connected at either receptacle and additional removable data packs 24 may be connected as desired. It should be appreciated that each receptacle can connect to only a single removable data pack 24 at a time but may be sequentially connected to any desired removable data pack having the required electrical and operating characteristics.

The digital board 48 also provides connection to two additional hard disk drives 62, 64 designated ST-506 drive 3 and ST-506 drive 4 respectively through an industry standard ST-506 interface. The standard interface includes a multipin data signal connector 66 designated ST-506 data 0 which provides connection to ST-506 drive 3, a multipin data signal connector 68 designated ST-506 data 1 which provides connection to ST-506 drive 4, and a daisy chain multipin control signal connector 70 designated ST-506 control which provides control signals to both of the hard drives ST-506 3 62 and ST-506 drive 4 64 and then terminates in a termination connector 72.

As a general rule, the disk controller system 46 is implemented with the digital board 48 providing the traditional data handling and high level head positioning functions while the analog board provides essentially duplicate circuitry for each receptacle and removable data pack that provides the low level or analog head positioning stepper motor and spindle motor control functions for the two removable data packs. The analog board also provides the motor control circuits for the receptacle 0 and receptacle 1. Because these motor control functions which are typically included in a disk drive are mounted on the analog board 50, the removable data packs 24 need only contain the transducer positioning stepper motors, the spindle motor, and very limited interface circuitry. As a result, the cost of each removable data pack 24 can be significantly reduced while the reliability thereof is significantly improved.

An example of a disk drive 80 in accordance with the invention for mounting within a removable data pack 24 is shown in FIGS. 3 and 4, to which reference is now made. The disk drive 80 contains a minimum number of components for providing reliable, high density recording. The disk drive 80 includes two rotating magnetic disks 82 which are sealed within an external housing 84 which is in turn shock mounted within the removable data pack housing 26. The magnetic disks 82, 83 are rotationally driven by a crystal controlled spindle motor 86. Motor 86 is a three phase motor receiving three analog drive signals designated spindle PHA, spindle PHB, and spindle PHC. Spindle motor 86 also includes hall effect sensors disposed about the periphery of the motor and providing motor position and providing six motor per position indication signals designated hall sensor A+, hall sensor A−, hall sensor B+, hall sensor B−, hall sensor C+, and hall sensor C−. These six hall effect sensors signals are received by a spindle motor servo control circuit on analog board 50 and utilized to generate the three phase drive signals to maintain spindle motor 86 within a very close tolerance of the nominal rotation rate of 3593 rpm.

An index sensor 88 is associated with spindle motor 86 and senses an index position as the disks 82 and 83 are rotated. Index is deemed to occur at the rising edge of a short index pulse which occurs on output signal index sensor as the disks 82 and 83 rotate beneath the transducer heads.

Each data track on disk drive 80 is deemed to begin at an index point 90 which forms the beginning of a small servo sector. Within the initial servo sector, each track stores an optional track 0 signal, an A signal block positioned off track by ½ track on one side followed by a B signal block positioned off track ½ track on the opposite side, each consisting of a sine wave of approximately 3 MHz. Radial positioning of the transducer head may thus be accomplished by positioning the active transducer head at a radial position within a track where the magnitudes of the A and B signals are equal. Only one of the A or B signal blocks is stored between any two adjacent tracks. The optional track 0 signal is placed on approximately 8 of the outermost tracks with the innermost of these tracks being the true track 00 and coinciding with phase 00 of the head stepper drive. Two distinct types of drives are defined by recording only A or only B signal blocks between all adjacent tracks which have a track 00 signal. True track 00 and inner tracks without track 00 signals have an A signal block on one side of the track and a B signal block on the other side. The drive type is sensed by detecting the phasing of the A/B signal blocks on true track 00. The current embodiment stores an A signal block between the track 00 outer tracks for a 30 Mbyte data pack and stores B signal blocks between the track 00 outer tracks for a 20 or 40 Mbyte data pack. Sense of the drive type is accomplished by positioning the transducer to true track 00, moving the transducer inward ⅜ of a track and detecting which signal, A or B, increases. The track 00 signal enables the control logic to synchronize the indicated track position of the transducer heads with the actual physical track location of the transducer heads.

Starting with the end of the servo sector 92 there are 26 data sector sequentially disposed around each track. Each data sector stores 512 bytes of data, in a 2/7 run length limited (RLL) recording format. In addition to the 512 bytes of data, each data sector contains a conventional preamble with 7 sector ID bytes and a postamble which includes a 56-bit error correction code.

The magnetic transducer heads are radially positioned in response to a microstepping stepper motor 94 which is coupled by a rack and pinion gear to a carriage 96 which in turn supports the four magnetic transducer sliders or heads 98 in close proximity to the four surfaces of the magnetic disks 82, 83 respectively.

When activated, a head load solenoid 100 locks and unlocks a gate 102 which is driven in response to motion of the carriage 96 to protectively support the heads 98 away from the disk surfaces or alternatively to load the heads onto the disk surfaces. The gate 102 is moved to the unload position before a removable disk pack 24 is removed from its receptacle and operates to preclude the heads 98 from contacting and hence damaging the surfaces of the disks 82, 83 in the event that the removable data pack 24 is dropped or otherwise experiences substantial shock. Upon insertion of a removable data pack 24 into a receptacle 22, the disk drive system 44 undergoes an initialization process in which a motor within the receptacle 22 first draws the removable data pack 24 into a fully seated position. Once seated into receptacle 22, the solenoid 100 is actuated to release gate 102 which is forced open as the carriage 96 is moved radially inward under control of the stepper motor 94. As the gate 102 swings open, the heads 98 are permitted to, in effect, slide down a mechanical ramp and move closer to the surfaces of the disks 82, 83. As the carriage 96 continues to move radially inward the gate 102 is forced to a fully open position at which no support is provided by the gate 102 for the heads 98. The heads 98 of course remain supported by the carriage 96 in a conventional manner.

Prior to ejection of a removable data pack 24, the carriage 96 is moved radially outward and as it approaches a radially outward extremity it engages and begins to close the gate 102. As the gate 102 reaches the closed position the solenoid 100 is again actuated to lock the gate 102 in the closed position. The receptacle motor may then be actuated to partially eject the removable data pack 24 from its receptacle 22. Further details relating to foregoing structure and its operation are contained in the above-referenced applications Ser. No. 759,900; 159,709; 363,651 and U.S. Pat. Nos. 4,724,500 and 4,833,554.

A flexible connector 58 provides the electrical connection between drive 80 and the exterior of the personal data pack 24 as indicated previously in conjunction with FIG. 2.

An ID shift register 110 is an 8 bit parallel load shift register that is loaded in response to signal HDSEL1-/IDLD which is a time division multiplexed signal which either represents part of a binary coded head select signal or goes active low to load the shift register 110. The clock input to shift register 110 is driven in response to signal HDSEL0/IDCLK which is another of the binary coded head select signals which is time division multiplexed to carry the ID clock signal. At start up the signal HDSEL1/IDLD is asserted to load the shift register 110 and then the signal HDSEL0-/IDCLK is toggled 8 times to output the contents thereof as an 8 bit serial data signal ID DATA, most significant bit first. The most significant bit of shift register 110 is connected to an optional write-protect switch 112 which selectively couples the D7 most significant input to ground or to +5 volts. When connected to +5, the most significant bit of signal ID data is interpreted as write-protect-on and writing to the corresponding disk drive 80 is inhibited. The 7 lower significant bits of the shift register 110 inputs are selectively coupled to ground or +5 volts to define an identification code for disk drive 80. In the present example all inputs are connected to ground to identify an identification code of 0. The identification code is checked by the disk controller before applying drive signals to disk drive 80 to assure that the disk drive 80 is compatible with the controller system 46 and to preclude sending control signals to an incompatible drive that might cause damage to the drive. The application of ID clock and ID load signals to the head select signals is done at a time, such as at start up, when the incidental head selections which occur from assertion of these ID signals does not interfere with the normal operation of disk drive 80.

A read/write circuit 114 which may be advantageously implemented as an SSI 117 integrated circuit manufactured by Silicon Systems is mounted on the carriage 96 and serves as a head multiplexer and preamplifier. Read/write circuit 114 receives the binary coded head select signals are HDSEL0-HDSEL2 and selects a corresponding head 0-head 3 98 in response thereto. It is noted that while circuit 114 can accommodate up to 6 heads, only 4 are implemented in the present embodiment.

The read/write circuit 114 generates a write unsafe signal, WUS, which goes active high during such times as writing is unsafe. The circuit also generates the differential read signals RDX and RDY during reading which are communicated to a differential amplifier 116. The amplified output of differential amplifier 116 is designated RD+ and RD− and passes through the receptacle to the controller system 46. The chip select input to read/write circuit 114 is rendered permanently active by connection to ground and the R/-W input is connected to receive signal RD/WR. The write data input, WDI, is driven by signal WRTDATA and the write current input, WC, is driven by an analog signal WRTCUR. As is conventional, signal WRTCUR varies the magnitude of the head write current in response to the radial position of the head with respect to the rotating disk. In general, the write current is reduced toward the center of the disk where adjacent bit positions are relatively closely spaced and increased as the head moves radially outward.

By a way of example, receptacle 22 for disk drive 0 is illustrated in FIG. 5 to which reference is now made. It will be noted that for the most part receptacle 0 merely acts as a conduit to pass signals between drive 0 and analog board 50, although slight changes in signal name are typically made to permit different connector positions to be distinguished. In addition, the receptacle has a receptacle motor 20 which is driven in response to two winding signals designated MODMTR0+ and MODMTR0− to indicate the module motor. A microswitch 122 responds to the position of a cam that is driven by receptacle motor 120. When the cam is in the seated position, indicating that a removable data pack 24 is properly fully inserted, switch 122 closes to apply a ground signal to a signal HOMESENSE0 to indicate that the receptacle motor is in a module seated position.

It is noted by way of brief explanation that receptacle motor 120 drives a cam wheel having connected thereon a pullman arm which attaches to a slider for engagement with notches 36 in a removable data pack 24. As the cam rotates the pullman arm alternately moves the slider to extended and retracted or seated positions. The microswitch 122 indicates when the cam is in the ejected or seated positions. This mechanism is more fully described in copending U.S. Application Ser. No. 018,499 filed Feb. 25, 1987, which is assigned to the assignee of the present application.

A signal module load 0+, MODLD0+, becomes connected to ground when a removable data pack 24 becomes seated and proper electrical connection is made between it and the disk controller system 46. Two light emitting diodes 126, 128 designated active and ready are driven by signals MODACT0 and DODRDY0 respectively to provide indications to an operator of the status of receptacle 0.

It will be appreciated that only removable data pack 0 and receptacle 0 have been described in detail, removable data, pack 1 and receptacle 1 are substantial duplicates thereof except for obvious changes in signal names.

Figure 7:
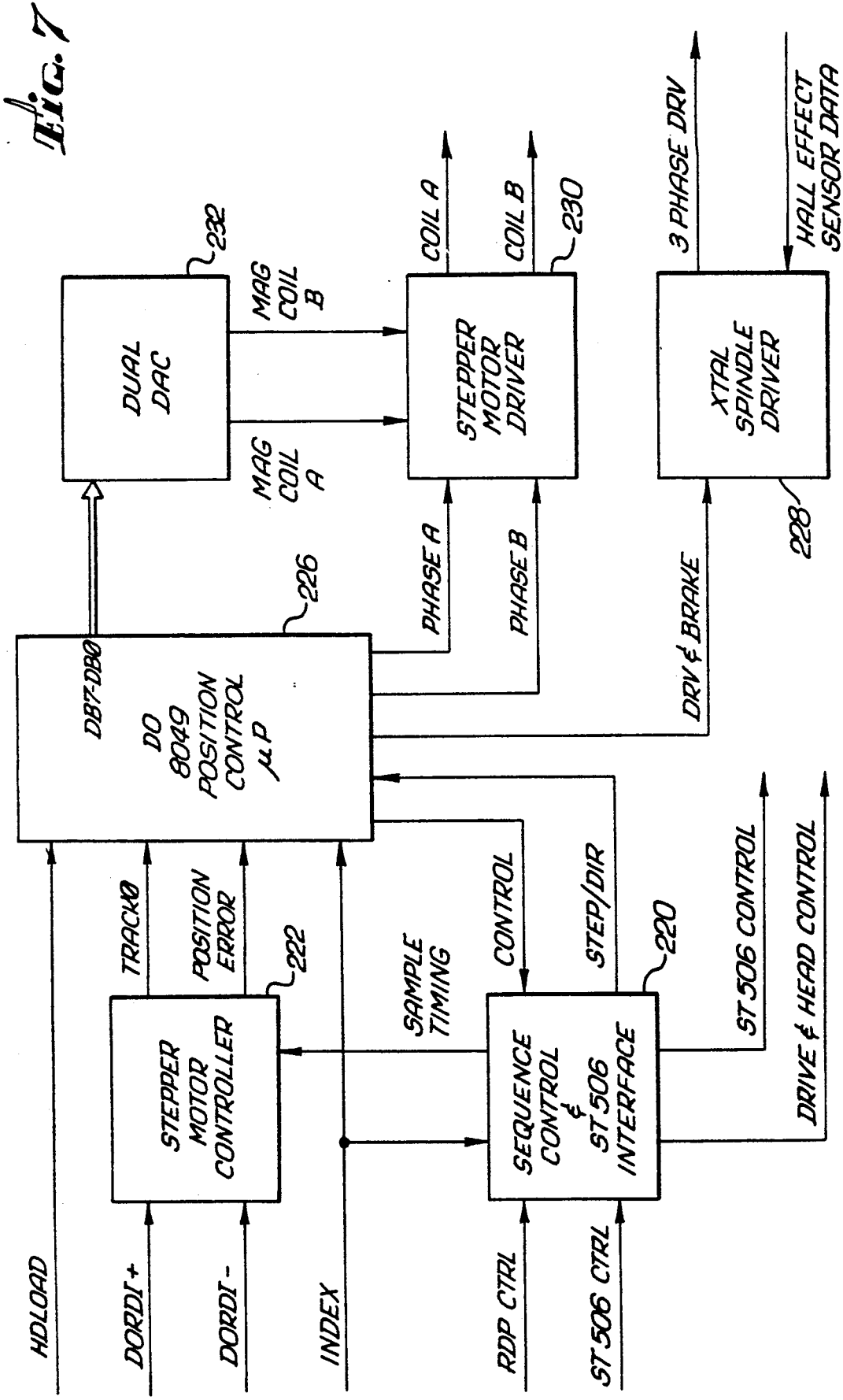
FIG. 7 is a high level block diagram representation of a portion of a disk drive system in accordance with the invention which pertains to a single drive and is duplicated for a second drive.

A simplified functional representation of the disk controller system 46 is shown in FIG. 6 and FIG. 7 to which reference is now made. It will be noted that FIG. 7 illustrates an analog position control portion of the system 46 which is duplicated for drive 0 and drive 1. However, the analog position control circuitry is shown in FIG. 7 only for drive 0, it being understood that this portion of the disk controller system 46 is duplicated for drive 1.

A system bus interface 152 is preferably implemented as a single programmable array logic chip which may be referred to as a glue gate array because it implements miscellaneous interconnection logic which is utilized by the digital printed circuit board 48. System bus interface 152 provides connection to the system bus 42 as represented in simplified form by the eight least significant bits of the data buss portion thereof, BD7-BD0. A digital processor designated DB7-DB0 162 provides communication among the system interface 152, an 8049 digital control processor 154, and a drive select latch 156. A status/command buffer 158 provides communication over digital 162 of status and command information between the system 42 and control processor 154. An 8049 RDP status latch 160 latches eight receptacle status signals and makes them available to the 8049 control processor 154 over digital 162. The latch status signals include four signals for each of the two receptacles to indicate the state of the receptacle load cam microswitch, the receptacle present signal, the pack-in signal and a jumper controlled signal selecting which physical receptacle is to be designated receptacle 0 and which is to be designated receptacle 1.

The digital control processor 154 selectively writes data to the drive select latch 156 whose outputs connect to both the removable data packs and the ST506 interface. The drive select latch provides a drive select signal for each drive which enables or disables data transfers with the corresponding drive. The drive select latch 156 also latches a write inhibit signal which precludes writing to an active drive. By controlling these drive select signals and the write inhibit signal, the 8049 control processor can inhibit reading, writing or both at any predetermined track locations. In the present example, logical cylinder 0 is implemented as a nonreadable and nonwritable cylinder, although the heads may be moved to the cylinder. Physical cylinder 0 may thus be utilized to maintain factory identification and status information relating to the manufacture and repair of the drive, or any other secure data. Physical cylinder 1 is implemented as a read only (not writable) cylinder which may contain a unique identification serial number, disk characteristics information such as an initial fault map, or other information which is to be readable but protected against writing. It will be appreciated that additional tracks or cylinders could be read and write protected or read protected if desired.

In the present embodiment, track cylinders 0, 1 and a selected number of additional cylinders constitute a reserved disk area of which the read/write portions are available for use by OEM manufacturers to store identification or other data that does not relate to user application data. A conventional IBM-compatible disk section follows in cylinders subsequent to the reserved disk section to fill the remainder of the disk capacity except that the last two cylinders are reserved for diagnostics and testing so that these functions can be performed without disturbing user data. It should be appreciated that additional cylinders could be designated read only or read/write protected if desired.

In the present example, the logical cylinder positions are offset from the physical cylinder positions by a value recorded on a reserved track. The offset value is approximately one-half of the total tracks on the disk. Thus, logical cylinder position 0 occurs at a physical cylinder which is approximately at the radial center of the disk storage area. This offset places stored disk maintenance such as file allocation tables at the center of the disk and thus improves average data transfer times. The basic input/output system (BIOS) of data processing system 40 controls the offset of the logical cylinders relative to the physical cylinders. Control processor 154 controls the low or supervisory level positioning of the heads to the physical cylinders commanded by data processing system 40 and thus has access to commanded current head positions to enable it to control the drive select latch 156 to preclude reading or writing at the corresponding cylinder positions. Digital control processor 154 is also connected to the receptacle drivers and motors 164 and controls the operation of the receptacle. As a security feature to preclude overriding the read protect and write protect features, the digital control processor 154 controls at a low level the head cylinder positions but does not have access to the data. Similarly, the data circuits do not have access to or control over head cylinder position.

A BD/RB buffer 170 provides a bidirectional connection for communication of commands and data between the system data bus and a RAM buffer controller 172. A page register 174 is set in response to data received from system bus 42 and in response selects a page from a RAM sector store 176. A loadable sector counter 178 is connected to receive a sector count value from system bus 42 and count down the sector values as sectors of data are transferred from the disk to RAM 176 under control of RAM buffer controller 172. Upon counting down to zero, loadable sector counter 178 generates a sector IRQ interrupt signal which is connected to the data processing system as interrupt 14. The RB bus 166 also connects the BD/RB buffer 170 and RAM buffer controller 172 to the 128K by 8(64K by 8 by 2) RAM sector buffer 176 and to a head select latch 180 and to a disk controller 182. Head select latch 180 receives and latches the four binary coded head select signals two of which are multiplexed with the ID load and clock signals and eventually presented to the active disk drive 80.

The RAM buffer controller 172 is preferably implemented as a single chip controller circuit RB1002 manufactured by Sunol Systems of 1177 Quarry Lane, Pleasanton, Calif. 94566. It controls the accessing and dynamic RAM refreshing of RAM sector store 176 and arbitrates three levels of bus requests for RB bus 166 in addition to the allocation of highest priority to memory refresh. Of the three bus request levels, the highest priority is assigned to disk controller 182 to assure that an active drive is able to receive or provide data as required. The system bus 42 is granted two channels which occupy the two lower priority levels. RAM buffer controller 172 includes, in effect, three DMA access channels having address counters for the disk drive transfers and for transfers over the two channels to the system bus 42.

It should be noted that these DMA channels are for data transfers over the RB bus 166 and are not viewed as DMA channels by the data processing system 40. The data processing system 40 views the data transfers as simply the reading or writing of an I/O port. However, the newer 80286 microprocessors have string I/O instructions that make I/O port data transfers very efficient. Since data can be read or written by RAM sector store 176 and transferred over RB bus 166 as fast as it can be handled by the system bus 42 and data processing system 40, these I/O port data transfers can be just as efficient as a traditional system DMA channel.

The RAM buffer controller 172 and RAM 176 enable the system 40 to avoid using system RAM space for multiple sector reads and writes, giving the system 40 and the disk access to the 128K RAM sector buffer 176 through the three DMA channels. The lowest priority channel does not allow access to the sector buffer, but is used to gain access to the disk controller 182 and to the RAM buffer controller 172 for initialization of the internal registers. It is also used to access the head select external latch 180 for the disk controller 182. The RAM buffer controller 172 contains RAM access priority logic for channel port arbitration using the three DMA channels. The disk controller 182 is dedicated to the highest priority channel 3 to control data transfers between the disk and the RAM sector buffer 176. The data and addresses to be transferred between sector buffer and disk have their own dedicated bus to facilitate the transfer. The data is transferred between the sector buffer and the disk at approximately a rate of 1 megabyte per second. This corresponds to a 7.5 megabit per second RLL encoded data transfer rate from the disk with 16 RLL encoded bits per decoded data byte.

When channels 1 and 2 on the RAM buffer controller are used to transfer data from the RAM sector buffer to the system 40 RAM, the data is gated from the system bus 42 to the RAM controller bus 166 during a transfer. The system 40 sends data by means of programmed I/O via ports 584H or 58AH. Ar access to either of these ports causes a request to channel 1 or 2 (port 584H for channel 1 and port 58AH for channel 2) of the RAM buffer controller 172 which arbitrates the transfer. Channel 0 on the RAM buffer controller 172 is used by the processor 42 to initialize or read the RAM buffer controller registers, the disk controller 182 registers and the head select latch 180. Thus, this channel is accessed by writing to ports 580H through 583H.

The on-chip DRAM refresh circuitry of the RAM buffer controller 172 has a refresh rate controlled by the value written into an 8-bit refresh register. The value written to the register determines the maximum number of CPU cycles allowed to pass before the insertion of a refresh cycle. (However, any unused sector buffer cycles occurring before this time will be used to refresh transparent to the system, increasing system performance. The refresh rate can be determined as follows:

Refresh rate = MUX (RR + 1) seconds/refresh cycle (EQN1)

where refresh rate is the maximum time between refresh cycles, MUX is a 330 nanosecond free-running sector buffer address select and RR is the decimal value of the refresh rate register.

For example, if a value of 1C H is written to the refresh rate register then there would be a maximum of 15 microseconds between refresh cycles.

There are two types of transfers to and from the sector buffer, transfers between the disk and sector buffer and transfers between the system 40 and the sector buffer 176. The transfers are all arbitrated by the RAM buffer controller 172 and a device is permitted access according to the priority of the channel that the device uses to request access. To access the sector buffer, the disk (using DMA channel 3) or processing system 40 must first request access by asserting a request line of the RAM buffer controller 172 for its respective channel. The request for each channel is generated upon accessing the corresponding channel I/O port. The requesting device decodes two binary-encoded acknowledge bits from the RAM buffer controller 172 to determine whether it has access to the RAM sector buffer 176. The data from the RAM sector buffer 176 is sent to the disk controller 182 to be encoded and sent to the disk or sent to the system buss 42 for transfer to the system 40. On a write to the RAM sector buffer 176 the data is sent via the data ports (584 channel 1 or 58AH channel 2). Before the transfer is requested, the sector buffer starting address for the active channel is initialized and the sector buffer page written to page port at address 58CH, the byte count initialized, and the command written to the RAM buffer controller 172 to enable the channel as specifying a write or a read from the sector buffer. The sector address, byte count and command registers of the RAM buffer controller 172 are accessed by writing the address of the appropriate register of the selected channel to port 580H and the data value to be placed in the register to port 581H.

A free-running 3 MHz clock, used to synchronize all sector buffer transfers, is present at the RAM clock input of the RAM buffer controller 172. This clock is used to generate timing for the address latch enable (ALE) input to the RAM buffer controller 172 and RAM row and column address select lines. This pulse is also used by the RAM buffer controller 172 to synchronize the RAM address with the address select lines. The RAM buffer controller 172 signals completion of all sector buffer transfers by sending a stop bit to the disk controller 182. The RAM buffer controller 172 registers and page port are described in detail below.

The sector buffer page port at I/O port 58CH is initialized before any data is transferred to or from the RAM sector buffer 176. The port has two bits defined for each channel on the RAM buffer 166. The bits select one of four banks of RAM with the two encoded bits. Note that the controller currently has only two 64K by 8 pages of sector buffer RAM. Thus, bit combination 00 selects sector buffer bank 0 and combination 01 selects sector buffer bank 1. No other combinations are presently implemented. Taking bit 7 as the most significant bit, bits 5 and 4 of page register 174 control page select for the disk controller channel 182 channel 3, bits 3 and 2 control page select for DMA channel 2, and bits 1 and 0 control page select for the system DMA channel 1.

System I/O port 580H is a RAM buffer controller 172 status/address port for data processing system 40. When read, a status byte is placed onto system buss 42 and when written one of 20 control registers within RAM buffer controller 172 is selected. The selected control register then may be read or written over I/O port 581H.

When read, I/O port 580H produces in bit positions 7-0 corresponding status signals indicating channel 3 active, channel 2 active, channel 1 active, timer active, auto-increment, register A2, register A1, register A0, respectively. When used as a write port, I/O port 580H data has the following register address bit positions, 0,0, channel number-bit 1, channel number-bit 0, auto-increment, register A2, register A1, and register A0. Bit positions 5 and 4 thus select one of four sets of control registers pertaining to the four access DMA channels:- timer/refresh, DMA channel 1, DMA channel 2, and DMA channel 3. Bit position 3 is an auto-increment bit. If set, it causes subsequent data accesses to selected registers to produce an automatic increment in the address register so that multiple registers can be accessed sequentially over I/O port 581H without having to write a new address at I/O port 580H for each different access. Bit positions 2-0 contain a binary coded address which selects one of eight registers within a group of registers selected by bits 5 and 4. It should be noted that only five of the eight registers for each group are actually implemented and that the address for register 5 is not automatically incremented when register 5 is accessed within any of the groups. Within the register groups, or channels, each of the five register addresses has a different meaning, depending on whether it is being read or written. For the timer/refresh channel 0 group the read bytes are in sequential order:timer count, channel 1 status, channel 2 status, channel 3 status, and timer count. When written, the five addresses correspond to the registers:clock divider low byte, clock divider high byte, timer control, timer count, and refresh rate. Groups 1-3 are identical except that they correspond respectively to DMA channels 1-3. The read bytes are: start address low, start address high, byte count low, byte count high, and channel 1 status for the selected group. For each of the channel groups, only the fifth register may be written and it is a channel command byte.

The refresh timer consists of a 16-bit variable clock divider which divides the RAM clock rate. The divided down RAM clock is then used to increment an 8-bit timer count register. The clock divider low register (00H) provides the low byte of this divider while the clock divider high byte (01H) provides the high byte of the clock divider. A timer control register (02H) serves as a mode control register with a one at bit 7 enabling timer operation, while bit 6 causes the timer byte to be output to the RB bus whenever the timer count byte is incremented. When set to one, bit 5 causes the timer count byte to be output to the RB bus 166 whenever the timer counter rolls over to zero. Bit 4 is a stop at carry bit and causes the timer counter to stop when it rolls over to zero if bit 4 is set to one. Bits 3-0 are not used and should be set to zero. Writing to address 3H of group 0 sets the initial value of the timer counter and simultaneously initializes the clock divider.

The register at address 5 of group 0 is a refresh rate register which sets the refresh rate. Setting this register to 1 will cause refresh cycles to be inserted at the maximum rate which is one cycle out of two. A cycle is 330 nanoseconds in duration. Activating the −RESET line also sets the refresh to its maximum rate. Setting the refresh register to 255 will set the refresh rate to one cycle out of 256. Setting this register to zero will cause refresh to be disabled.

For the three DMA channel groups the first two addressable write registers are the start address low byte and start address high byte, respectively, at addresses 0H and 1H. These registers store the initial value for the address of the byte to be accessed in the sector buffer at a page defined by the page register within the glue gate array. The third and fourth registers within each DMA channel group are the byte count low and byte count high registers at addresses 02H and 03H. These registers store the initial value for the byte count for DMA transfers to or from the RAM sector buffer 176. The byte count is set to N-1 to transfer N bytes. When the byte count for the active channel has reached zero, it strobes a −STOP signal, which flags the disk controller 182 that a data transfer is completed.

The command byte at address 4H of each of the three channel groups controls the channel status for the corresponding channel 1-3. Bit 7, when set to one, enables the channel to respond to DMA requests. This is the +ENABLE_CHANNEL bit of the command word. Bit 6 is the +INITIALIZE_ADDRESS bit of the command word. When set to one, the RAM buffer address is set to an initial value. When bit 6 is set to zero, the RAM buffer address is left at a previous value. Bit 5 is the +INITIALIZE_COUNT bit. When set to one, it causes the byte counter to be set to an initial value. When cleared to zero, the byte counter is left at its previous value. Bit 4 is the +AUTOINITIALIZE bit and causes the address and byte count to be reset to initial values when the byte count reaches zero. If bit 4 is set to zero, a DMA operation stops when the byte count reaches zero. Bit 3 is the +WRITE_TO_MEMORY bit and commands a DMA write to memory for the corresponding channel when set to one or a DMA read from memory when set to zero. Bit 2 is a +EXTERNAL_WRITE_CONTROL bit which commands the write line to be an input for the given channel when set to one and commands the write line to be an output for the given channel when set to zero. Bit 1 is the +EXTERNAL_STOP bit and when set to one causes the stop line (EOP) to be driven from an external source. If set to zero, the RAM buffer controller 172 drives the stop line. Bit 0 is the +ADDRESS_INCREMENT_MODE bit with a one state causing the address counter to be incremented after every DMA read or write and a zero state causing the address counter to be decremented after every DMA read or write.

The status register which may be read at the fifth address position for each DMA channel has the following bit mapped significance. Bit 7 is a +CHANNEL_ENABLE signal with a one indicating that the channel is enabled and a zero indicating that the channel is disabled. Bit 6 is a +ADDRESS_CARRY bit with a one indicating that the current address count is at FFFFH if counting up or at 0000H if counting down. A zero indicates not at carry. Bit 5 is a +TERMINAL_COUNT bit with a one indicating that the byte counter is at zero and a zero indicating that the byte count is not at zero. Bit 4 is a +AUTOINITIALIZE bit with a one indicating that autoinitialize mode is active for the given channel and a zero indicating that stop-at-terminal count is active for the given channel. Bit 3 is a +WRITE_TO_MEMORY bit with a one indicating that the set DMA mode is write to memory and a zero indicating that the set DMA mode is read from memory. Bit 2 is a +EXTERNAL_WRITE_CONTROL bit with a one indicating that write is externally controlled and a zero indicating that write is internally controlled. Bit 1 is a +EXTERNAL_STOP bit with a one indicating that the stop signal is an input signal and a zero indicating that the stop signal is an output signal. Bit 0 is a +ADDRESS_INCREMENT_MODE bit with a one indicating that the address counts up and a zero indicating that the address counts down.

8049 Control Processor 154

The 8049 control processor 154 is interfaced to the host system 42 via a command/status port 586H which is used to transfer status and commands for drive position control for both the removable data packs 24 and the ST506 drive 62,64. Control processor 154 also controls loading and unloading of the removable data packs 24. Port 586H is a command port when written to and a status port when read. Two signals generated by the digital control processor 154 are step and direction. These signals go directly to the drive interfaces. The signals are generated by the control processor 154 rather than using the STEP and DIRECTION signals provided by the disk controller 182 so that the control processor 154 can issue the commands to seek or recalibrate and then be free to return to another task while the command is being executed by the lower level controls in the analog board 50. The digital control processor 154 issues a number of STEP pulses corresponding to a number of cylinders through which the heads are to be moved in a direction indicated by the DIRECTION signal. The digital control processor 154, the RAM buffer controller 172 and the disk controller 182 all communicate with the data processing system 40 over the system buss 42 via predefined I/O status ports.

The digital control processor 154 supports the receptacles 22 by generating signals to alert a user as to the loading status of each receptacle 22. Signals are provided to indicate currently loading or load completed. The digital control processor 154 also controls the timing patterns for the loading and unloading of the removable data packs 24. Upon request, the control processor 154 can also provide interrupt sourcing and signaling of command completion. The following commands are available for controlling the digital control processor 154 operation. When read, the digital controller 154 command/status port 586H produces an 8-bit, bit mapped status word in which bit 7 indicates whether or not the disk controller 182 is busy, a one indicating busy. Bit 6 is the control processor 154 status bit and indicates whether or not it is busy, a one indicating busy. Bits 5 and 4 are not used and bit 3 indicates whether or not an error has occurred since the status port was last written. Bit 3 is reset to zero after each write to port 586H. Bit 2 is the loading status bit and indicates whether or not a removable data pack 24 is in the process of being loaded. Bit 1 is the status bit for removable data pack 1 with a one state indicating that the pack is loaded and ready and a zero indicating not ready. Similarly, bit 0 is the removable data pack status bit for receptacle 0 with one indicating loaded and ready and zero indicating not ready.

When written, port 586H serves as a command port with bits 7-4 defining a command and bits 3-0 being available to provide any data that might be associated with the command.

LOAD PACK (0XH): This command will cause the digital processor 154 to execute the loading of a removable data pack where X is the unit drive number and can be either zero or one for receptacle 0 or receptacle 1, or either two or three to load both receptacles.

UNLOAD PACK (1XH): This command will cause the digital control processor 154 to unload the heads of a removable data pack 24 and optionally eject the removable data pack from a receptacle 22 indicated by P0XX where XX can be either zero or one for receptacle zero or one, or two or three for both receptacles. P is the park heads option bit of the command. If P=1 then the selected data pack heads are unloaded or parked without ejecting the data pack. If P=0 then the selected removable data pack are ejected after the heads are unloaded. An unloaded data pack 24 creates a not ready status for the corresponding receptacle.

SELECT DRIVE (2XH): This command tells the digital processor 154 to select or unselect a specified drive. A value of F in the least significant four bits of this command will unselect all drives. This command causes bit 2 on port 1 of digital control processor 154 to strobe an external drive select/write protect latch 156 while writing to DB 162 a data byte that loads the appropriate drive select and write enable data into drive select latch 156. For selection of a drive, X is set to zero for RDP 0, one for RDP 1, two for ST-506 drive zero (drive 3 62) and to three for ST-506 drive one (drive 4 64).

SET LOGICAL PHYSICAL (3XH): This command sets the logical to physical removable data pack designation mapping or returns the current mapping. This command allows the drive selects for the removable data packs 24 to be switched under program control. Thus, RDP 0 can be physically mapped to drive select zero or one (drive C: or D:). X is defined as SxxI. This command causes the interrupt request to the digital control processor 154 to be suppressed. S=1 commands return of the logical mapping. S=0 commands setting of the logical mapping with bit zero or I. If I=0 the removable data pack 24 mapping is the same as the physical mapping (receptacle zero is drive C: and receptacle one is drive D:). If the least significant or I-bit is set to one then the logical mapping of the removable data packs 24 is reversed.

RECALIBRATE (4XH): This command causes the drive indicated by unit number X to seek to cylinder zero. For ST-506 drives, the current cylinder is set to zero, and the seek is one cylinder out. The host must check for track zero through the disk controller 182 status port. For example, the command 40H would command unit zero to move to track zero. The 4 drives are designated by X=0−3 as removable data pack 0, removable data pack 1, ST-506 drive 0 (drive 3 62) and ST-506 drive 1 (drive 4 64).

SEEK LOW (5XH): This command specifies the lower four bits (X) of the cylinder to which a drive is to seek on the next seek command.

SEEK MIDDLE (6XH): This command specifies the middle four bits (X) of the cylinder for a subsequent seek command.

SET MODE (7XH): This is a mode command determining whether an interrupt is to be generated at completion of a command where X is represented as binary S00I. This command causes the interrupt request from the digital control processor 154 to be suppressed. S=1 commands return of the current mode setting. S=0 commands setting of the interrupt enable with bit zero or I. If I is set to zero, no interrupt is executed while interrupts are allowed if I is set to one.

SEEK N (8XH-BXH): This command specifies the high three bits of the cylinder position for a seek that will be started on drive unit N, where N is the drive unit number. X is represented as binary 1XXX or 0XXX for the three most significant address bits. The fourth bit is zero for a read seek and a one for a write seek. Different read and write seeks are implemented because a read seek can be executed before the seek complete signal has returned. This allows a faster access to the data because a read seek can be completed without allowing additional time delay for fine positioning head settling time. If errors are produced in reading a commanded sector because head settling has not been completed, the sector is merely reread on the next revolution of the disk and no harm is done. However, on a write to the disk, the head must be settled on the correct track before writing to avoid destroying data on adjacent tracks because of erroneous positioning. The middle and lower bytes of a destination cylinder must be set using the SEEK LOW and SEEK MIDDLE commands before issuing the seek end command. The write seek completion interrupt will occur only after the head is fully on track subsequent to head settle time. Consistent with previous designations, N=0−3. designates RDP0, RDP1, ST-506 drive 0, and ST-506 drive 1.

INTERROGATE RECEPTACLE PRESENT STATUS (CXH): This command is used to determine whether or not a removable data pack 24 is present. The command C0H interrogates receptacle 0 while the command C1H interrogates receptacle 1. After issuing a CXH command, bit 3 of the status port returns 0 (no error) if the corresponding receptacle is present. If the receptacle is not present, bit 3 of the command status port is set to 1 (error).

RESET DISK SYSTEM (DXH): This command will reset the entire drive system of the removable data pack 24 designated by X−0 or 1 or both if X=2 or 3. This command may take more than 20 seconds for completion and should therefore only be used for fatal error recovery.

TEST REMOVABLE DATA PACK ID BIT (EXH): This command tests the state of a bit of the identification byte of the removable data pack specified by X. The state of the nth bit of the ID byte is returned in the command/status bit of the status register (read results in bit 3 of port 586H). Thus, bit 3 of port 586 reflects the state of the requested bit in the ID byte of the specified data pack. The command format is EXH where X xxxD. Thus, bits 3, 2 and 1 represent an encoded binary value designating the bit to be tested and bit position 0 or D defines the removable data pack 0 or 1 to which the identification byte pertains. Thus, to read the state of bit 6 of ID byte of removable data pack 1, the command format to write to port 586H is 0EDH.

TEST CONTROLLER REVISION BIT (FXH): This command tests the state of a bit of the controller revision word specified by X. The state of the nth bit of the two bytes is returned in the command/status bit of the status register (read results in bit 3 of port 586H). The command format is FXH where X is the bit position within the controller revision word. The controller revision word indicates the revision level of the digital control processor 154 firmware for use by the data processing system 40 basic input/output system (BIOS). This command causes the interrupt request from the digital control processor 154 to be suppressed.

In addition to the data interchange buffers and registers, the system bus interface 152 includes I/O address decode logic 190 and timing and control logic 192 which provides miscellaneous timing and control functions for the digital board 48.

Differential read data from the selected head of RDP0 and RDP1 is presented to analog multiplexer 200 which sends the selected data to a pulse detector and synchronizer circuit 202. At the pulse detector and synchronizer circuit 202 the differential data is converted to a single-ended TTL digital signal and communicated to a digital multiplexer 204 which passes onto a phase-locked loop 206 either the selected RDP read signal, a read signal from the selected ST-506 drive, or a 7.5 MHz clock signal which keeps the phase-locked loop 206 locked into the correct clocking rate even when no data is present. Phase-locked loop 206 separates the received data into separated read data and read clock signals which are utilized by disk controller 182 to convert the RLL (2,7) encoded data from the drive into 8-bit bytes of binary coded data. When writing, disk controller presents write data to a write data latch 208 which synchronizes the data to the write clock signal and provides data output to either the removable data pack or one of the ST-506 drives.

Disk Controller 182

The disk controller 182 performs all of the data transfer functions between a selected disk drive and the ram sector buffer 176. Disk controller 182 accepts command/status bytes from the data processing system 40 over system bus 42 at I/O ports 582H and 583H. As with the ram buffer controller 172, I/O port address 582H may be used to read status or write an address which selects one of many internal registers which then may be accessed through I/O port address 583H.

Disk controller 182 thus accepts command and status bytes from the data processing system 40 to provide the appropriate controls for data transfer between the drive interface and the sector buffer 176. The signals sent to the drive interface include read gate, write gate, and write data. Control signals index, seek complete track 0, ready, and drive selected are input to the disk controller 182 from the drive interface. The set head line is used to strobe an external head select latch 180 after data processing system 182 has written the required byte value onto RB 166. The set drive, direction and step lines on the disk controller 182 are not routed to the drive interface. Instead, the 8049 digital control processor 154 is programmed to perform these functions. The step line from the disk controller 182 is used to reset the digital control processor 154 after power on reset so that the device will begin execution in a known state. The internal phase discriminator of disk controller 182 is not used in this implementation but is implemented externally as phase locked loop 206. The disk controller 182 contains RLL and MFM encoding options, encoding and decoding logic as well as options for error detection and correction logic. In the present embodiment only RLL (2,7) encoding is utilized and the disk controller 182 is programmed to perform 56-bit ECC on the data field and 16-bit CRC on the sector identification but could be programmed to perform otherwise if desired. An external 15 MHz clock source feeds the crystal input of the disk controller. Disk controller 182 cannot be reset independently of the system.

The disk controller 182 performs track format control by means of 23 programmable registers. The length of the sector fields and contents of address marks and identifier bytes are programmed into the format registers. The registers and typical field values are described below. The data lines and the least significant bit address signal A0 are decoded to select a read/write operation and the register address or status port to be utilized.

The status byte read at I/O port 582H is bit mapped with the following significance in sequence from most significant bit 7 to least significant bit 0. The bit positions correspond to controller busy (7), disk operation in progress (6), write gate (5), data requested (4), data available (3), seek complete (2), track zero accessed (1), and error (0). The register address written at I/O port 582H indicates auto-increment at the most significant bit position 7, disk data at bit position 6, and register address signals A5-A0 at bit position signals 5-0. When the auto-increment bit is set to 1, the internal register address A5-A0 will be automatically incremented after each register is read or written. There are two exceptions to automatic increment, there is no increment after writing the step register at address 9F and there is no automatic incrementing after reading or writing the data register at address C0. I/O port 583H reads or writes an 8-bit byte of data that pertains to one of the register locations selected by address A5-A0.

Although other recording formats could of course be utilized, the present embodiment writes on each track starting with the rising edge of the index pulse 26 consecutive sectors which each store 512 bytes of data. Although 26 sectors are formatted onto each track, only 24 sectors on each track are actually used for active storage of data. The additional two sectors are utilized as spares and substitute for any of the first 24 sectors which might contain a disk surface defect. Since the disk controller 182 and related hardware are sufficiently fast to consecutively read all sectors without interleaving, the active 24 sectors on each track are numbered with a sector identification byte consecutively from zero to 23 in noninterleaved fashion. If a defective sector is encountered, the sector identification code is set to the normal sequential code plus 32 to indicate an invalid sector and the normal sequential numbering system continues with the following sector. If one defective sector is found on a track, the first spare sector then becomes the final active sector 23. If two defective sectors are found on the track then the last spare sector becomes the final active sector 23. By guaranteeing that each track contains 24 complete and valid sectors, the system can guarantee high speed data access for every track with no need for a long delay for a seek operation to access data that has been relocated on a different track.

Although other recording formats could of course be used, in the present embodiment each sector contains the following fields in sequence: an ID phase locked loop lock-on field containing 3 bytes of 00H, a 15-byte pre-ID sync field containing 00H, an 8-byte ID field, a post-ID field containing 3 bytes of 00H, a data read skew field containing 3 bytes of 00H, a data phase locked loop lock-on field containing 3 bytes of 00H, a pre-data sync field containing 15 bytes of 00H, a 521-byte data field, a post-data field containing 3 bytes of 00H, an intersector gap field containing 15 bytes of 00H. The first sector is preceded by a post-index gap field containing 16 bytes of 00H. The last sector is followed by a pre-index gap field containing as many bytes of 00H as are required to fill the field up to the incurrence of the index signal. The ID field contains an address mark set to 4BH, an ID identification byte set to FEH, a 4-byte ID area containing in sequence the cylinder high address byte, cylinder low address byte, head number, and the sequential sector number for the given track. Two bytes of ID CRC data follow the ID area and complete the ID field. The data field contains a 1-byte data address mark set to 4BH, a data identification byte set to F8H, a data area storing the 512 bytes of user data and then 7 bytes of ECC data. Disk controller 182 turns on the write gate signal at the beginning of the data phase locked loop lock-on field and turns it off at the end of the 7 bytes of ECC data. The read data signal is turned on at the beginning of the ID identification byte and turned off before the end of the data read skew data field. Read gate is then reasserted before the end of the data phase locked loop lock on field and remains asserted through the end of the user data field.

Bit 7 of the status byte read at I/O port 582H is the controller busy bit with a 1 indicating that either a disk read or a write is in progress or that the controller is still working on the last byte written or is incrementing the register address. Bit 6 is set to 1 to indicate a disk operation in progress. If bit 6 is high, a disk read/write operation is in progress. Bit 5 is the write gate signal and reflects the current state of the write gate pin of disk controller 182. When high it indicates that the controller is writing to a drive. Normally, registers should not be changed while writing to a drive. Bit 4 is a data request bit and when set to 1 indicates that the controller requires a byte to be written into the disk data register. It is intended for non-DMA data transfers with the RAM buffer controller 172 which are not supported in the present configuration. Bit 3 is a data available bit and indicates that there is a byte for the post-processor to read from the disk data register. Again, it is intended for use with non-DMA data transfers which are not supported in the present configuration. Bit 2 is a seek complete bit and reflects the state of the pin on disk controller 182 that is attached to the seek complete line from the drive interface. If seek complete is high, bit 2 will be high. It is an input that indicates the selected drive has completed any head positioning sequence when it is low. Bit 1 is the track zero bit and reflects the state of the pin on the disk controller 182 that is attached to the track zero line from the drive interface. If the signal on this pin is high, bit 1 will be high. It is an input that indicates the selected drive is at track zero when it is low. Bit zero is the error bit. This bit is set whenever any bits in the CONTROLLER STATUS REGISTER (05H) are set. It is the logical OR of the CONTROLLER STATUS REGISTER bits and may be used by the host to quickly check successful completion of a command. This bit is reset when a new command is written into the DISK OPERATION REGISTER (3FH).

There are 64 available register addresses in the disk controller 182 which are addressed by port 582H. However, only 41 are used. These registers are selected by writing the address of the register to be accessed to the register select port at 582H, and then writing the value to be placed in the register to port 583H. Some of the register values can be read by writing the address of the register to be accessed to port 582H, then reading port 583H. The register select port acts as a pointer to the register to be accessed. There are 35 write registers for disk initialization and commands are 8 read registers for current disk status.

The POST INDEX GAP LENGTH REGISTER is accessed at non-incrementing address 00H or auto-incrementing address 80H. This register sets the number of bytes placed after the index pulse and before the ID PLL lock-on bytes. This space is filled with 00H. For typical RLL encoding the length of this field is set to 17 bytes by writing 10H to this register.

The ID PLL LOCK-ON FIELD LENGTH REGISTER is at non-incrementing address 01H or auto-incrementing address 81H. Read gate starts at the beginning of this field and allows the PLL to lock on to the read data. The length of the ID PLL lock-on field is set to 3 bytes by writing 002H to this register.

The PRE-ID SYNC FIELD LENGTH REGISTER is at nonincrementing address 02H or auto-incrementing address 82H. The search for ID address mark begins in this field. The space is filled with 00H. The length of this field is set to 15 bytes by writing 00EH to this register.

The ID ADDRESS MARK FIELD LENGTH REGISTER is accessed at non-incrementing address 03H or auto-incrementing address 83H. This register is used for soft sectored media so that the disk controller 182 can identify the start of the ID field. Address marks in an RLL encoding scheme use an illegal sequence violating the RLL (2,7) rule of 2 to 7 zeros between flux reversals. The sequence is 2 bytes long and the value is stored in the ADDRESS MARK FIRST HALF and ADDRESS MARK LAST HALF REGISTERS, addresses 14H and 15H, respectively. The ID and data address marks are the same. The length of the ID address mark field is set to 1 by writing 00H to this register.

The ID FIELD IDENTIFIER (FE BYTE) LENGTH REGISTER is accessed at non-incrementing address 04H or auto-incrementing address 84H. This register sets the ID field identifier length to 1 byte by writing 00H into this register. This value is fixed. The ID field identifier byte value is set by writing the ID field identifier register 18H.

The ID AREA LENGTH REGISTER has a non-incrementing address of 05H and an auto-incrementing address of 85H. The ID information is 4 bytes long and contains the high byte of the cylinder number, the low byte of the cylinder number, the head number and sector number. The combined length of this field is set to 4 bytes by writing 03H to this register.

The ID CRC/ECC FIELD LENGTH REGISTER is accessed at non-incrementing address 06H or auto-incrementing address 86H. The CRC field contains the 2 CRC bytes for the ID data. This register sets the field length to 2 by writing 01H to this register. This could also be set to 4 bytes for 32-bit ECC or 7 bytes for 56-bit ECC.

The POST-ID FIELD LENGTH REGISTER at nonincrementing address 07H or auto-incrementing address 87H, sets the length of the post-ID field to 3 bytes by writing 02H to this register. This field contains zeros It is required to insure proper recording and recovery of the last bits of the ID CRC field. On write data operations, the write gate goes active at the end of this field.

The DATA READ SKEW FIELD LENGTH REGISTER is accessed at non-incrementing address 08H or auto-incrementing address 88H. On read data operations the read gate goes active at the end of this field The field is intended to allow the phase locked loop to skip over the write splice area before it begins trying to lock onto the read data. This is necessary to resynchronize the PLL on the transition between writing the ID fields and reading the previously recorded data on a sector because the media will have flux transitions offset from the previously-recorded transitions. This is referred to as the write splice area. The length of the data read skew is set to be longer than the write splice area. The length of this field is 3 bytes which is set by writing 02H to this register.

The DATA PLL LOCK-ON FIELD LENGTH REGISTER is accessed at non-incrementing address 09H or auto-incrementing address 89H. This field occurs at the point in the sector format where the read gate goes active after the read data skew field, so the read gate will be synchronized with the read data. The length of this field is 3 bytes which is programmed by writing 02H to this register The PRE-DATA SYNC FIELD LENGTH REGISTER is at nonincrementing address 0AH or auto-incrementing address 8AH. The search for data address mark starts with this field. This space is filled with 00H. The length of this field is set to 15 bytes by writing 0EH to this register.

The DATA ADDRESS MARK FIELD LENGTH REGISTER is accessed at non-incrementing address 0BH or auto-incrementing address 8BH. This field is used on soft sectored media so that the disk controller 182 can identify the start of the data field Address marks in an RLL (2,7) encoding scheme use an illegal sequence violating the requirements of 2-7 zeros between flux reversals. The sequence is 2 bytes long and the value is stored in the ADDRESS MARK FIRST BYTE and ADDRESS MARK LAST BYTE registers, at addresses 14H and 15H respectively. The ID and data address marks are the same. The length of the data address mark field is set to 1 by writing 00H to this register.

The DATA FIELD IDENTIFIER (F8 BYTE) LENGTH REGISTER is accessed at non-incrementing address 0CH or auto-incrementing address 8CH. This register sets the data field identifier length to 1 byte. This value is fixed by writing 00H to this register.

The data field identifier byte value is set by writing to the DATA FIELD IDENTIFIER register at address 19H.

The DATA FIELD LENGTH (LOW BYTE) REGISTER is accessed at non-incrementing address 0DH or auto-incrementing address 8DH. This register stores the low byte of the sector length data byte count. The total data field byte count is obtained by combining low and high bytes together. For example, for the RLL controller this value is set to 512 bytes by writing FFH to this register and 1H to the DATA FIELD LENGTH (HIGH BYTE) REGISTER. On each sector data transfer, 512 data bytes will be transferred. If the data occupies less than 512 bytes, the field will be padded with zeros. The combined length of the high and low data field length bytes must equal 512 minus 1.

The DATA FIELD LENGTH (HIGH BYTE) REGISTER is accessed at non-incrementing address 0EH or auto-incrementing address 8EH.

The DATA ECC FIELD LENGTH REGISTER is accessed at non-incrementing address 0FH or auto-incrementing address 8FH. This field stores the 7 bytes of ECC for the data. This register sets the field length to 7 by writing 06H to this register. This register can be set to a length of 2 bytes for CRC checking of the data field or 4 bytes for 32-bit ECC checking of the data as alternatives to the 7-byte ECC that is actually used.

The POST-DATA FIELD LENGTH REGISTER is accessed at non-incrementing address 10H or auto-incrementing address 90H. Data writes stop at the end of the field. This register sets the field length to 3 by writing 02H to this register.

The INTERSECTOR GAP LENGTH REGISTER is accessed at non-incrementing address 11H or auto-incrementing address 91H. This field provides a separation between each sector to allow for speed tolerances, write to read recovery time (time between deassertion of write gate and assertion of read gate), head switching time, and controller decisionmaking time between sectors and variations in detecting index. This register sets the field length to 16 bytes by writing 0FH to this register.

The SECTORS PER TRACK REGISTER is accessed at nonincrementing address 12H or auto-incrementing address 92H. This register is set to the number of sectors per track which is 26 sectors for RLL (2,7) coding by writing 019H to this register.

The ID START LOCATION REGISTER is accessed at nonincrementing address 13H or auto-incrementing address 93H. This register is set to specify which internal registers follows the ID identifier byte (FE byte) register in the ID field. Available options include 00 to cause the next byte following the FE byte to be FE, 01 to cause the next byte to be cylinder high, 02 to cause the next byte to be cylinder low, 03 to cause the next byte to be the head byte, 04 to cause the next byte to be the sector byte or 05 to cause the next byte to be the sector size byte. In the present embodiment, this register is set to 01H so that the high byte of the cylinder number follows the ID field identifier byte. 01H is thus written to this register. Unlike other registers the actual intended value is written to this register.

The ADDRESS MARK FIRST BYTE REGISTER is accessed at non-incrementing address 14H or auto-incrementing address 94H. This field is used on soft-sectored media so that the disk controller 182 can identify the start of the data field. The address marks in an RLL (2,7) encoding scheme use an illegal sequence violating the requirement of 2 to 7 zeros between flux reversals. The sequence is 2 bytes long, and the value is stored in the ADDRESS MARK FIRST BYTE and ADDRESS MARK LAST BYTE REGISTERS. This register contains the first byte of the encoded address mark. The ID and data address marks are the same. The first byte of the address mark is assigned a value of 01H by writing 01H to this register.

The ADDRESS MARK LAST BYTE REGISTER is accessed at non-incrementing address 15H or auto-incrementing address 95H. This register contains the value of the second byte of the encoded address mark, which is set to 08H by writing 08H to this register.

The recording code register is accessed at nonincrementing address 16H or auto-incrementing address 96H. The bit pattern for the recording code register controls the recording mode. In the present embodiment, this register is set to 27H for RLL (2,7) encoding with ECC data checking, RLL (2,7) encoding pulse read data and NRZ write data. Bits 7 and 6 contain 2 bits of binary coded data with 00 indicating NRZ write data, 01 indicating NRZI-write data, 01 indicating pulse write data and 11 being invalid. Bits 5 and 4 contain 2 bits of binary coded data with 00 indicating NRZ read data, 01 indicating NRZI-read data, 01 indicating pulse read data, and 11 being invalid. Bits 3 and 2 and 1 contain 3 bits of binary coded data with 000 representing unencoded data, 001 representing FM data, 010 representing MFM data and 011 indicating RL (2,7) encoded data. The least significant bit, bit 0 is set to zero for CRC and to 1 for ECC on the data field.

The CLOCK DIVIDER REGISTER is accessed at nonincrementing address 17H or auto-incrementing address 97H. The clock divider can divide the internal phase lock oscillator frequency from 1 to 256. Since the internal phase locked oscillator is not used in the RLL controller, this register is not used and 00H is written to this register in the present embodiment.

The ID FIELD IDENTIFIER (FE BYTE) REGISTER is accessed at non-incrementing address 18H or auto-incrementing address 98H. This byte is used to identify an ID field and is set to FEH by writing FEH to this register. The length of this field is set to 1 byte by the ID FIELD IDENTIFIER LENGTH REGISTER.

The DATA FIELD IDENTIFIER (F8 BYTE) REGISTER is accessed at non-incrementing address 19H or autoincrementing address 99H. This byte is used to identify a data field and is set to F8H by writing F8H to this register. The length of this field is set to 1 byte by the DATA FIELD IDENTIFIER LENGTH REGISTER.

The SECTOR SIZE REGISTER is accessed at nonincrementing address 1AH or auto-incrementing address 9AH. This register is used for defining sector size for floppy disks. This register is not used in the present embodiment.

The SECTOR OPTIONS REGISTER is accessed at nonincrementing address 1BH or auto-incrementing address 9BH. The disk controller 182 can handle soft or hard sectored disks. In the RLL (2,7) controller, this register is set for soft sectoring (index pulse not required for each sector with variable length sectors). Thus, this register is set to 00H in the present example. Bits 7-2 are not used and bits 1 and 0 contain binary coded data with 00 indicating soft sectored, 01 indicating hard sectored, 10 indicating ESDI address marks, and 11 indicating ESDI byte clocks.

The DIRECTION REGISTER is accessed at nonincrementing address 1EH or auto-incrementing address 9FH. This register is not used in the current embodiment.

The RESET RECEPTACLE REGISTER is accessed at nonincrementing address 1FH or auto-incrementing address 9FH. This is the register that controls the reset of the digital control processor 154. The digital control processor is reset by writing 01H to this register. This causes the −STEP line to go high and reset the digital control processor 154. Writing 00H to this register raises the reset line to inactive high and releases the digital control processor 154 from the reset condition. A pulse on the reset line should be at least 10 milliseconds wide to insure proper operation of the digital control processor 154.

The CYLINDER HIGH REGISTER is accessed at nonincrementing address 38H or auto-incrementing address B8H. This register should be written with the high 8 bits of the cylinder number. The disk controller 182 will support up to 1,024 cylinders. This register value together with the cylindered low value and the head value are used by the disk controller 182 to write and search for sector identification information.

The CYLINDER LOW REGISTER is accessed at nonincrementing address 39H or auto-incrementing address B9H. This register should be written with the low 8 bits of the cylinder number.

The HEAD REGISTER is accessed at non-incrementing address 3AH or auto-incrementing address BAH. This register should be written with the head number. The head number is binary encoded. The head number is placed on the data bus by the disk controller 182 and latched externally by the −SETHD signal, which is programmed by writing the head select register at address 3DH or BDH. Up to 16 heads can be selected (4 in the present embodiment). The binary value of this register (3DH) specifies one of 16 heads used to read or write data in a ones-complement or inverted format. Bits 7-4 are not used while bits 3-0 are used to identify one of 16 heads designated 0-15.

The SECTOR REGISTER is accessed at nonincrementing address 3BH or auto-incrementing address BBH. This register should be written with a sector number. On a multi-sector operation, this register is incremented after each sector is read or written. The present value of this register may be read from address location 07H.

The TRANSFER COUNT REGISTER is accessed at nonincrementing address 3CH or auto-incrementing address BCH. This register is loaded with a number of sectors selected for data transfer minus 1. On a multi-sector operation, this register is decremented after each sector is read or written. The present value of this register may be read from address register location 06H. The head selected register is accessed at non-incrementing address 3DH or auto-incrementing address BDH. When this register is written the external minus set head pin strobes low to latch the head number that has been programmed into the disk controller 182 head register at register location 3AH or BAH.

The DRIVE SELECT REGISTER is accessed at nonincrementing address 3EH or auto-incrementing address BEH. Where this register is written, the external −SETDRIVE pin strobes low. This function is not used in the present embodiment. It is alternatively implemented by programming the digital control processor 154 port to select the drives. The drive select lines are latched externally and strobed by the digital control processor 154 write line.

The DISK OPERATION REGISTER is accessed at nonincrementing address 3FH or auto-incrementing address BFH. Writing to this register starts or stops disk read or write operations. The commands most commonly used are 00 stop disk operation, 80 A0 operation, 81 write data, 82 read data, 83 read ID, 84 write first sector, 85 write next sector, 86 format write interleaved, 87 format write sequential, 8B verify data, 8C read long, 8D write long.

The DATA TO/FROM DISK REGISTER is accessed at nonincrementing address 40H. This register is not used in the present embodiment.

The disk controller read registers will now be described. The registers at non-incrementing addresses 00-03 or auto-incrementing addresses 80-83 are not used.

The 7 ECC syndrome bytes 0-6 are accessed at nonincrementing addresses 09H through 0FH or auto-incrementing addresses 89H through 8FH. These bytes indicate the results of checking for errors when using a 56-bit ECC algorithm. These bytes will be all zeros if there are no errors. A 1 in any bit indicates an error in that bit.

32-bit ECC syndrome bytes 0-3 are accessed at nonincrementing addresses 0CH through 0FH or auto-incrementing addresses 8CH through 8FH. These bytes indicate the results of checking for errors when using a 32-bit ECC algorithm. These bytes will be all zeros if there are no errors. A 1 in any bit indicates an error.

CRC bytes 0 and 1 are read at nonincrementing addresses 0EH-0FH or auto-incrementing addresses 8DH-8FH. These bytes indicate the results of checking for errors using a CRC algorithm. These bytes will be all zeros if there are no errors. A 1 in any bit indicates an error in that bit.

DISK STATUS is read at nonincrementing address 04H or auto-incrementing address 8EH. The disk status byte is bit mapped with bit 7 being the −DRIVE_SELECTED bit. When low, this bit indicates that a drive has been successfully selected. This bit directly reads the logic level on the −DRIVE_SELECTED pin of the ST-506 bus. Bit 6 is the −READY bit. When low, this bit indicates that a drive is up to speed and ready for a read or write. This bit directly reads the logic level on the −READY input pin. Bit 5 is the +SECTOR_ADDRESS_MATCH bit. This bit is high when a sector ID matches the value that was written to the sector address registers during a read or write operation. The sector address registers include the CYLINDER HIGH and CYLINDER LOW, HEAD and SECTOR REGISTERS. Bit 4 is the +LAST_SECTOR_ON_TRACK bit. This bit is high when accessing the last sector on a track. This occurs when the sector number in the ID field is equal to the number of sectors per track or 26. Bits 3-0 represent a binary-coded field counter indicating the present location of the heads on the track. The field count is 0 for inter-record gap or post-index gap, 1 for ID PLL LOCK-ON, 2 for PRE-ID, 3 for ID address mark, 4 for FE, 5 for ID, 6 for ID ECC, 7 for POSTID, 8 for data read skew, 9 for data PLOLOCK-ON, 10 for PREDATA, 11 for data address mark, 12 for F8, 13 for data, 14 for DATA ECC, and 15 for POST-DATA.

The CONTROLLER STATUS byte is read at nonincrementing address 05H or auto-incrementing address 85H. This byte is bit mapped with seven bit 7 indicating +NO_RECORD_FOUND. When set high, this bit indicates that on a read or write to the controller failed to find an ID field that matched with the sector address registers. Bit 6 is the +MISSING_DATA_ADDRESS_MARK (F8 miss compare) bit. This bit is high if the byte after the data address mark does not match the contents of register 19, the data field identifier byte, indicating that a data field probably does not exist. Bit 5 is the +ID_ECC/CRC_ERROR bit. When set high, this bit indicates that a read/write of or to an addressed sector found the ID field CRC bytes to be an error. Bit 4 is the +DATA ECC ERROR bit. When set high, this bit indicates that a read of the addressed sector has found the data field ECC bytes to be an error. Bit 3 is the +DATA_MISMATCH bit. When set high this bit indicates that the verify command has stopped with a data mismatch error. Bit 2 is the +DATA_TRANSFERRED_STOPPED (stop received) bit. When set high this bit indicates that during a read or a write the DMA stop pin was activated and that the transfer has stopped. Bit 1 is the +OVERRUN/UNDERRUN bit. This bit indicates that data was not transferred to or from the controller quickly enough for the internal disk controller 182 serializer/deserializer. Bit 0 is not used.

The TRANSFER COUNT is accessed at nonincrementing address 06H or auto-incrementing address 86H. This register contains the number of sectors remaining (including the current sector) for multiple-sector transfers, and is decremented after each successful sector read or write.

The SECTOR NUMBER REGISTER is accessed at nonincrementing address 07H or auto-incrementing address 87H. This register contains the sector number for the operation that the controller is currently performing. It is incremented after each multiple-sector transfer but is not incremented if an error occurs.

The disk controller commands are used to perform data transfers between the sector RAM buffer 176 and the selected disk by programming the disk controller 182 DISK OPERATION REGISTER. The DISK OPERATION REGISTER is accessed by writing the register address, 3FH for the nonincrementing address and BFH for the auto-incrementing address, to port 582H. The command byte is then written to port 583H. The control registers affected by, or required, for execution of the command must be initialized prior to executing the command. The controller_busy bit on the status port (I/O Address 582H, bit 7) goes not busy (low) when the command has been completed. The error bit in status port (I/O Address 582H, bit 0) must then be checked to verify that the command was executed successfully.

Stop disk operation (00H): this command stops execution of the current command.

No operation (80H): this command causes no disk operation.

Write data (81H): this command writes data from RAM sector buffer 176 into the data field of the sector whose address has been specified in the sector address registers. Multiple sector write operations are possible up to 256 sectors in principle. However, multiple tracks cannot be sequentially written in the present embodiment.

Read data (82H): this command reads data from the data field specified in the sector address registers. The data field is transferred to the sector buffer 176 byte DMA on channel 3 of the RB bus 166. The "F8H" byte immediately following the "clock divider" byte is not transferred, but is checked to insure that a data field is present. At the end of each sector transfer, the transfer count is checked. If the transfer count is zero, the operation stops. If the transfer count is non-zero, the count is decremented, the sector number incremented, and the next sector is read. This process continues until the transfer count goes to zero, the end of track is reached, or an error occurs. The data transfer may be stopped by having end of process (EOP) input signal go low during a DMA cycle. This signal is driven low by the RAM buffer controller 172 when the byte counter of the DMA channel 3 has reached 0. If this occurs, the disk controller will cease data transfer and halt operation at the end of the current sector. Note that the transfer count and sector number will not be changed. The residual TRANSFER COUNT and the SECTOR NUMBER REGISTERS may be read to determine where to continue the transfer operation.

Read ID (83H): this command reads the first ID and ECC/CRC field encountered on the disk. It then transfers both fields to the sector buffer. The ECC/CRC field is checked for errors.

Write first sector (84H): this command begins writing at the index pulse and writes both ID fields and data fields. Information for the ID field comes from the internal sector address registers. Information for the data field is transferred from the sector buffer. Multiple sector writes may be performed. If this command is terminated by the transfer count going to zero, its stops writing at the end of the post data field of the last sector. If terminated by the SECTORS_PER TRACK COUNTER going to zero, it will continue writing the post data field until the next index pulse is reached or until a reset command is received. This command is used to format a track and write data on a single operation.

Write next sector (85H): this command writes at the end of the post data field of the sector whose address is specified by the sector address registers. It writes ID fields as well as data fields. It stops writing at the end of the post data field when the transfer count goes to 0. Multiple sector writes can write up to 256 sectors although a maximum of 26 sectors may be written in the present embodiment. This command may be used to repair the ID field of a damaged sector.

Format write interleaved (86H): this command formats a single track on a disk. It begins writing at index, and continues writing until- the next index. It writes ID fields on the track as specified by a data structure in the sector buffer (5 bytes), consisting of cylinder, high, cylinder low, heat, sector and a data filler byte of information. The data structure is totally programmable and can be interleaved in any manner desired. For each sector written the disk controller will fetch all bytes for the ID field.

Format write sequential (87H): this command formats a single track on a disk. It begins writing at index and continues writing until the next index. It writes all ID and data fields using the information set in the control registers. After each sector is written the sector number is incremented by 1 and the SECTORS_PER_TRACK REGISTER is decremented by 1. When the SECTORS_PER_TRACK REGISTER reaches zero, the last sector is written and the remainder of the track is filler with zeros. No data is transferred to or from sector buffer 176 during this command.

Read data immediate 88H): this command is similar to the read data command (81H). It differs in that the read operation begins at the post index gap. This command is used with the drives that have no index to determine position on the track. Thus with this command the processor is responsible for maintaining track orientation. Up to 256 sectors may be transferred with a single command. This command is not used in the current controller because all transfers utilize the index pulse and this command is for reading data when no index pulse is available to establish position on the track.

Write sector immediate (89H): this command is also a formatting type command in that it writes the ID fields of each sector as well as the data fields. When issued, the track orientation counters are set to the post index gap and the write gate signal goes high immediately. ID information is written from the internal address registers. Data field information is transferred from the sector buffer. The sector number is incremented after each sector is written. Up to 256 sectors may be written by a single command.

Write gap immediate (8AH): when this command is issued the track orientation counter is set to post-index gap and the controller begins immediately writing zeros. Writing continues until index is reached or until this command is terminated by issuing another command or a reset command. This command should not be used for normal operation.

Verify data (8BH): the verify command begins reading data from the disk at the selected sector and compares it to the data transferred from the sector buffer. If the disk data and the data from the sector buffer do not match, this command will terminate with a data mismatch error bit set. Multiple sector verifies may be performed up to 256 sectors.

Read long (8CH): this command is used primarily for checking the ECC and CRC circuitry It reads and transfers to the sector buffer 176 the data field and data ECC field of the addressed sector The ID CRC field and the data ECC fields are checked and error bits are set if not correct. An error in the ID CRC field will not stop the data field from being transferred, but an error in either ECC field will terminate a multiple sector read long command at the end of the post-data field of the sector containing the error. After using the read long command the ECC syndrome registers contain the ECC read from the disk instead of the error bits.

Write long (8DH): write long is used primarily for checking the ECC and CRC circuitry. It writes from the sector buffer the data field and the data ECC field of the address sector. This command permits the creation of errors to assist in testing the error detection circuits An error in the ID CRC field will not prevent writing to the addressed sector.

Reference is now made to FIG. 7 which shows the analog motor control circuits for the drive 0 head positioning stepper motor and spindle motor. A sequence control and ST-506 interface circuit 220 receives RDP control signals and ST506 control signals from the digital section shown in FIG. 6 and responds by generating ST-506 control signals as well as drive and head control signals for the removable drives. Sequence control circuit 220 responds to the drive index signal by generating sample and hold timing signals during the short servo sector time interval that follows the index pulse. A stepper motor controller 222 receives the sample timing signals as well as the read head signals D0RDI+ and D0RDI and sets sample and hold circuits for the A and B track positioning pulses which are sampled in response to the timing signal from sequence and control logic 222. It will be recalled that the A and B pulses are sequentially written within the short servo sector with each being displaced one-half track off center on opposite sides of the track. Fine positioning is thus accomplished by positioning the heads using microstepping such that the received magnitudes of the A and B pulses are essentially equal as read by the data transducer. Stepper motor controller 222 then generates position error signals consisting of course and fine errors signals indicating the degree of off track positioning either radially inward or radially outward. It has been found advantageous to set the fine position error signal to indicate a track misalignment of approximately 3% or more and a coarse position error signal to indicated a track misalignment of approximately 6% or more. These values have sometimes varied slightly with specific implementations. Stepper motor controller 222 also detects the separate track 0 recorded signal and provides to the 8049 position control microprocessor 226 a track 0 signal when the track 0 pulse is detected. The track 0 pulse is recorded at within the narrow servo sector that is prior to the A and B servo blocks. The 8049 position controller microprocessor 226 responds to controller status by issuing drive and brake signals to a crystal controlled spindle driver 228 which in turn generates the three phase analog drive signals for the three phases of the drive 0 spindle motor. Spindle driver 228 also receives the hall effect position data generated by the driven spindle motor so that commutation of the three phase drive windings may occur at the proper time intervals. Spindle driver 228 responds to the brake signal from controller processor 226 to dynamically brake the spindle motor. Dynamic braking of a spindle motor rapidly decelerates the spindle, causing the heads to land quickly in the event that they have not been unloaded prior to deceleration of the disk. The dynamic braking and consequent rapid deceleration of the disk minimizes physical contact and bounce between the heads and the disk to minimize physical damage to the disk surfaces or to the heads.

Position control microprocessor 226 also issues phase control commands to a stepper motor driver 230 which responds by controlling the commutation of the stepper motor two phase drive currents generated as signals coil A and coil B.

Position control microprocessor 226 further responds to the position error signals received from stepper motor controller 222 by generating microstepping offset commands relative to 0 offset step positions. These offset commands are used for fine positioning of the heads and are continued until the position error signals indicate an error of less than approximately 3%. A dual 7-bit, digital to analog converter 232 responds to digital microstepping commands received from position control processor 226 and converts these commands into separate magnitude coil A and magnitude coil B commands for the two phases of the stepper motor. Stepper motor driver 230 receives the magnitude coil A and magnitude coil B commands and converts these to the actual coil A and B drive signal magnitudes which are communicated to the stepper motor.

It should be appreciated that while the analog motor drive circuits are shown in FIG. 7 only for drive 0, the analog board 50 contains a substantially duplicate set of drive circuits for drive 1.

Figure 8:
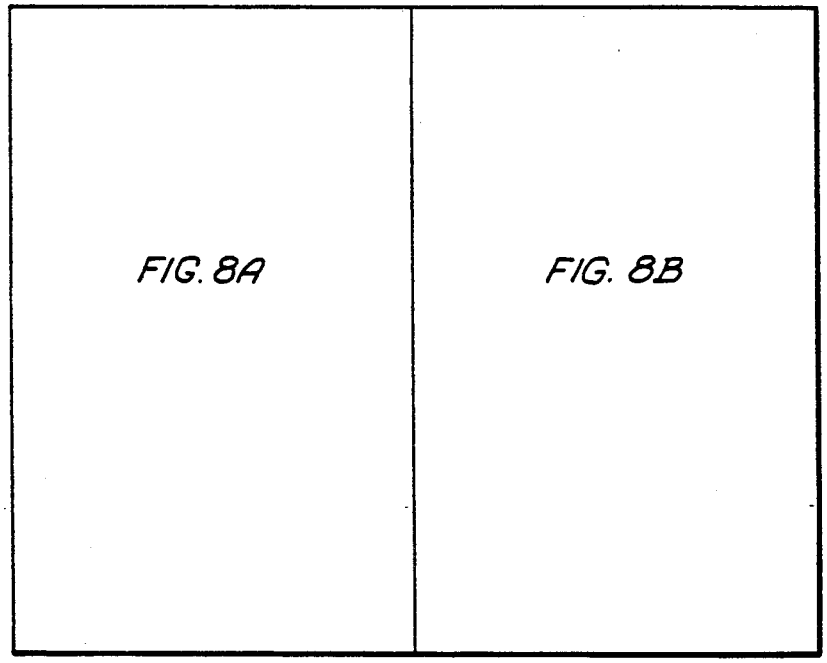
FIGS. 8A and B, 9A and B and 10 provide a block diagram representation of the circuits used on a digital board used in a disk drive controller system in accordance with the invention.
Figure 8A:
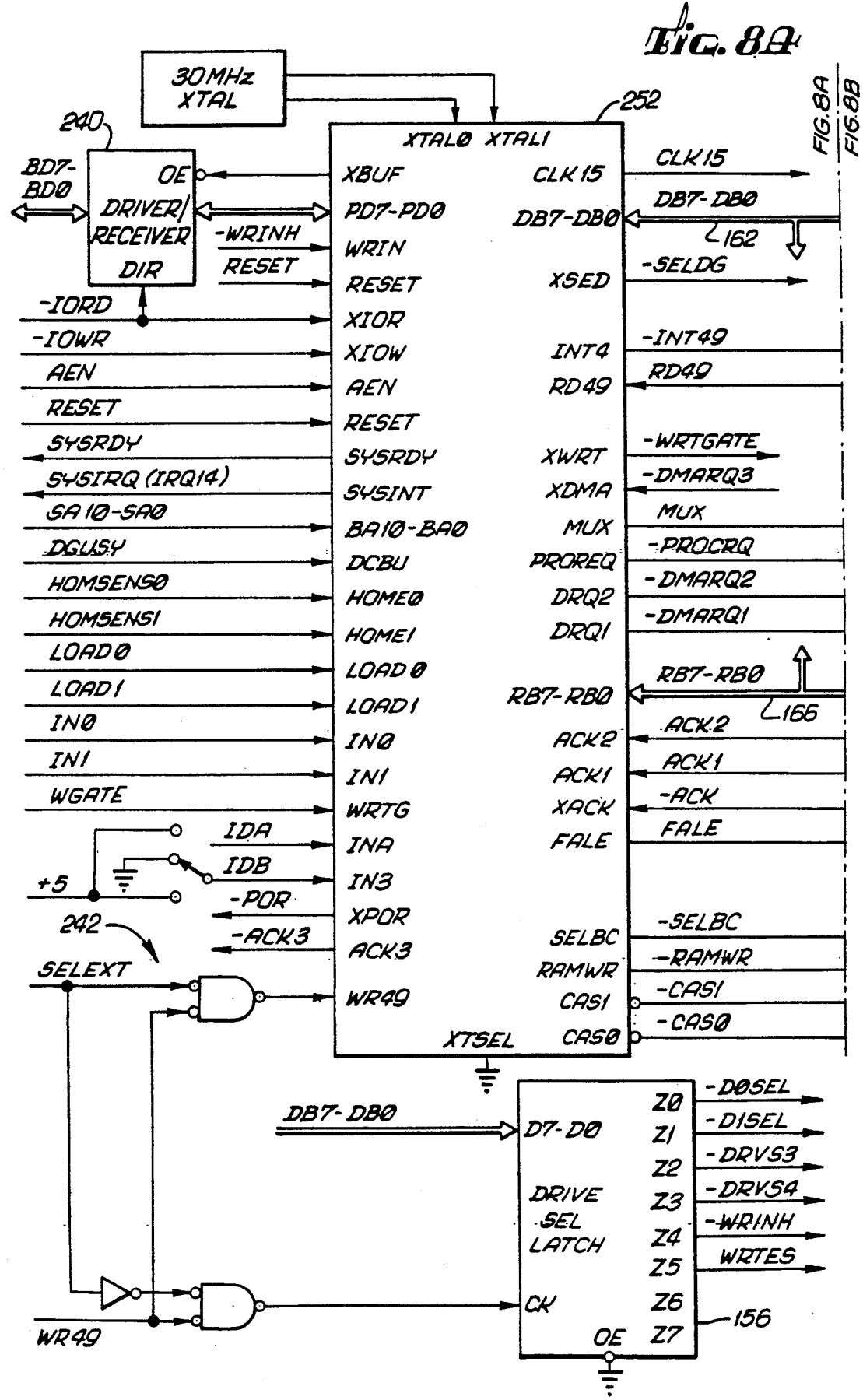
Figure 8B:
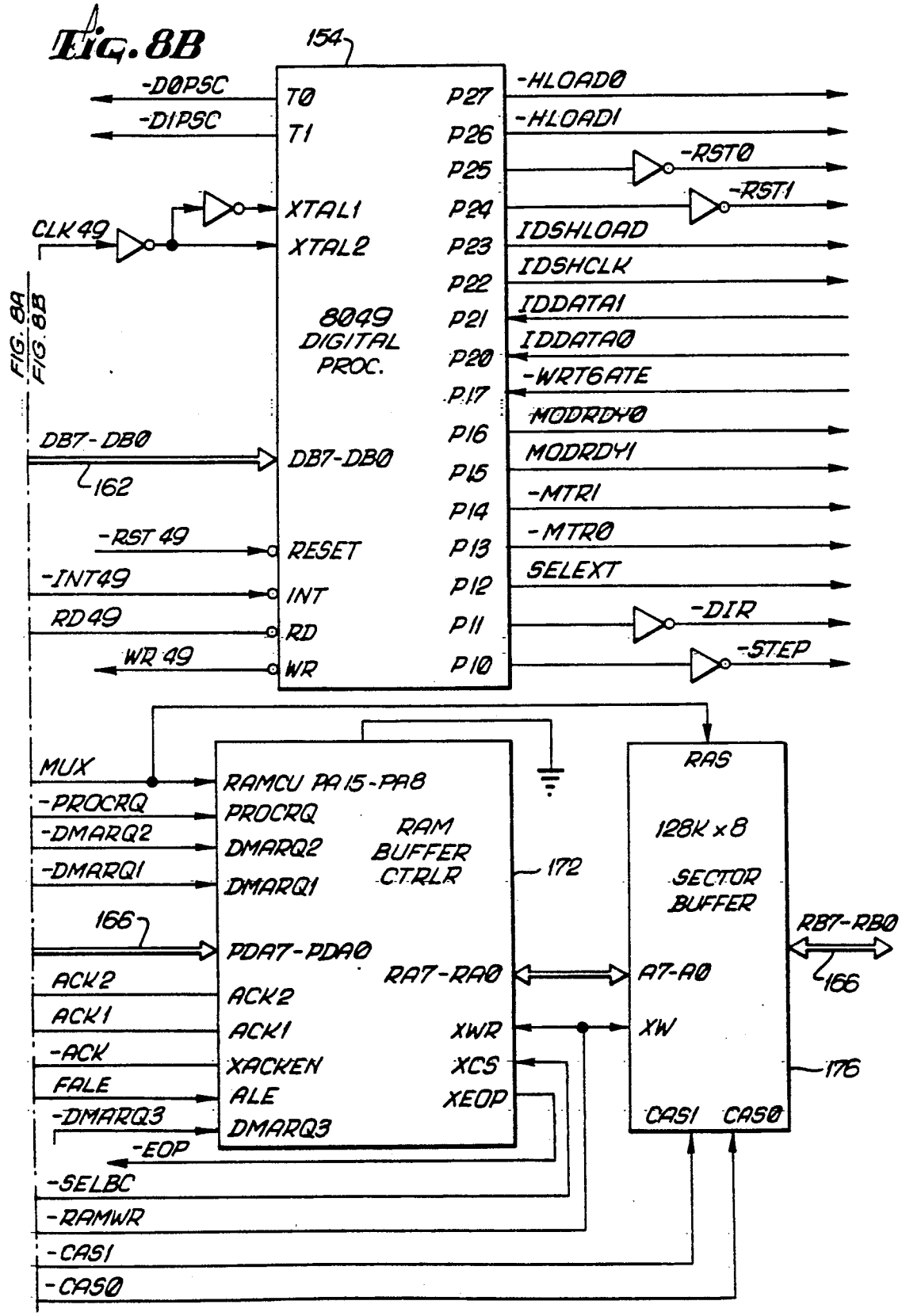
Figure 9:
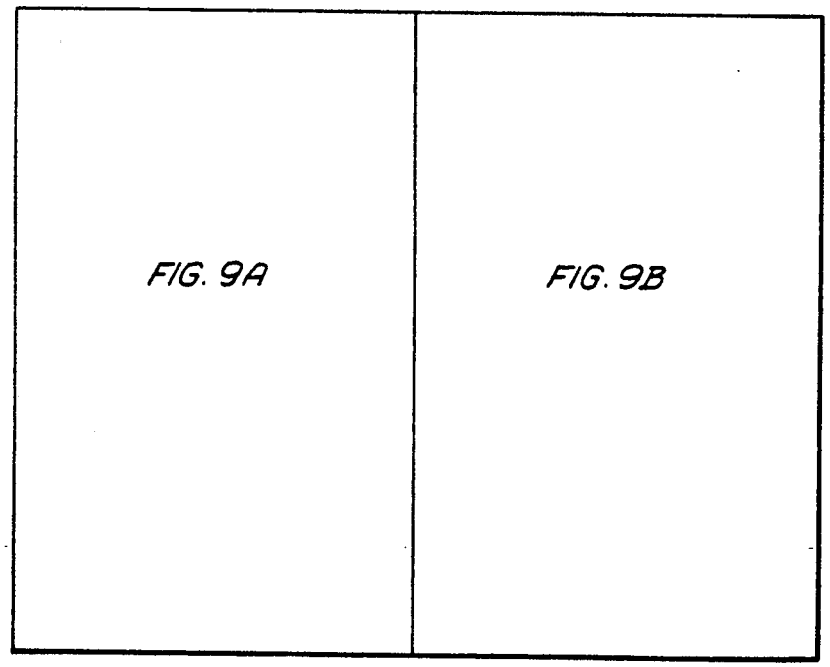
Figure 9A:
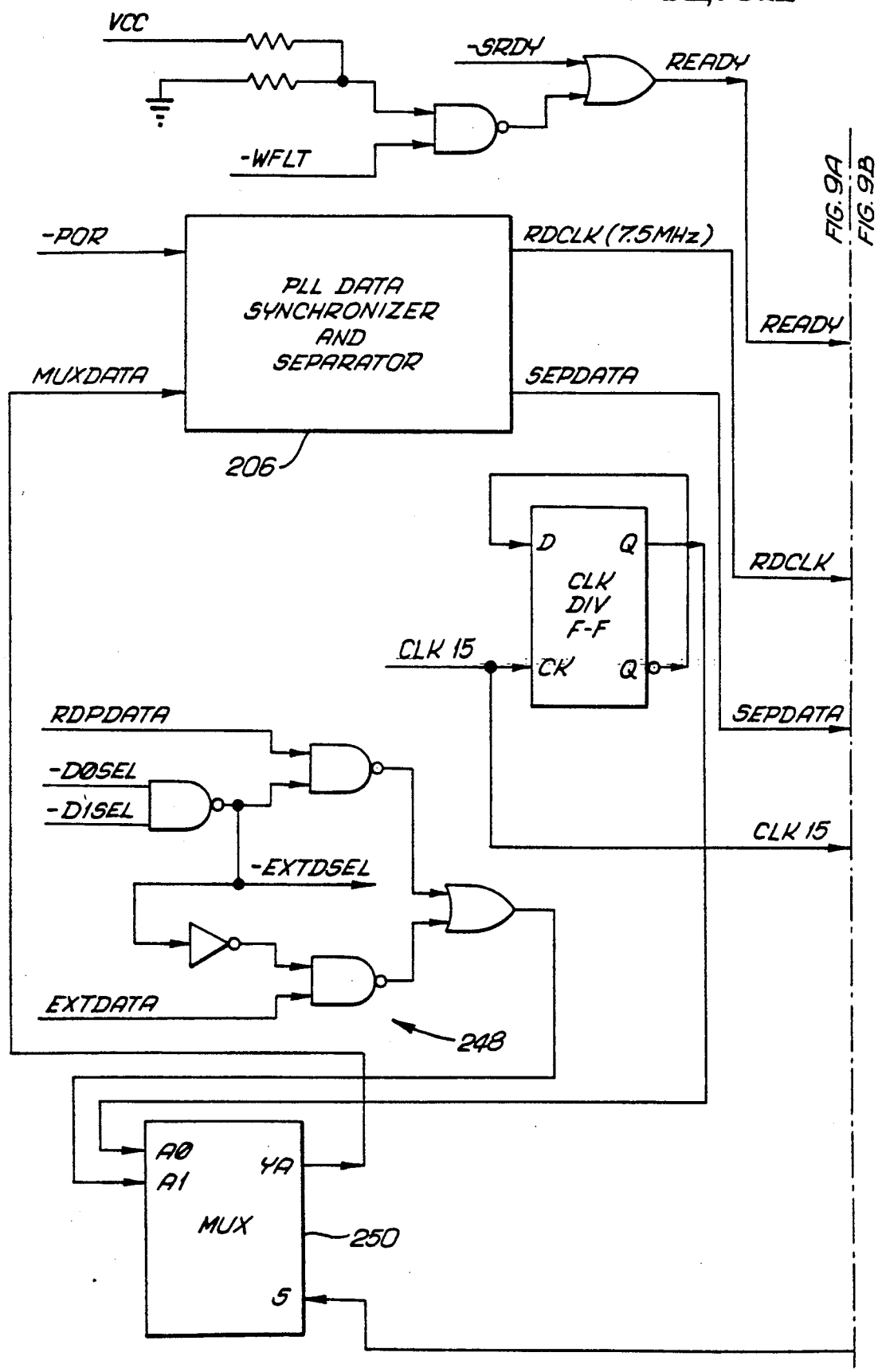
Figure 9B:
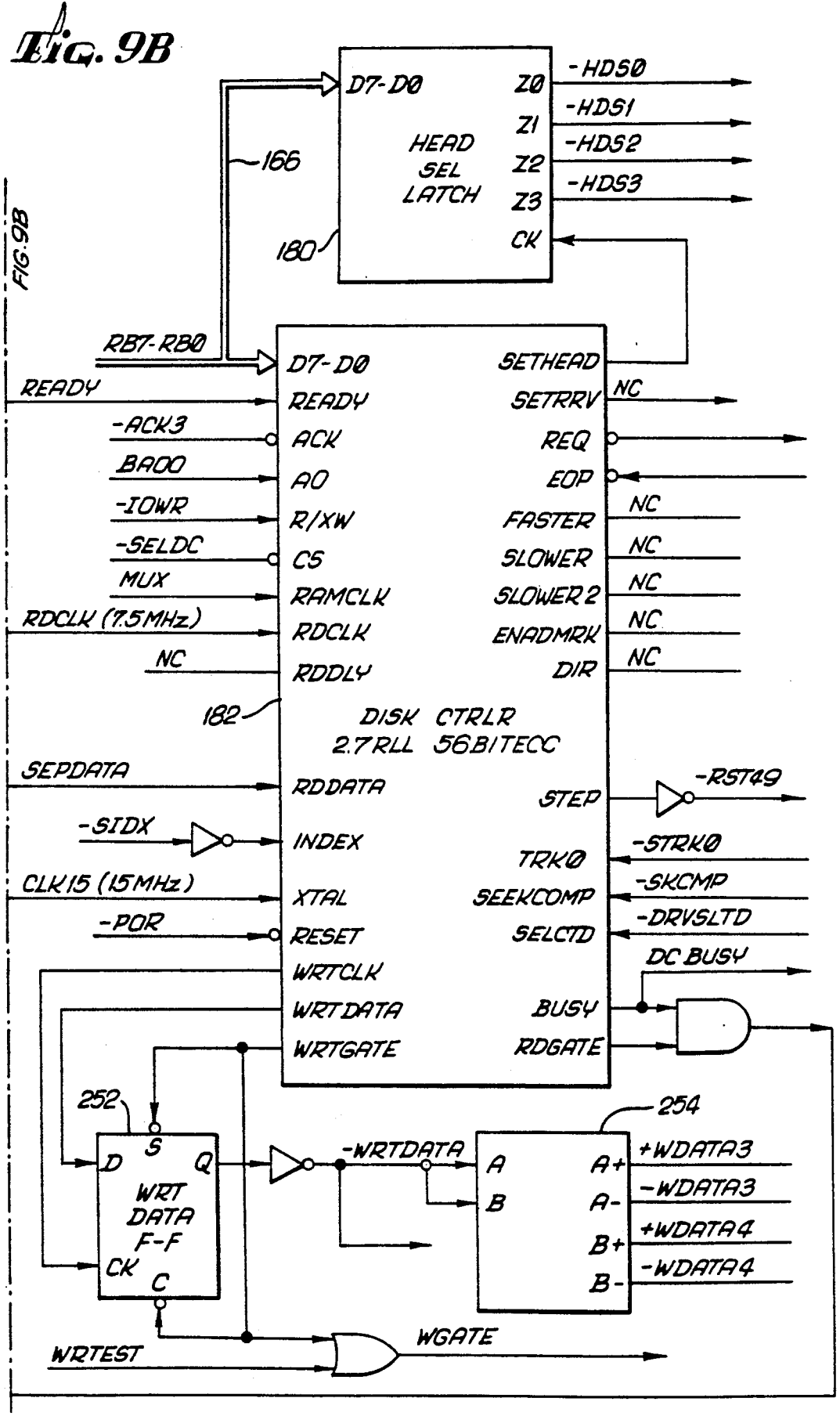
Figure 10:
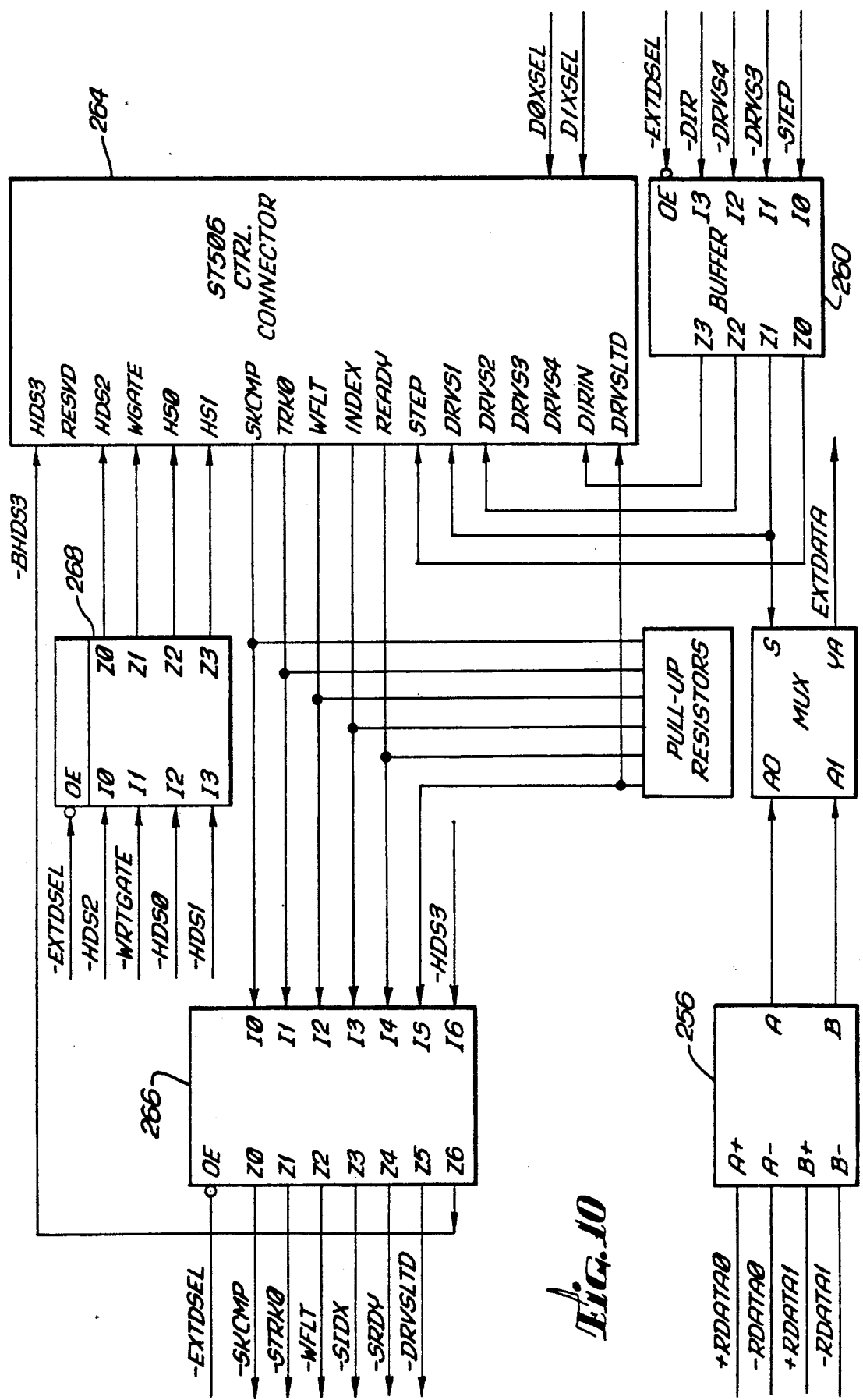

The contents and petitioning of the digital board 48 are shown somewhat more rigorously in FIGS. 8, 9 and 10 to which reference is now made. FIG. 8 shows the system bus interface 152 or glue gate array providing an interface to the system data bus 42 as well as connections the 8049 digital processor 154 and the RAM buffer controller 172. System bus data signals BD7-BD0 are communicated through a driver/receiver 240 which is enabled by a signal from output XBUF which goes active low with address signals SA10-SA0 from system bus 42 are decoded to indicate one of the several address ports in the range 58XH to which the disk drive controller system 46 is assigned. The I/O read signal is connected to control the direction input of receiver/driver 240 and also to the interface circuit 152. Circuit 152 also receives the I/O write signal, address enable signal and a system reset signal from the system data bus 42. Interface circuit 152 provides to the data bus 42 a system ready signal SYSRDY, and a system interrupt signal, SYSIRQ, which is connected to system bus 42 interrupt request 14 in the present embodiment. Interface circuit 152 also receives a disk controller busy signal, DCBUSY, which is generated by disk controller 182 while it is busy executing a command. The 8 receptacle status signals HOMESENS0, HOMESENS1, LOAD0, LOAD1, IN0, IN1 and IDA (INA) IDB (INB) are received by interface circuit 152 for communication to the status latch 160 (FIG. 6). The write gate signal WGATE, is received in response to signal WRTGATE generated by disk controller 182 to provide timing and synchronization within the interface circuit 152.

A power on reset signal —POR is an inverted version of the RESET line from the system bus.

It will be recalled that the RAM buffer controller 172 controls priority access to the RB bus 166. Interface circuit 152 decodes binary coded bus acknowledge signals ACK2 and ACK1 from RAM buffer controller 172 when signal —ACK indicates they are valid, to generate signal —ACK3 when DMA channel 3 is granted access to RB bus 166. Interface circuit 152 also decodes the bus acknowledge to grant access to the RB bus 166 to the data processing system 40 via DMA channels 1 and 2. Digital processor 154 outputs a signal WR49 which is the write command that enables it to write over its data bus DB7-DB0 to either the interface circuit 152 or the drive select latch 156. A gating circuit 242 directs the write command to one of these destinations in response to the state of a select external signal, SELEXT, which is generated by the P12 output of the digital processor 154.

Interface circuit 152 receives a 30MHZ crystal clock signal and divides it by 2 to generate a system clock signal, CLK15, at 15MH2. Under normal operating conditions a signal —SELDC is communicated to the chip select input of the disk controller 182 to enable operation of the disk controller. An interrupt signal -INT49 is communicated to the interrupt input of digital processor 154 whenever a processor command has been received and latched from system bus 42. The interrupt is automatically reset when digital processor 154 reads the command. A read command signal RD49 is generated by digital processor 154 whenever it wishes to read data from interface circuit 152 over the DB data bus 162.

The signal MUX is generated to control the multiplexing, row address data or column address data over RA bus 246 between the RAM buffer controller 172 and the RAM sector buffer 176. Signal MUX selectively indicates column or row address information while CAS1 and CAS0 latch the column address information. The processor request signal —PROCRQ is communicated to RAM buffer controller 172 to indicate the system is trying to access the registers of the RAM buffer controller 172 or Disk Controller. An address latch enables signal, FALE is communicated by interface circuit 152 to RAM buffer controller 172 to indicated that valid address information is being communicated over RB bus 166. A signal —RAMWR is received from RAM buffer controller 172 as data is transferred over RB bus 166 for communication to the data processing system 40. A signal select buffer controller, —SELBC, is generated by interface circuit 152 and presented to the chip enable input, XCS, of RAM buffer controller 172. At the T0 and T1 inputs digital processor 154 reads the seek complete signals, —D0PSC and D1PSC, from the D0 and D1 drives.

The 8049 digital processor 154 has its reset input connected to a signal —RST49 which is generated at the STEP output of disk controller 182.

The digital processor 154 has two 8 bit ports designated P10-P17 and P20-P27. Port Pl generates the select external signal, SELEXT, which directs the write command to either the drive select latch 156 or to the interface circuit 152. Two signals —MTR0 and —MTR1 control the actuation of the receptacle motors for drive 0 and drive 1 respectively. The module ready signals MODRDY0 and MODRDY1 control LED status indicators for the receptacles 0 and 1. The write gate signal, —WRTGATE, derived from disk controller 182 enables digital processor 154 to determine when a write is taking place. Processor 154 receives at ports 20 and 21 identification data signals for drives 0 and 1 respectively which indicate the contents of the identification registers thereon. Port signals 22 and 23 drive the signals IDSHSCLK, and IDSHLOAD to selectively load and shift out the ID shift register on the selected removable data pack 24. As note previously these signals are communicated to the individual disk drives by multiplexing these signals on to the head select 0 and head select 1 control lines. Reset signals for drives 0 and 1 are generated at ports 25 and 24 while ports 27 and 26 are utilized to generate head load command signals —HLOAD0 and —HLOAD1 for drives 0 and 1 respectively. These signals control the operation of the head load solenoid on disk drive 0 and 1 respectively.

The RAM sector buffer 176 receives address data over RA bus 246 and communicates bits of data over the RB bus 166 with the interface circuit 152 and the disk controller 182. It will be noted that the drive select latch 156 receives over the DB bus 162 four drive select signals —D0SEL, —D1SEL, —DRVS3, and —DRVS4, for the possible four drives that may be connected to the controller system 46 as well as a write inhibit signal —WRINH, and a write test signal, WRTEST, which may be used for verification of the write-inhibit circuitry.

As shown in FIG. 9, the digital multiplexer 248 (FIG. 6) actually consists of a first digital multiplexer 248 which receives and passes either RDP data read from one of the removable data packs or EXT data read from one of the ST506 interface drives and passes the selected read data to a second multiplexer 250 in response to the drive 0 and drive 1 select signals, —D0SEL and —D1SEL. The second digital multiplexer 250 passes onto a phase-locked loop 206 read data signal designated MUXDATA which represents either the selected disk drive data signal or a 7.5 MHz clock signal which keeps PLL 206 locked to the nominal clock rate even when data is not present. By maintaining PLL 206 locked to the nominal disk drive data clock rate even in the absence of data, a lock on to valid data can be more quickly realized when valid data does appear. The disk controller 182 controls the select input of second digital multiplexer 250 to select disk drive data only when the disk controller 182 is busy and the read gate signal is asserted, indicating that data is actually being read. At other times, the 7.5 MHz clock signal is passed through to the PLL 206 to keep it synchronized to the nominal data clock rate.

PLL data synchronizer and separator separates the read data into a separate data signal designated SEPDATA, and a synchronous read clock signal RDCLK which occurs at the 7.5 MHz RLL (2,7) nominal data clocking rate. Disk controller 182 receives the RLL (2,7) coded read data, decodes it, decodes it to a standard 8-bit binary format and transfers the read data over the RB bus 166 for storage in RAM sector store 176. As indicated previously, the RB bus 166 also connects to the head select latch which may be set by the external set head output of disk controller 182 in response to a command to update the head select status. The ready input of disk controller 182 is enabled so long as power is present and a signal minus a write fault signal −WFLT is inactive high and a signal system ready, −SRDY is active low. Signal −SRDY indicates that any connected ST506 drive is ready to transfer data.

The acknowledge input to disk controller 182 is driven by a signal −ACK3 from the interface circuit 152 to indicate that the disk controller 182 has been granted control of the RB bus 166. System address signal A0 is communicated to an A0 input to disk controller 182 as signal BA00 to enable disk controller 182 to distinguish address/status port accesses from data port accesses. The signal −IOWR is communicated to the R/XW input of disk controller 182 to indicate data transfer direction over RB bus 166. The select disk controller signal −SELDC is connected to the chip select input to enable disk controller operation when system 40 does an I/O access to 582H or 583H. The RAM clock signal MUX is also communicated to disk controller 182 to provide synchronization of data transfers over the RB bus 166. The index signal is communicated to disk controller 182 so that it knows where to begin looking for sector 0.

When writing data to a disk, the disk controller 182 receives the data from the RAM buffer 176 over RB bus 166 and converts it to serial RLL (2,7) coded data which is output as signal WRTDATA to a write data flip-flop 252 which synchronizes the data with a write clock signal in response to signal WRTCLK and the write gate signal WRTGATE. Signal write gate, WGATE, is ORed with a write test signal, WTEST to permit diagnostic evaluation before communication to other parts of the system. The output of the write data flip-flop is communicated to a differential receiver/transceiver 254 which converts the write data to two duplicate sets of differential data for communication to the ST-506 interface for drives 3 and 4 respectively.

Disk controller 182 also reads the ST-506 signals −STRK0, −SKCMP, −DRVSLTD, meaning track 0, seek complete and drive selected for subsequent reading by the system 40. Signal DCBUSY indicates that the disk controller 182 is in the process of executing a command. The write data signals from differential receiver transceiver 254 are communicated to the data connectors 66, 68 for drives 3 and 4 respectively.

The ST-506 interface is shown in FIG. 10. A differential receiver transceiver 256 receives the read data signals designated +RDATA0 and −RDATA0 from ST-506 drive 3 and read data signals +RDATA1 and −RDATA1 from ST-506 interface drive 4 and converts these differential signals to signal TTL signals which are communicated to a multiplexer 258. A buffer 260 is enabled by a external drive select signal −EXTDSEL which is active during −DRVS3 or −DRVS4 is active and enables the selection of ST-506 drives. Buffer 260 receives as its I1 input the drive 3 select signal −DRVS3 from the drive select latch and is communicated both to the DRVS1 pin of ST-506 control connector 264 and to the select input of multiplexer 258 to select the RDATA0 data signals when drive 3 is selected as active. The I90 input of buffer 260 receives the −STEP signal which is communicated to the STEP input of connector 264. Similarly, I2 input of buffer 260 receives drive select signal -DRVS4 which is communicated to the DRVS2 pin of connector 264. The direction signal, −DIR, is communicated through buffer 26 channel I3 to the DIRIN pin of the control connector 264.

A buffer 266 is enabled by the external drive select signal −EXTDSEL and passes 6 drive control signals. Input I0 is connected to ST-506 control pin SKCMP to generate a seek complete signal −SKCMP at the corresponding output of buffer 266. Input I1 is connected to the track 0 pin, TRK0 to generate a signal −STRK0 which indicates whether or not the selected ST506 drive is at track 0. The write fault signal WFLT, communicated through input I2 of buffer 266 to generate signal −WFLT and output Z2. The index signal from connector 264 is coupled through input I3 to generate an ST-506 index signal, −SIDX at output Z3. The ready signal is coupled through input I4 to generate ST506 system ready signal, −SRDY.

A pull-up resistor guarantees an inactive high signal −DRVSLTD when no drives are attached to the ST-506 interface. If a drive is attached and selected, the −DRVSTD will be pulled low to activate the drive selected signal −DRVSLTD. The head 3 select signal, −HDS3, is connected to input I6 and communicated through output Z6 to form signal −BHDS3 which is connected to the head select 3 connector pin HDS3 of the ST-506 control connector.

A buffer 268 is selectively enabled by the external data select signal, EXTDSEL. Buffer 268 receives at its I0 input the head select 2 signal, −HDS2, with corresponding output Z0 driving the HDS2 connector pin of ST-506 control connector 264. The write gate signal, −WRTGATE, is communicated through input I1 to output Z1 and then to the W gate pin of ST-506 control connector 264. Similarly, head select zero signal −HDS0 is communicated through input I2 to output Z2 and then to the head select zero pin HS0 of the ST506 control connector 264. Head select one signal, −HDS1, is connected to input I3 and its corresponding Z3 output is connected to the head select 1 connector pin HS1 of connector 264.

The contents of analog board 50 are shown and described more rigorously in FIGS. 11-21 for drive 0. It will be appreciated that the circuitry shown in FIGS. 11-21 is substantially duplicated for drive 1 and therefore is not separately shown for reasons of economy.

Figure 11:
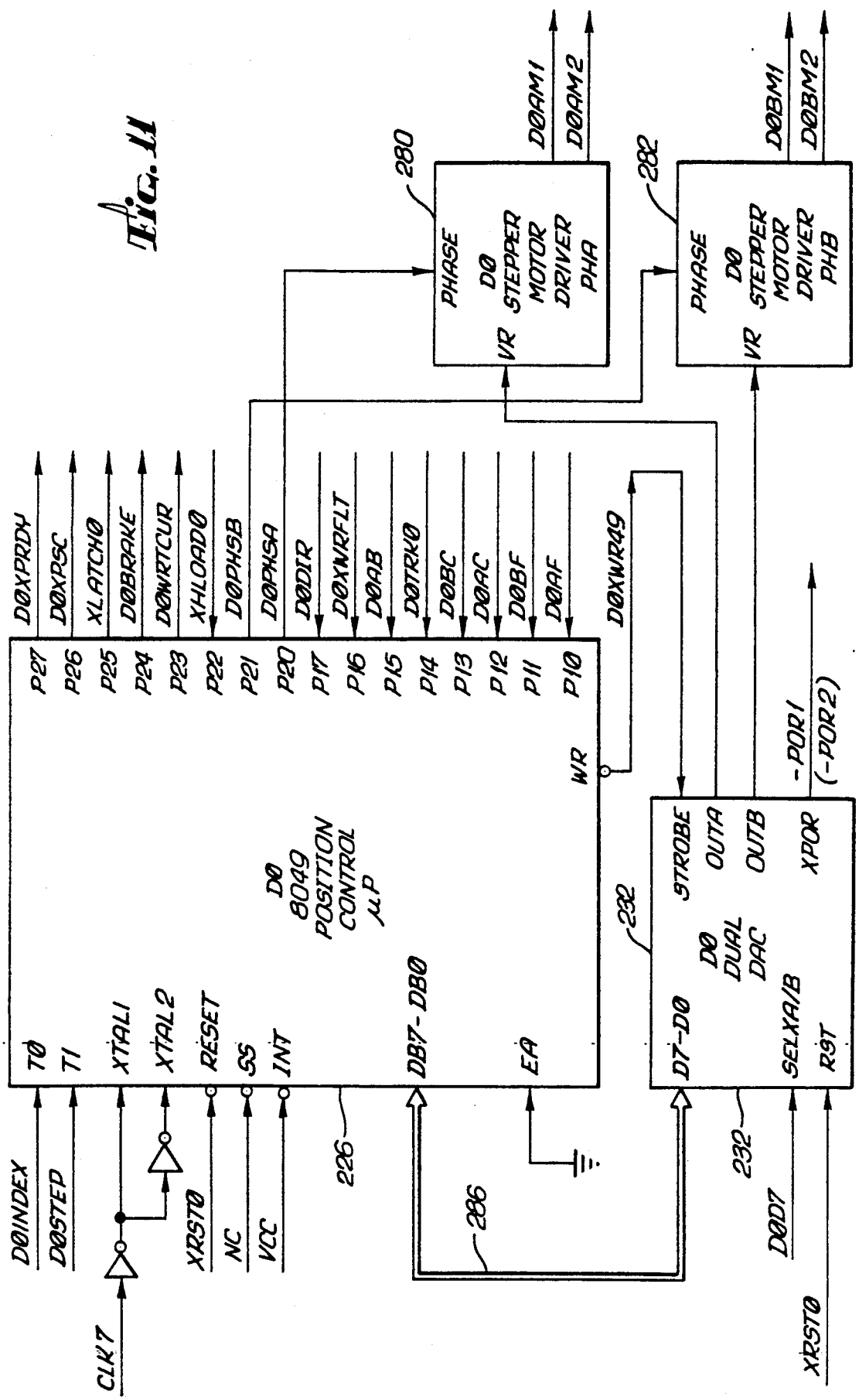

FIG. 11 shows the Drive 08049 position control microprocessor as well as the D0 stepper motor drivers for phase A and phase B 280,282. The T0 input of position control processor 226 is coupled to receive the drive 0 index signal, D0INDX, while the T1 input is coupled to receive the stepping signal, D0STEP, which is generated in response to the signal —STEP from digital processor 154 when drive 0 is selected. The crystal inputs are coupled to receive a 7.794 MHz clock signal, CLK7, while the reset input is driven by a reset signal, XRST0. The D0D7-D0D0 data buss 286 is coupled to the D0 dual digital-to-analog converter 232. It will be noted that bit 7 drives the select input while bits 6-0 drive the data inputs to dual DAC 232. The two A and B outputs of dual DAC 232 provide the magnitude commands for the stepper motor drive currents to D0 stepper motor driver phase A 280 and D0 stepper motor driver phase B 282, respectively. The phases of these drivers are controlled by signals D0PHSA and D0PHSB, respectively, which are output from the P20 and P21 ports of position control processor 226. Ports P10-P13 receive the four digital position control signals which are developed in response to detected position offsets of the transducer head with respect to track center. Signals D0AF and D0BF indicate a fine position offset in either the A or the B direction. The fine position corresponds to an error offset of approximately 3%. The A and B directions are radial directions in which the indicated direction alternates with each index pulse. Similarly, the D0AC and D0BC coarse offset positions are received at ports P12 and P13, respectively. These signals when active indicate coarse offsets greater than/equal to approximately 6% in the indicated A or B direction. For purposes of fine positioning, the coarse signals should be logic one, indicating that the head-track misalignment is less than approximately 6%. Port P14 receives a track zero signal, D0TRK0, indicating that the selected transducer head has read a special track zero frequency block. A signal D0AB is received at port P15 to indicate which sample-and-hold channel of the stepper motor controller chip 302 was used to sample servobursts A and B. The drive zero write fault signal, D0XWRFLT, is received at port 16 and the drive zero direction signal from digital processor 154 is received at signal D0DIR at port 17. The drive zero head load command from digital processor 154 for drive zero is communicated to the P22 input as signal XHLOAD0. A write current command is output at port 23 as signal D0WRTCUR to control the magnitude of write current supplied to the active transducer head. A spindle motor brake control signal, D0BRAKE, is output at port P24 and the solenoid head latch control signal is output as signal XLATCH0 at port P25. This signal drives the power amplifier for the head loading latch solenoid to generate an analog signal, D0HLOAD—. Port output P26 generates for drive zero a pre-seek complete signal, D0XPSC, and port P27 generates a pre-ready signal, D0XPRDY. These two signals enable reading once the transducer head is nominally positioned at the destination track while fine positioning is still in progress. These signals enable reading to begin prior to the assertion of the traditional seek complete signal which occurs only after fine positioning has been completed.

Referring now to FIG. 12, a common read channel 290 includes an 8464 pulse discriminator circuit having a 5-pole filter and receives differential transducer data RDX,RDY through a differential head multiplexer 292. Differential head multiplexer 292 receives the read data from both drive 0 and drive 1 and passes the data for the selected drive to common read channel 290 in response to drive select flip-flops 294,296 for drives 0 and 1, respectively. The common read channel converts the received head signals to a signal which is gated out as signal RDPDATA from a NAND gate 298 which must be further enabled by one of select flip-flops 294 or 296.

FIG. 13 shows the solenoid driver which generates the control signal, D0HLOAD—, in response to the command signal, XLATCH0, from position control processor 226.

FIG. 14 shows an LED driver which drives the module ready signal, MODRDY0, in response to input signal, XMODRDY0.

Figure 15:
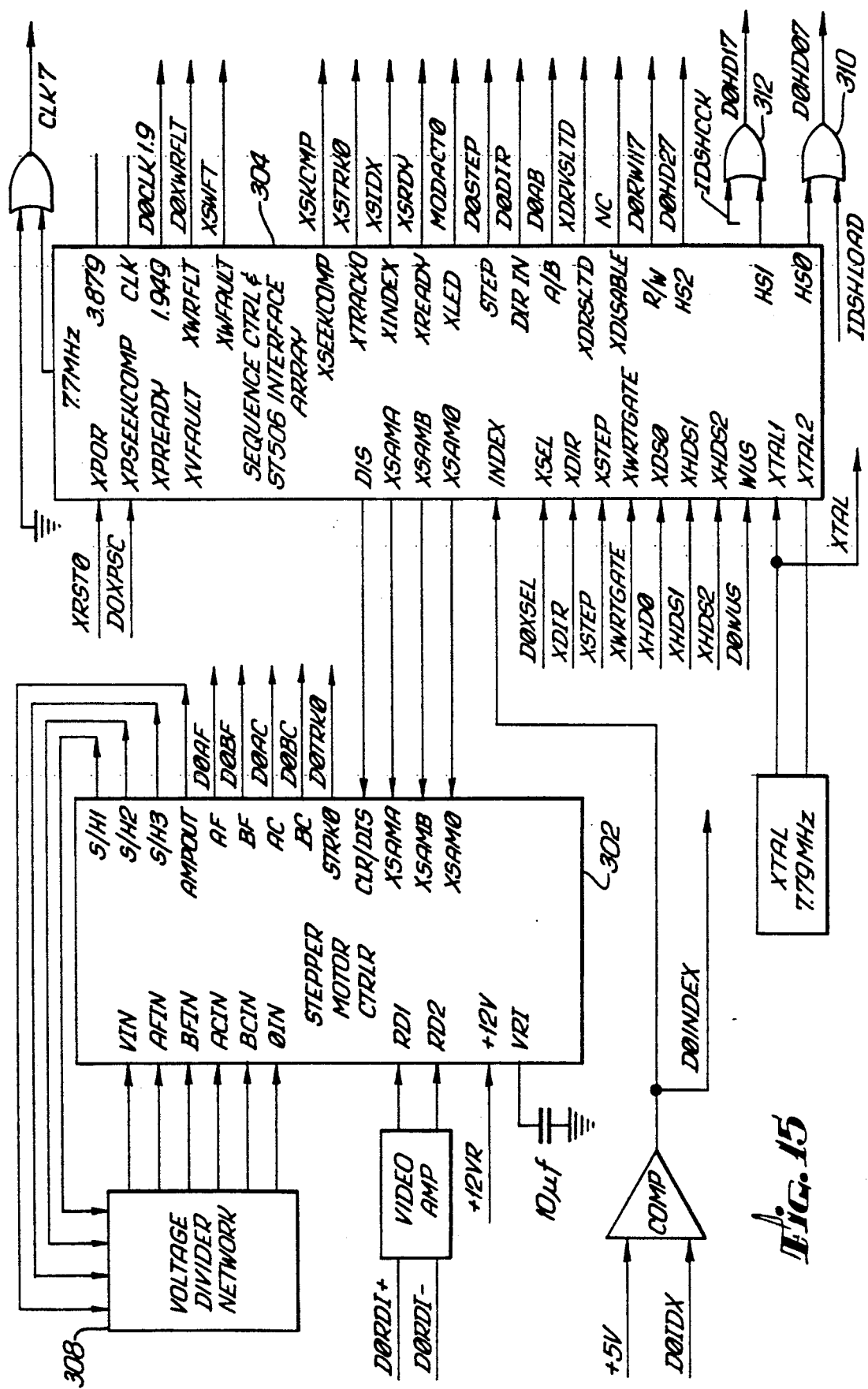

FIG. 15 shows the position error detection circuit which responds to the block A and block B transducer head offset signals to generate the fine and coarse position control signals for controlling fine positioning of the selected head. The input data signals D0RDI+ and D0RDI— are input in differential form through a video amplifier 300 to the stepper motor controller circuit 302. Stepper motor controller circuit 302 sets sample and hold circuits for the A and B blocks as well as the track zero signal block in response to timing signals received from a sequence control and ST-506 interface array 304 while the head 0 passes through the servo sector. The sample and hold circuits are cleared or discharged in response to a signal DIS from the sequence control and ST506 interface array 304. Stepper motor controller includes a voltage divider network 308 which provides voltage reference signals for generating the fine and coarse error offset signals as well as the track zero signal, D0TRK0.

Sequence control and ST506 interface array 304 receives the drive zero index signal D0IDX to indicate the start of the servosector and provides the timing for sampling the A block, B block and track zero block of signal data. Also received are the drive zero drive select signal D0XSEL, the direction signal XDIR, the step command signal XSTEP, the write gate signal XWRTGATE, the head select signals, and the drive zero write unsafe signal D0WUS.

In response to the head select inputs, array 304 generates the three head select output signals with the signals for heads 0 and 1 being communicated through OR gates 310 and 312 which multiplex the ID register control signals IDSHLOAD and IDSHCLK onto the 0 and 1 head select signals, respectively, to generate signals D0HD07 and D0HD17. Head select signal D0HD27 is generated directly by the array 304. A read/write output generates the drive zero read/write control signal, D0RW117, in response to the write gate input signal and an external drive selected signal, XDRVSLTD, is input as a chip enable signal. A signal, D0AB, is communicated to the P15 port of the position processor 226 to indicate that the coarse and fine position indication signals are valid. The drive zero direction signal, D0DIR, and step signal, D0STEP, are output along with the LED driver signals, MODACT0 and XSRDY, for receptacle zero. A data index signal, XSIDX, is generated to indicate the start of the data sectors as opposed to the servosector and track zero signal, XSTRK0, is active whenever the head is positioned at track zero. The seek complete signal, XSKCMP, is generated by array 304 as are the write fault signals, XSWFT and D0XWRFLT. A 1.948 MHz clock signal is generated as signal D0CLK1.9. A 7.794 MHz clock signal is further generated as signal CLK7. The power on reset input is responsive to signal XRST0 and the preseek complete input receive signal D0XPSC.

FIG. 16 shows the crystal controlled DC spindle motor driver 316 for drive zero. Driver 316 receives the hall effect sensor position signals from the spindle motor sensors as well as a clock signal and the braking command and responds by generating the drive currents for the three phases of the spindle motor.

FIG. 17 shows a power relay for the drive zero which enables the circuit components of drive zero to be powered up only after the PAC has been fully inserted into the receptacle.

FIG. 18 shows a buffer 320 which amplifies and communicates drive control signals which are communicated to receptacle zero.

FIG. 19 shows receptacle motor drivers with dynamic brake 322 for the receptacle zero and receptacle one insertion and ejection motors. They are driven in response to signals XMTR0 and XMTR1, respectively.

FIG. 20 shows receiver drivers with pull-up resistors for the receptacle home sense signal, the load signal from drive zero, and the module insertion signal, INS0.

Loading and unloading of the heads is controlled by position control processor 226. It will be recalled that in general loading of the heads consists of actuating the solenoid to release the gate, moving the carriage radially inward toward the spindle to push the gate out of the way and load the heads, releasing the solenoid with the gate open to lock the gate in the open position and then continuing to move the carriage radially inward to assure that it has cleared the gate. It is then necessary to synchronize the cylinder counter by moving the heads to cylinder zero and initiating a calibration procedure.

Before ejection of a removable data pack 24, the heads must be unloaded and locked away from the disk surface by the gate. The algorithm for unloading the heads is shown in FIG. 21 to which reference is not now made. Head unloading begins with a recalibration step 352 at which the processor 226 commands a seek out toward the outer edge of the disk while it searches for track 0. If track 0 is not found within 840 steps, an error condition is assumed. It will be recalled that each track has at track index a servo sector which stores a track 0 frequency block followed by an A burst frequency block offset one-half track on one side followed by a B block frequency burst offset by one-half track to the other side. The frequency of the track 0 burst is distinguishable from the A and B bursts and is only inserted at physical track 0 and several guard tracks which are radially outward therefrom. Upon finding track 0, a seek is performed to cylinder 276 to assure that the carriage is clear of the gate before activating the solenoid to unlatch the gate.

Next, the solenoid is actuated to release the gate or comb. At this point it is assured that the carriage and heads are radially inward of the head loading point and the gate, which is spring loaded, is held open by the presence of the carriage locking closure of the gate or comb.

After waiting 225 milliseconds for the solenoid to actuate, a seek is performed outward toward the edge of the disk for 188 tracks to the radially inner edge of a head loading or take-off zone. At this point the carriage begins to clear the comb and the comb begins to rotate toward the head load position. A low speed seek is then continued radially outward for 94 tracks at medium power to slowly close the gate or comb. As the gate closes the ramp edges thereon begin to engage the head support arms and to lift the heads from the disk surface. This is done at medium power and low speed to assure that no sudden shock is imposed upon the head support arms which may cause the heads to bounce against the disk surface or which might damage the support arms. After the heads are further moved 94 tracks to the final unload position, the solenoid is deactuated to lock the gate mechanism in the head unload protected position. Processor 226 pauses for 225 milliseconds to enable the solenoid to activate to the release or lock position. Now a verify heads procedure is executed by sampling the servo signals within the servo sector, microstepping the heads, and resampling the servo data to determine whether the heads are unloaded. If the heads are not loaded, then seek complete is not enabled to indicate to the digital control processor 154 that the heads are still loaded. The head unload algorithm is then completed at step 354.

The head load algorithm is illustrated in detail in FIGS. 22-25 to which reference is now made.

Head loading begins with acceleration or spin up of the spindle motor to its nominal full speed velocity in verification of the correct velocity for at least 40 revolutions. The head load algorithm is sufficiently gentle that head loading can proceed with the disk stopped without damaging the disk. The disk can then be accelerated after head unloading has been executed. However, for the preferred embodiment, the disk is rotating at full speed before the heads are loaded so as to avoid a full contact between the heads and the disk.

Next, the heads are stepped in toward the spindle at low power and low speed for 126 tracks to assure that the heads will clear the unload mechanism in the event that the heads are already loaded at step 362. Normally the heads and carriage will be locked by the gate at this point and no motion of the heads will actually take place. However, in the event that the heads are not unloaded, this step assures that they are sufficiently radially inward that the carriage will block the gate when it is unlatched. The problem is that, if the heads are positioned within the actual head load ramp up area, when the latch is released, the gate or comb will swing toward the closed position and the ramps thereon will engage the head support arms at a relatively high velocity. This may damage the head support arms or cause a head balance that will result in a head crash and permanent damage to the disk drive.

After clearance of the head loading zone is assured, the heads are moved radially outward for several tracks to remove any tension from the unload mechanism. It will be recalled that in the normal situation the heads have been bumping into the closed gate as they attempt to seek inward for 126 tracks. The trigger solenoid can then be actuated at step 366 and the system pauses for 225 milliseconds while it waits for the solenoid to react. The end load algorithm then continues at FIG. 23 with the heads being stepped inward toward the spindle at low speed to push open the gate or comb and lower the heads onto the disk surfaces as the heads pass through the head unload region. In the event that the heads were previously loaded, this step may cause them to bump into the stop for the radial inward extremity, but the low speed assures that no damage occurs as they continue to push against the stop. At the same time, the slow speed assures that for normal operation the heads are slowly ramped down onto the disk surfaces as the carriage forces the gate or comb open against its spring bias. Once the heads have been unloaded onto the disk surface, the carriage and heads are stepped inward at normal speed and power for an additional 187 tracks to fully set the head load mechanism to the open position at a step 368. The head load solenoid can then be deactivated to latch the gate mechanism in the open position out of the way of heads for normal disk operation. The system pauses for 225 milliseconds at step 370 to wait for the solenoid to react to the deactivation thereof.

Referring now to FIG. 24, the head load algorithm continues at step 372 with the heads being stepped outward toward the outer edge of the disk at a normal speed and power for 150 tracks to assure that the heads are skipped over any unformatted track before beginning to search for track 00. A recalibration procedure is then executed at step 374 as the heads are stepped radially outward for a maximum of 840 steps while searching for track 00. If track 00 is not found within 840 steps, an error condition is assumed and the spindle motor is then stopped and the drive deactivated. Once track 00 is found, as will occur in normal operation, a verify heads procedure is executed at step 376 by sampling the servo signals within the servo sector, microstepping the heads, and resampling the servo data to detect whether the heads are loaded and determine the type of drive. In the present embodiment, if the A servo burst is on the radially outward side of track 0, the drive is a 30MB drive but, if the B servo burst is radially outward of track 0, the current drive is a 20— or 40MB drive (1 or 2 disks) with a higher track density of approximately 1,000 tracks per inch compared to approximately 800 tracks per inch for the 30MB drive and other minor variations. The position control processor 226 stores a flag bit indicating the drive type and uses this information to select minor variations in optimizing parameters when controlling drive operations.

Figure 25:
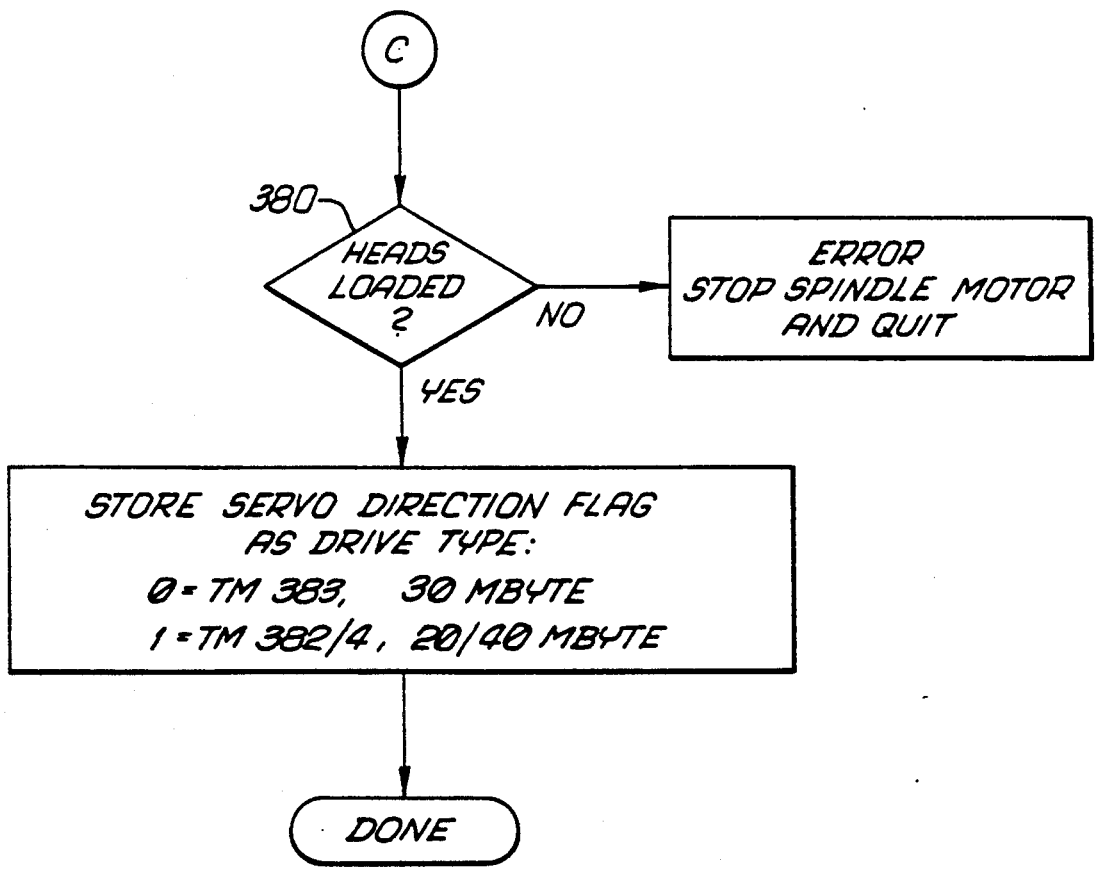

The head load algorithm now continues at point C on FIG. 25 where completion of head loading is tested at step 380. If the heads are not loaded, an error condition is assumed and the spindle motor is stopped and the drive shut down. Under normal circumstances the head will be loaded and the servo direction flag is determined according to the drive type and set to zero for a 30MB drive and to one for a 20— or 40MB drive. The head load process is then complete.

Figure 26:
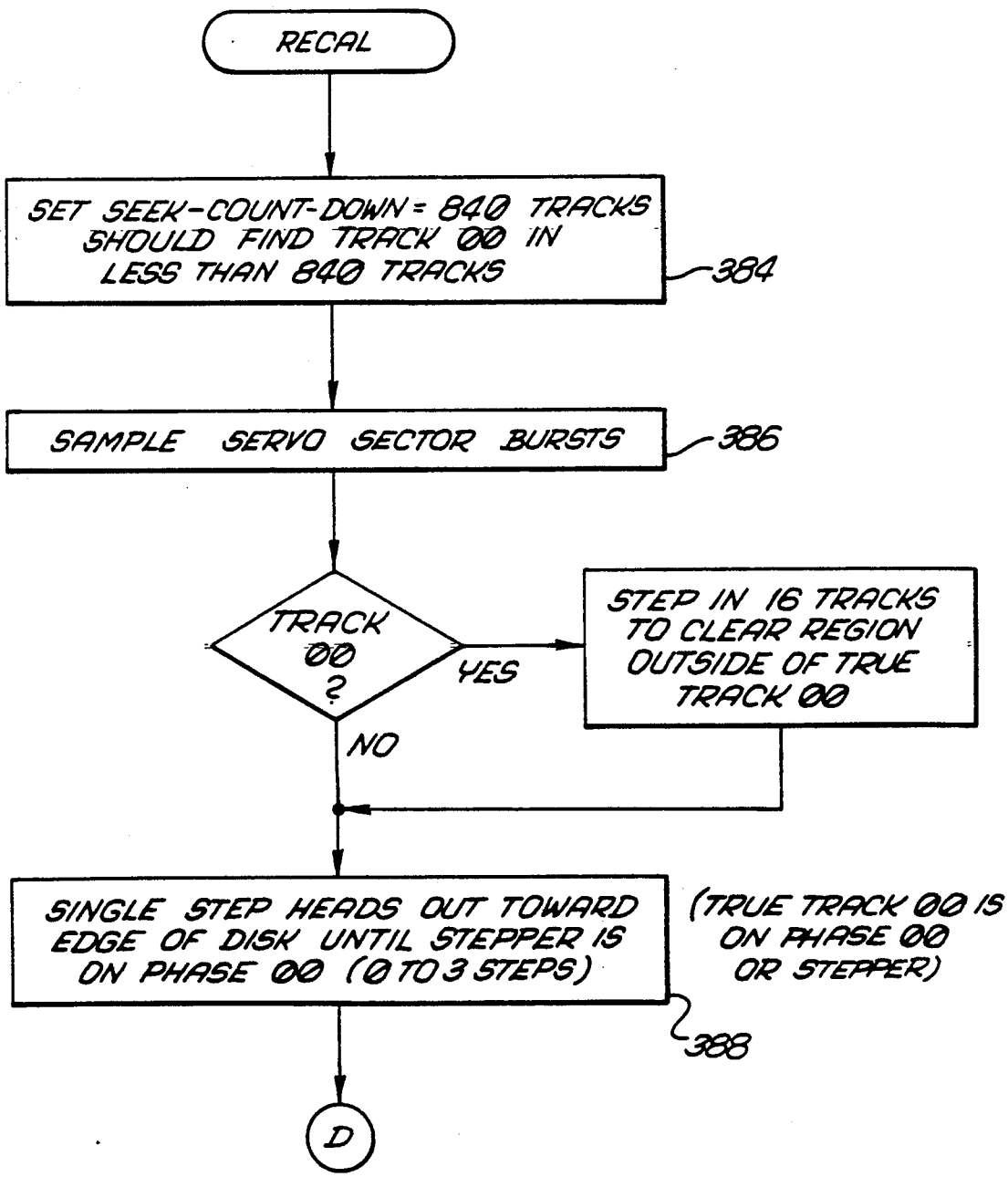
FIGS. 26 and 27 show a flow chart illustrating a recalibration algorithm.
Figure 27:
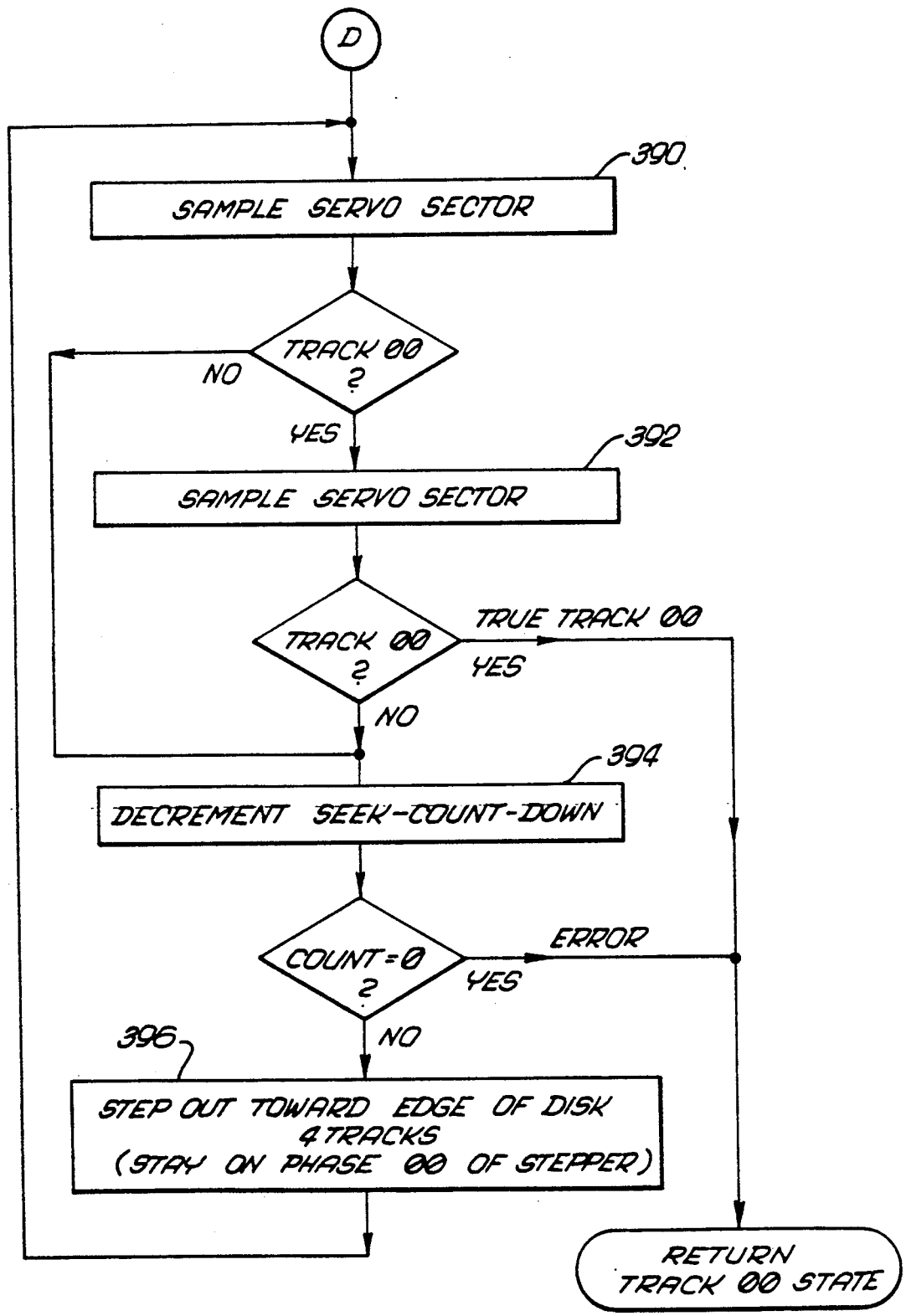

The recalibration procedure is shown in greater detail in FIGS. 26 and 27 to which reference is now made. The procedure begins at step 384 with the seek countdown counter (which is a memory storage location and not a physically separate counter) being set to 840 tracks. The current servo data is then sampled at step 386 and, if the track 0 burst is not found, the procedure continues at step 388. In the event that a track 0 burst is detected, the heads are stepped in 16 tracks to clear the region outside of true track 00. It will be recalled that several guard band tracks outside of true track 00 also contain the track 0 frequency burst. At step 388 the heads are single stepped radially outward toward the edge of the disk until the stepper motor is synchronized at phase 00. This should occur within 0 to 3 steps. True track 0 is initially factory formatted with the stepper motor positioned at phase 0. Failure to synchronize the system with the stepper motor at phase 0 will cause large offsets for fine positioning which will at best degrade system performance and possibly interfere with proper operation.

Recalibration then continues at point D in FIG. 27 wherein the servo data is sampled at step 390.

At step 390 the embedded servo data is sampled and, if track 0 is indicated, it is sampled a second time at step 392. If track 0 is still indicated on the second sample, it is assumed that the heads are properly positioned at track 0 and the control circuits are reset to the track 0 state.

However, if either of the track 0 tests 390 or 392 fail, it is assumed that the current location is not cylinder zero and at step 394 the seek countdown counter is decremented and, if it reaches zero without track 0 having been found, an error is indicated. If the seek countdown counter is not yet at zero, the stepper motor is recycled to the next phase zero state by stepping outward a distance of 4 tracks at step 396. Control is then looped back to the sample servo sector at step 390 to determine whether the new cylinder is cylinder zero. This process of testing every fourth track at which stepper motor phase zero occurs continues until either track 0 is found or the seek countdown counter decrements to zero to indicate an error condition.

Figure 28:
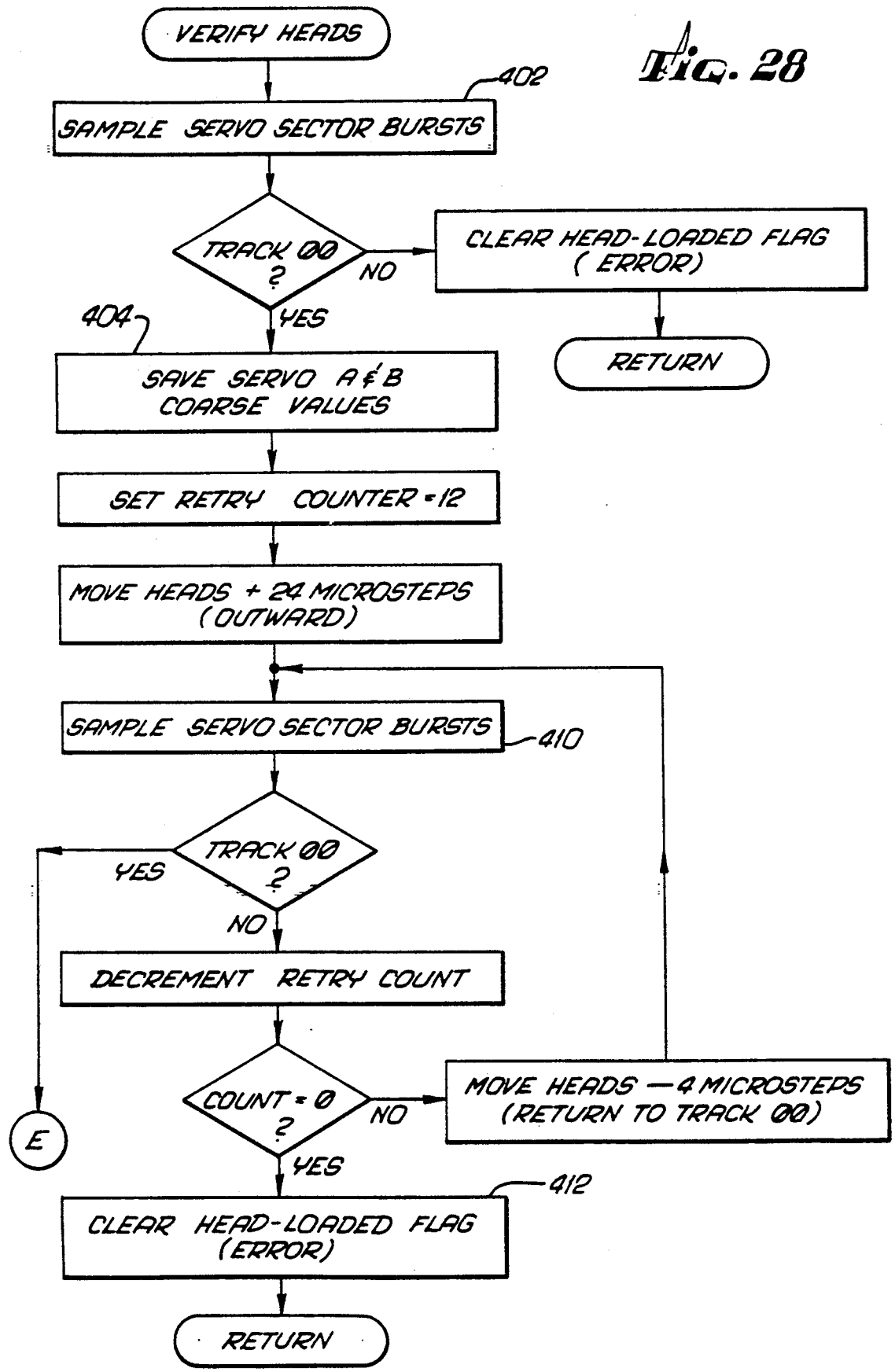
FIGS. 28-30 show a flow chart illustrating a verify heads algorithm.
Figure 29:
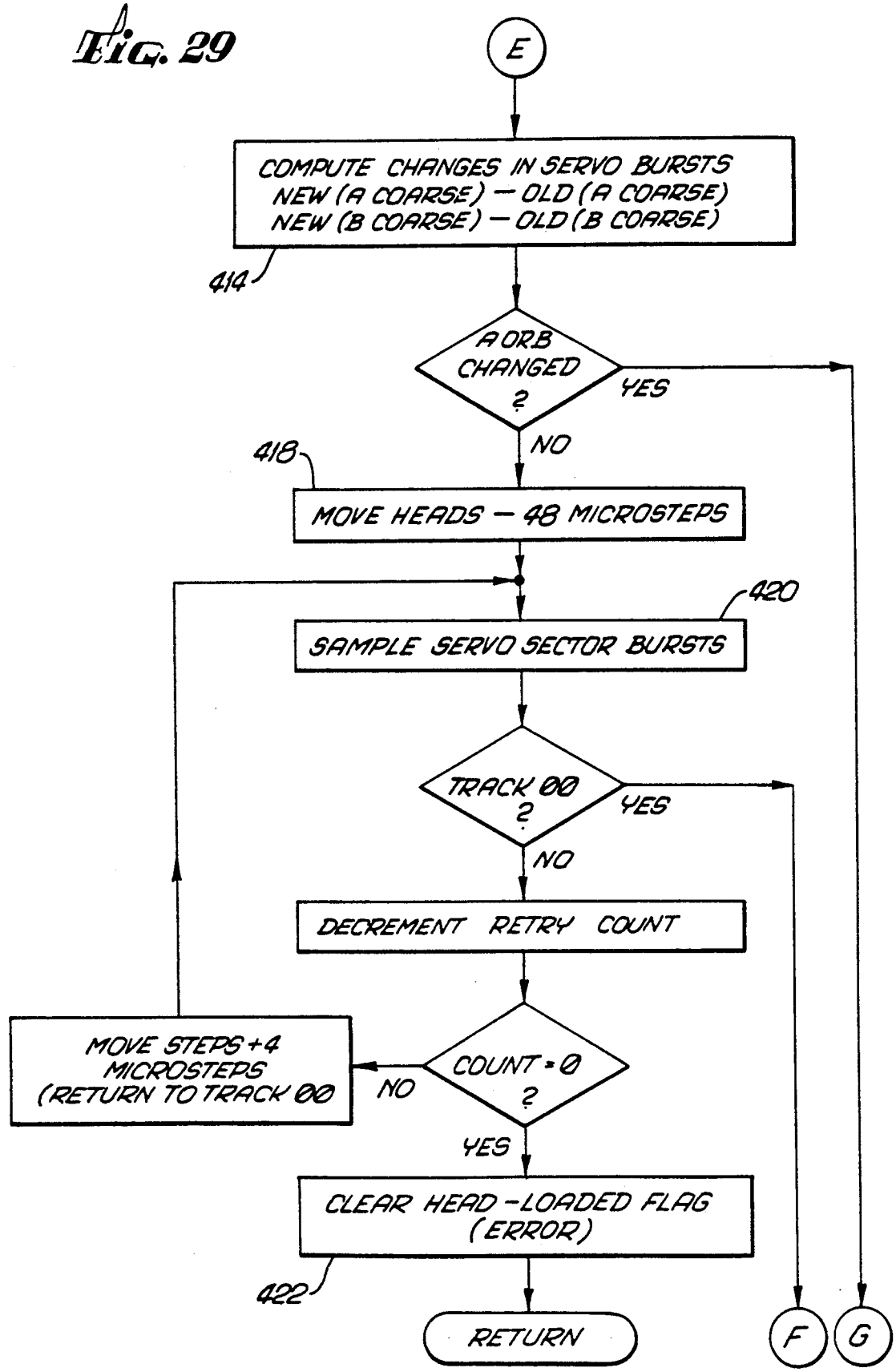
Figure 30:
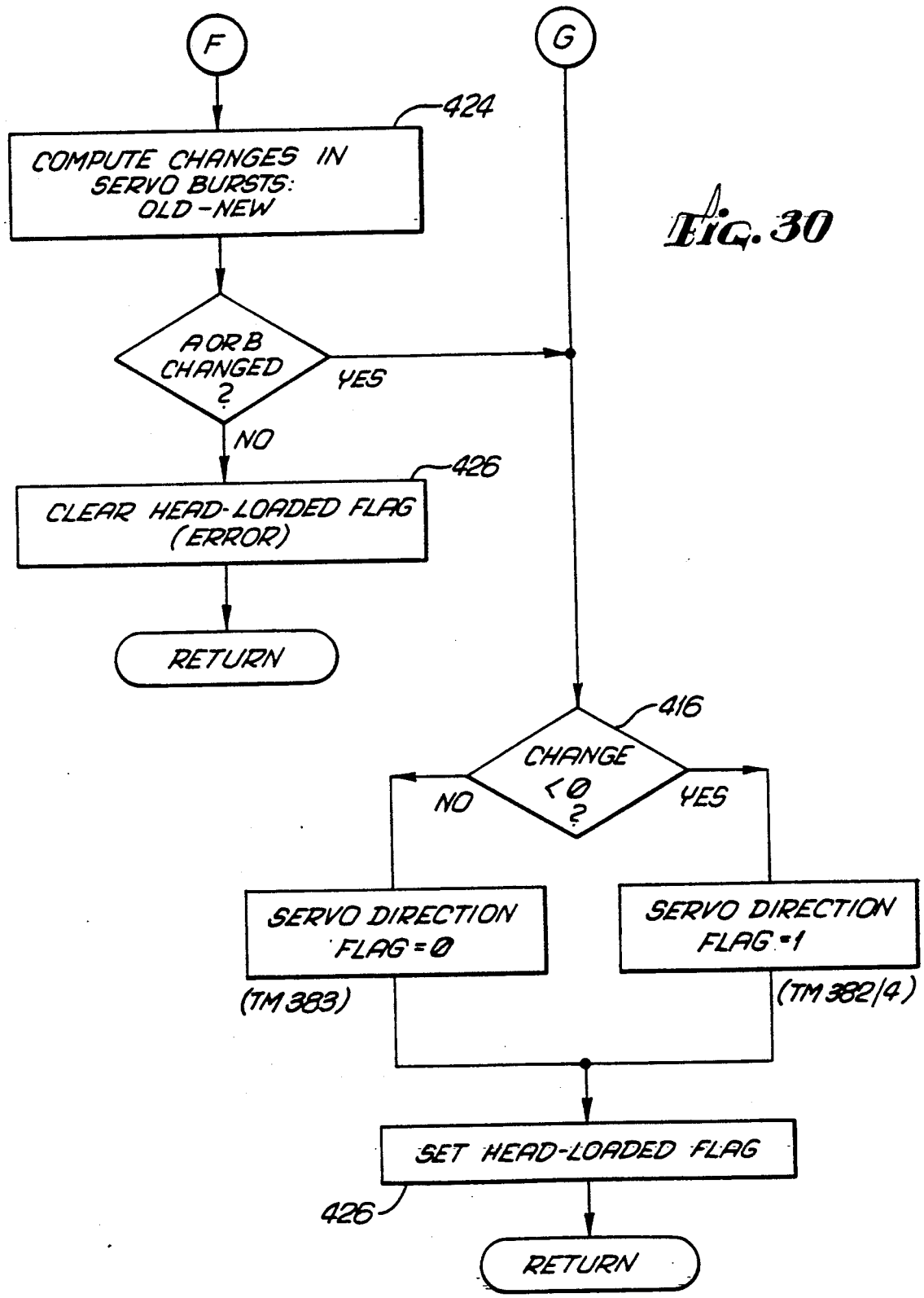

The verify heads step of FIG. 24 is shown in greatest detail in the flow charts of FIGS. 28-30 to which reference is now made. The verify heads procedure begins by sampling the embedded servobits at step 402. If a track 0 burst is not detected, an error condition exists and the HEAD_LOADED flag is cleared before returning to the calling procedure. If a track 0 servo burst is properly detected, the A and B coarse values for the A and B servo bursts are saved at step 404. Next, a retry counter is set to 12 and the heads are moved 24 microsteps or in the plus or outward direction. There are 64 microsteps per track. The embedded sample bursts are then again sampled at step 410 and the system looks for the track 0 burst. If the head has moved so far off track that the track 0 burst can no longer be found, the retry counter is decremented and the heads are moved −4 microsteps inward back toward the previously detected track 0 position. Step 410 is repeated by again sampling the embedded servo bursts.

If the track 0 signal is not detected before the retry counter is decremented to zero, an error condition is indicated and at step 412 the HEAD_LOADED flag is cleared before returning to the calling procedure.

Normally the track 0 burst will be detected again before the retry counter decrements to zero and at step 414 in FIG. 29 the A and B coarse servo bursts for the new track position are compared to the previously saved A and B coarse servo bursts, respectively.

If either of the coarse position signals has changed at step 414, the ability of the servosystem to detect the crossing of a coarse position boundary suggests the heads are probably loaded at track 0 and the direction of the change is tested at a step 416 in FIG. 30.

On the other hand, if neither of the coarse position signals has changed from its original saved value, the heads are moved −48 microsteps or radially inward at step 418 and the servo bursts are again sampled at step 420. If track 0 is not now detected, the retry counter is decremented and the heads are moved +4 microsteps or radially outward back toward previously detected track 0 until either track 0 is detected or the retry counter counts down to zero to indicate an error condition. In this event the HEAD_LOADED flag is cleared at step 422 and the head verify algorithm returns to the calling procedure. Assuming that track 0 is again detected before the retry counter is decremented to zero, the algorithm branches to step 424 in FIG. 30 wherein the current A and B coarse servo burst signals are again compared to the previously saved signals by subtracting the new signals from the old signals. If there has been no change, an error condition is presumed and at step 426 the HEAD$_{13}$ LOADED flag is cleared and the algorithm returns to the calling procedure. On the other hand, normally a change will be detected to indicate the heads are properly loaded and at step 416 the value of the change is tested. If the result is less than zero, the servo direction flag is set to one to indicate that the B burst is on the outside of track 0 and that a 20− or 40MB drive is attached. If the indicated subtraction is greater than zero, then the servo direction flag is set to zero to indicate that the loaded drive is a 30MB drive having the A burst on the outside of track 0. The HEAD_LOADED flag is then set at step 426 and the head verify algorithm returns to the calling procedure.

Figure 31:
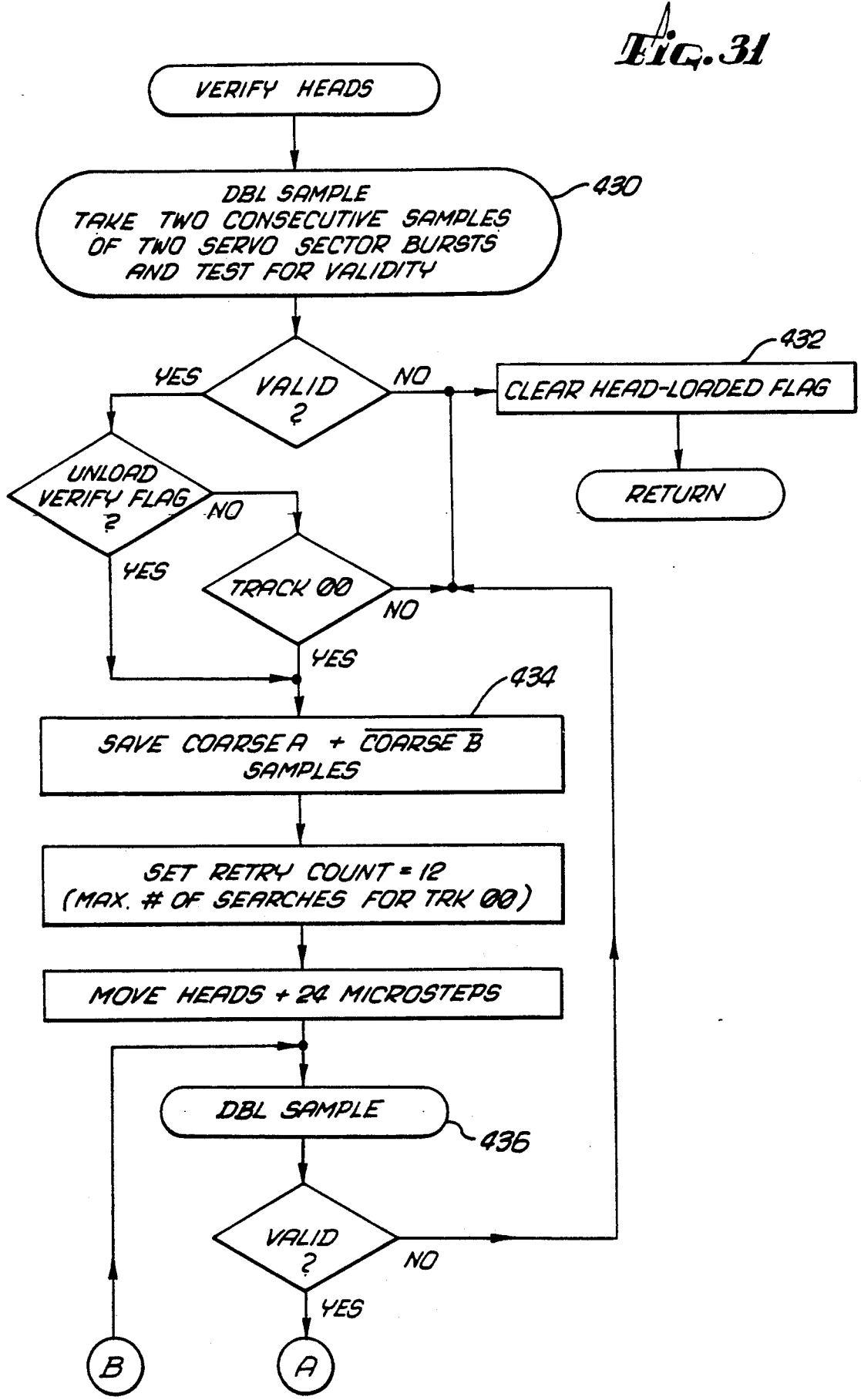
FIGS. 31-34 show a flow chart illustrating an alternative embodiment of the verify heads algorithm.
Figure 32:
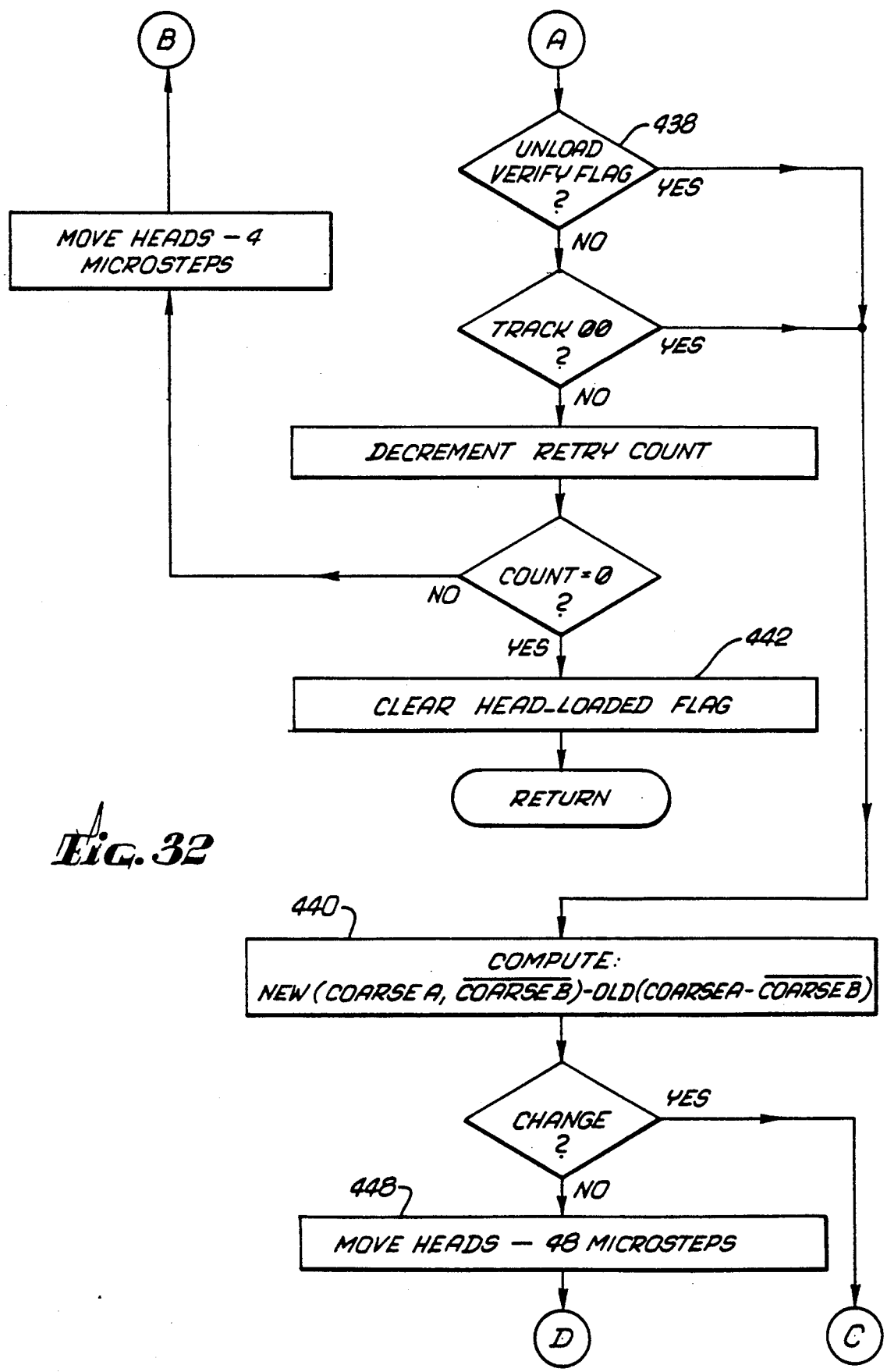

An alternate version of the verify heads algorithm shown in FIGS. 28-30 is shown in FIGS. 31-35. Referring now to FIG. 31, at step 430 two consecutive samples of the A and B coarse position servo bursts are taken and tested for validity. The test for validity assumes that only one of the A and B coarse thresholds may be exceeded on a given sample and that only one of the A and B coarse thresholds may change between two samples. For example, if the head is positioned at the A coarse threshold, the A coarse signal may change between the two tests and the B signals should be inactive for both tests. If these two samples do not suggest a valid servo sector beneath the heads, the HEAD_LOADED flag is cleared at step 432 and the algorithm returns to the calling procedure. If valid servo bursts are detected, then the unload verify flag is tested and control passes to step 434 if this is a heads unloaded test. Otherwise, the track 0 signal is tested and, if this fails, step 432 is executed and the algorithm returns to the calling procedure.

Normally track 0 will be detected and the coarse A and the complement of the coarse B samples are saved for future use at step 434. A retry counter is then set to 12 and the heads are then moved +24 microsteps where a second double sample of the four position error samples is taken at step 436. If these samples indicate invalid data, then the HEAD_LOADED flag is cleared at step 432 and the algorithm returns to the calling procedure. However, if the second double sample is valid, it is determined at step 438 whether the unload verify flag is set. If set, it indicates that this procedure is verifying a head unload as opposed to a head load and control passes to step 440. On the other hand, if a head load is being verified, then the heads should be positioned at track 0 and this is tested. If the track 0 pulse appears, then control passes to step 440 as before. If the heads are not positioned at track 0, the retry count is decremented and, if the count is not zero, the heads are moved −4 microsteps and the second double sample is retaken at step 436. This procedure continues until valid and verifiable samples are detected to pass control to step 440 or until the retry count is decremented to zero to indicate an error condition. In this event the HEAD_LOADED flag is cleared at step 442 and control in the algorithm returns to the calling procedure.

Under normal circumstances step 440 will be executed at which the first or old coarse A signal is subtracted from the new or second coarse A signal and the complement of the old coarse B signal is subtracted from the complement of the new coarse B signal. If a non-zero result indicates that one of these signals has changed, then the head load status is in effect verified and control passes to a change direction test at step 446 in FIG. 34.

Figure 33:
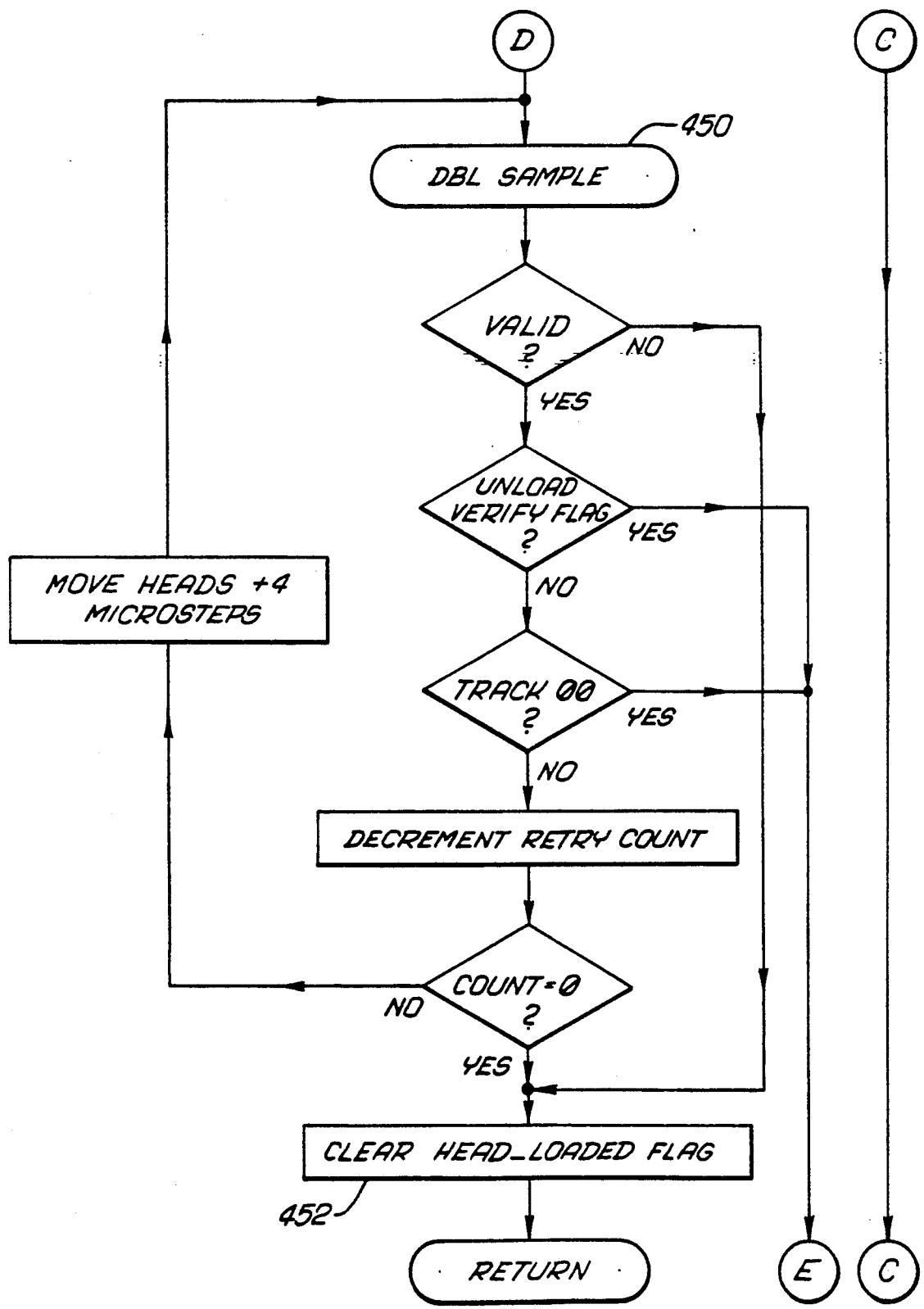
Figure 34:
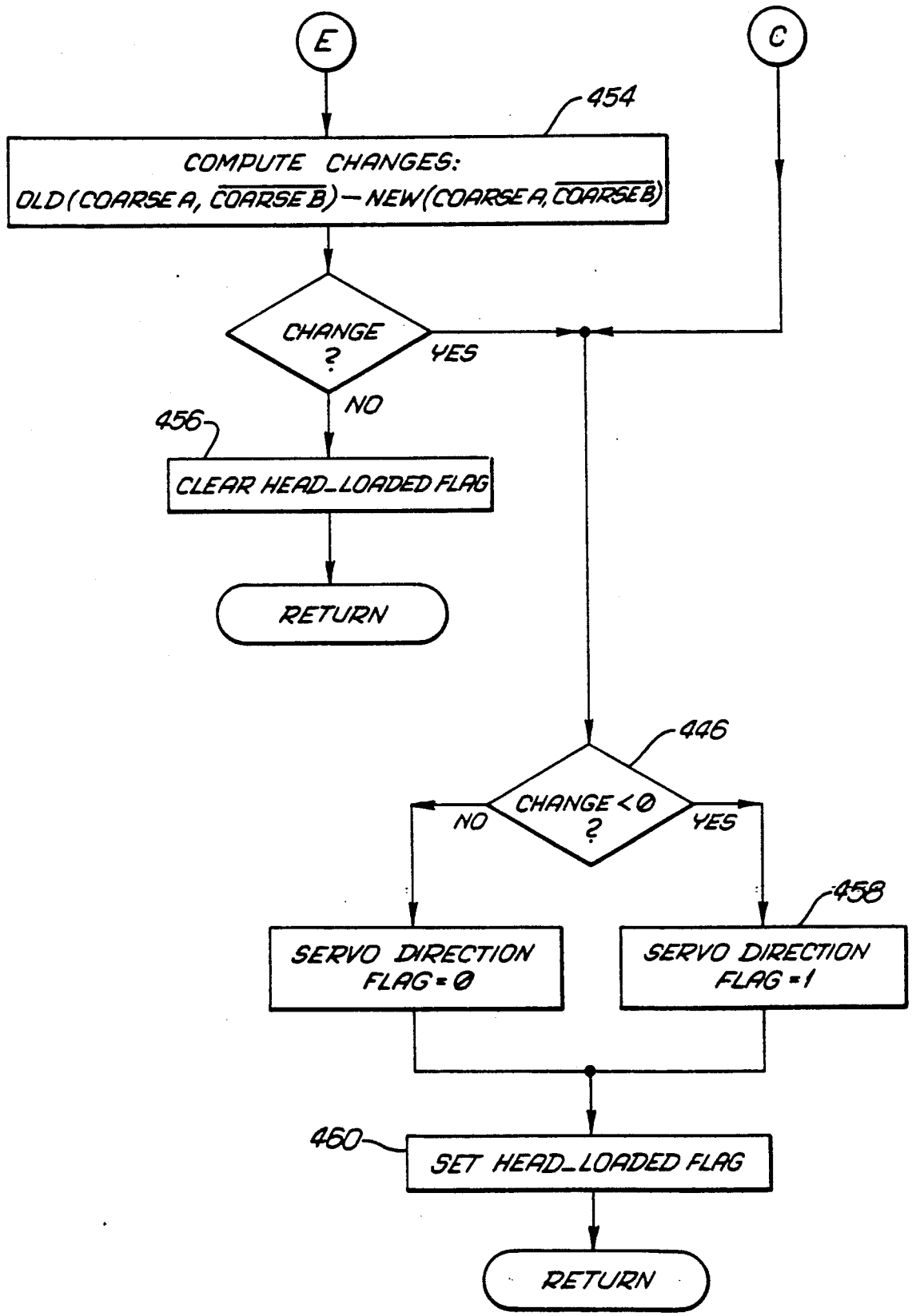

If the coarse position signals have not changed, the heads are moved by −48 microsteps at step 448 and the second double sample is retaken at step 450 in FIG. 33. If the double sample is not valid, an error condition is presumed and the HEAD_LOADED flag is cleared at step 452 and the algorithm returns to the calling procedure. Next, assuming that the data is valid, the unload verify flag is tested and if set to indicate that an unload status is being tested, the algorithm proceeds to compute changes in the position signals at step 454. If the unload verify flag is not set, the system further checks to see if a track 0 burst has been encountered before proceeding to the compute step 454. If track 0 is not found, it continues through a loop in which the retry counter is decremented and the heads are moved +4 microsteps before taking a new double sample at step 450. The loop is repeated until either the validity of the sample data is confirmed to transfer control to the compute step 454 in FIG. 34 or the retry counter becomes decremented to zero in event the HEAD_LOADED flag is cleared at step 452 and the algorithm exits to the calling procedure.

Assuming that the validity of the second sample is confirmed, the changes in the core sample signals are computed at step 454 by subtracting the new coarse A position signal from the old coarse A position signal and by subtracting the complement of the new coarse B position signal from the complement of the old coarse B position signal. If no change is detected as indicated by a result of zero, the HEAD_LOADED flag is cleared at step 456 and the algorithm returns to the calling procedure. Normally a change will have occurred and the direction of the change is tested at step 446. If the changed value is less than zero, then the servo direction flag is set to 1 at step 458 and the head loaded flag is set at step 460 before the algorithm returns to the calling procedure. Alternatively, if the result of the computation at step 454 is greater than zero, then the servo direction flag is set to zero before the HEAD_LOADED flag is set at step 460 and the algorithm returns to the calling procedure.

Figure 35:
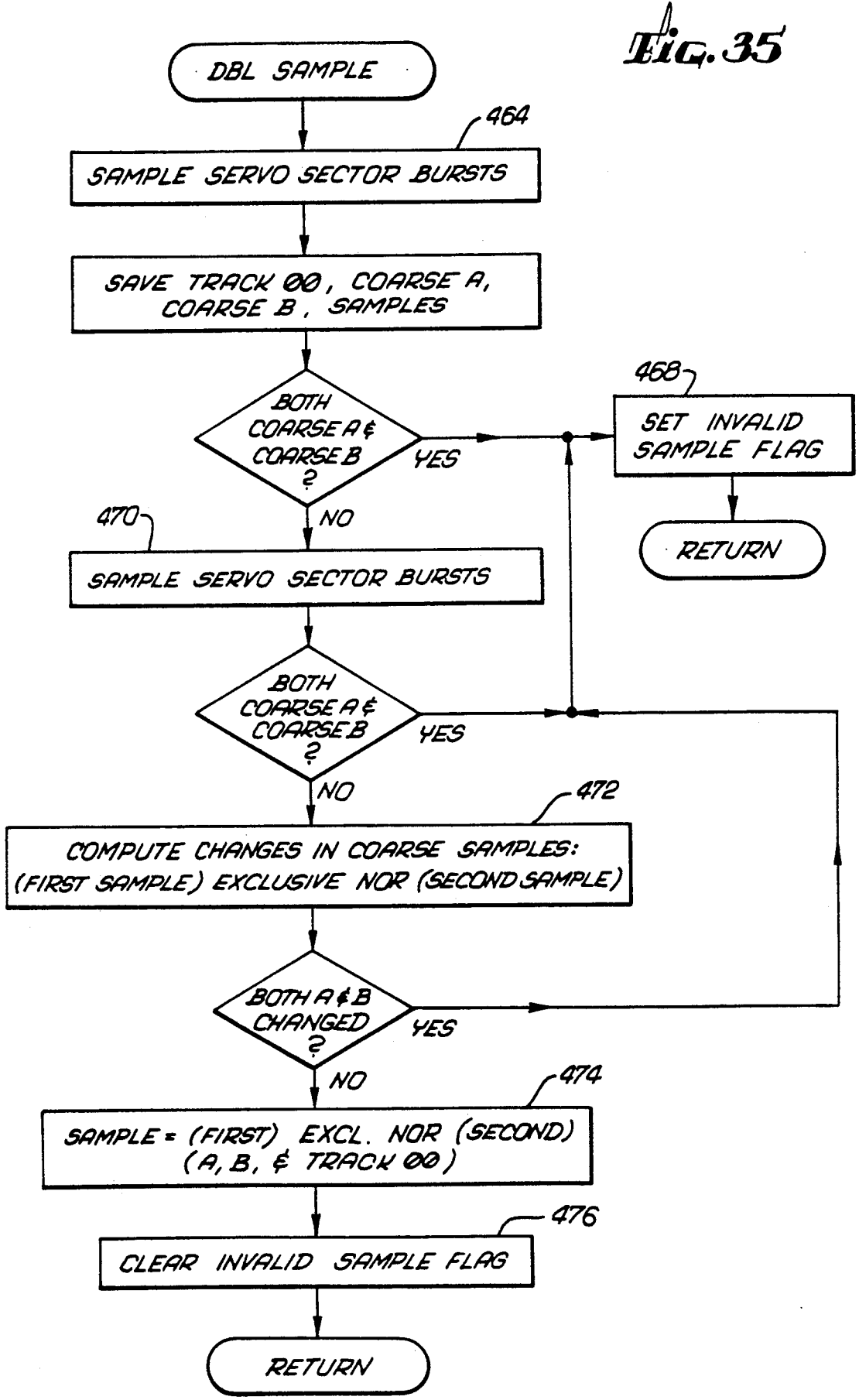
FIG. 35 shows a flow chart illustrating a double sample procedure used in the alternative embodiment of the verify heads algorithm.

The double sample procedure is described in greater detail in FIG. 35 to which reference is now made. The procedure samples a set of servo bursts at step 464 and saves the track 0, coarse A and coarse B indications. If both the coarse A and coarse B indications are asserted, an invalid condition is detected and the invalid sample flag is set at step 468 before returning to the calling procedure. Normally both signals will not be set and the second sample of the servo bursts is taken at step 470. Again, the second sample is tested and, if both error signals are asserted, the sample is presumed invalid and the invalid sample flag is set at step 468 before returning to the calling procedure. Presuming that the second sample is valid, changes in the coarse samples are computed at step 472 and, if both of the A and B error indications have changed, an error condition is suggested and the invalid sample flag is set at step 468 before returning to the calling procedure. Normally, both indications will not have changed and for all three signals the first sample is stored as the exclusive NOR of the first and second samples at step 474. The invalid sample flag is then cleared at step 476 before continuing with the head verify algorithm.

Figure 36:
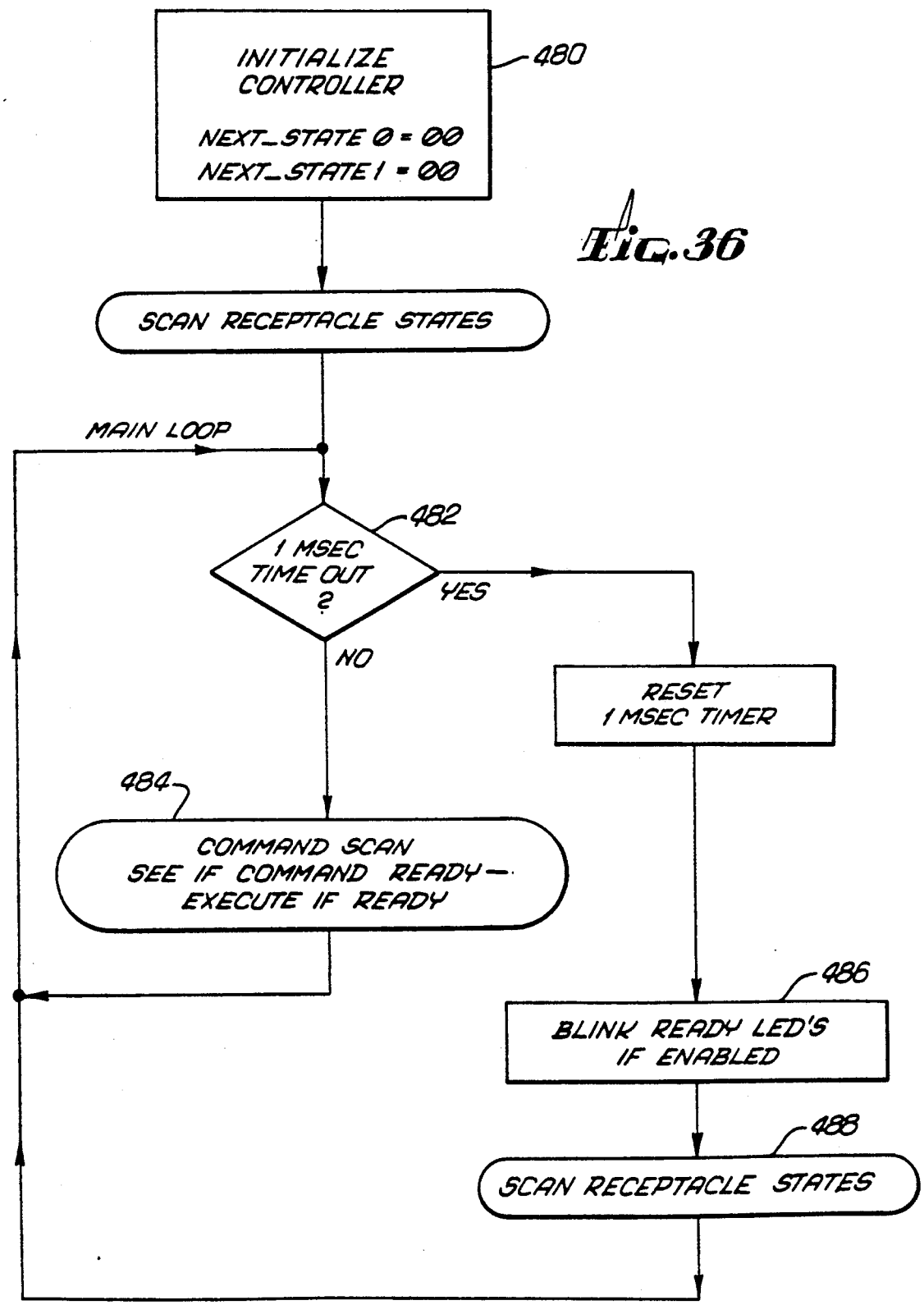
FIG. 36 shows a flow chart illustrating the main operating loop for a digital processor used in the disk drive control system in accordance with the invention.
Figure 37:
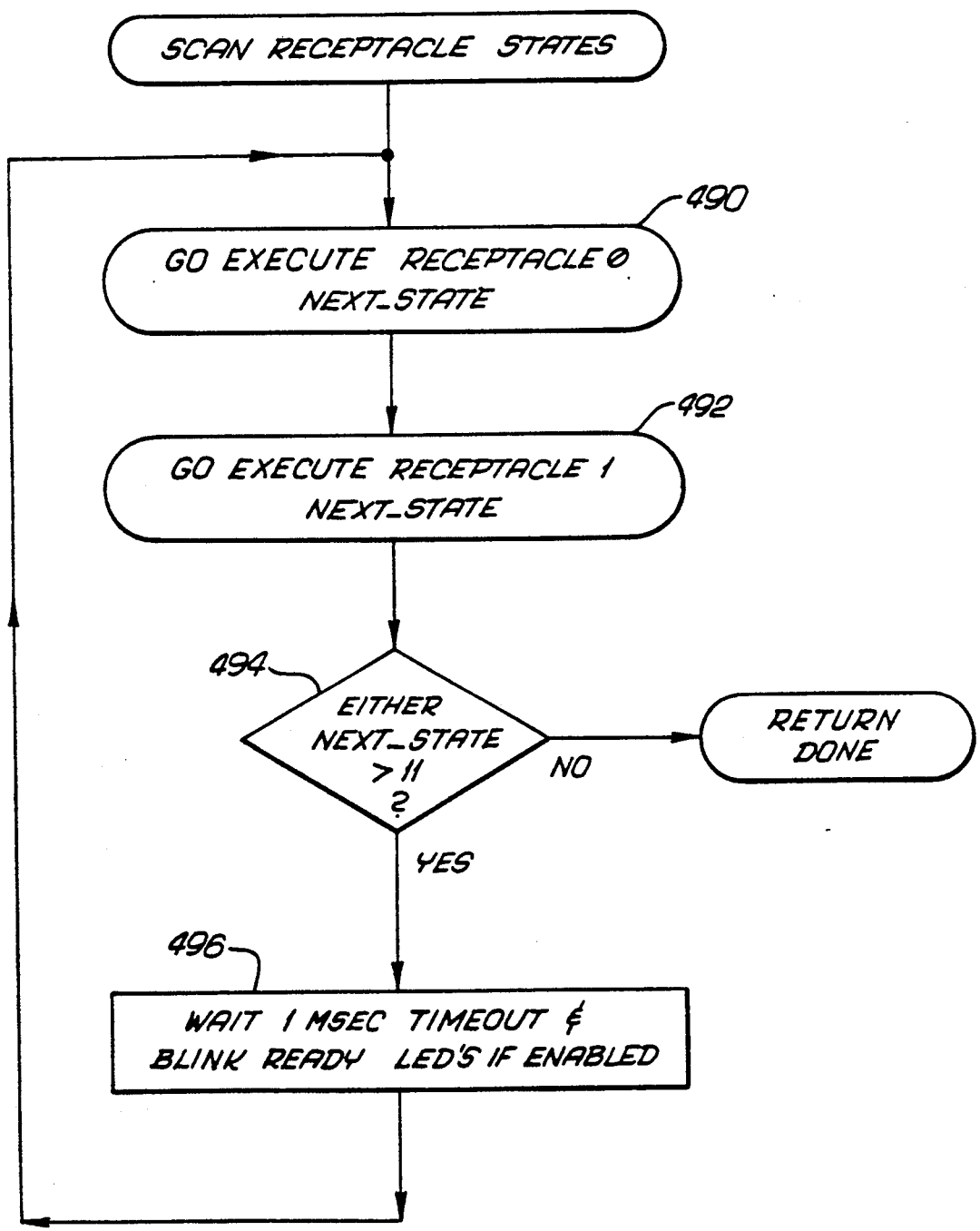
FIG. 37 shows a flow chart illustrating a scan receptacle states procedure used by the flow chart shown in FIG. 36.

A flow chart illustrating the operation of digital control processor 154 is illustrated in FIG. 36 and FIG. 37 to which reference is now made. Upon occurrence of a reset at power on or otherwise, the processor goes through an initialization procedure as indicated at step 480 and sets variables NEXT_STATE 0 and NEXT_STATE 1 to zero. Control processor 154 executes separate state sequences as it monitors the status of and controls the operation of the receptacles 0 and 1 22. Each of the receptacle states is initialized at zero. Processor 154 then scans the receptacle states to update variables reflecting their status and begins execution of a main loop by testing for a 1 millisecond time out at step 482. If the 1 millisecond timer has not timed out, processor 154 checks at step 484 to see if it has received a command from the data processing system 40 through the system bus interface circuit 152. If a command has been received, it is read and executed.

Alternatively, if a 1 millisecond time out has expired at step 482, processor 154 resets the timer and then updates the blinking of the ready LEDs on the two receptacles, 0 and 1 at step 486. The processor 154 then scans the two receptacle states in sequence at step 488 and returns to test for the 1 millisecond time out at step 482.

The scanning of the receptacle states is illustrated in flow chart form in FIG. 37 to which reference is now made. In scanning the receptacle states, the processor 154 first executes the state procedure indicated by the contents of the NEXT_STATE variable for receptacle 0. This may result in the receptacle 0 state NEXT_STATE being left unchanged or changed before the processor eventually exits the state procedure for receptacle 0 and at step 490 and begins execution of the state procedure for receptacle 1 at step 492. Again, execution of the receptacle 1 next state procedure will depend upon the next state variable contents and the status of receptacle 1. The next state variable may or may not be changed before the processor exits to determine if either next state variable is set to a value greater than 11 at test 494. The processor 154 waits for a 1 millisecond time out, updates the blinking of the receptacle ready LEDs at step 496 and then re-enters the execute loop by executing the indicated receptacle 0 state procedure at step 490. If at step 494 both of the indicated next state variables for receptacle 0 and receptacle 1 are less than or equal to 11, the scan receptacle state procedure returns to the main loop shown in FIG. 36. The receptacle state procedures are numbered such that the time critical state procedures which should not be interrupted for a long period of time as the processor executes a system command are assigned a state number greater than 11. On the other hand, less time critical procedures which can tolerate a substantial time interval interruption are assigned a state number of 11 or smaller.

Figure 38:
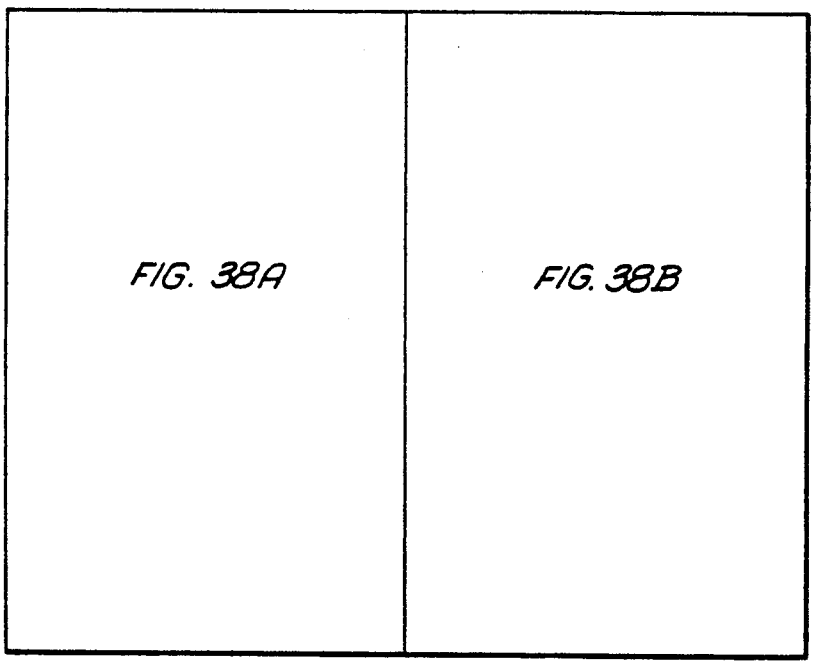
FIGS. 38A and B and 39 show a state diagram illustrating the operation of a digital processor used in a disk drive control system in accordance with the invention.
Figure 38A:
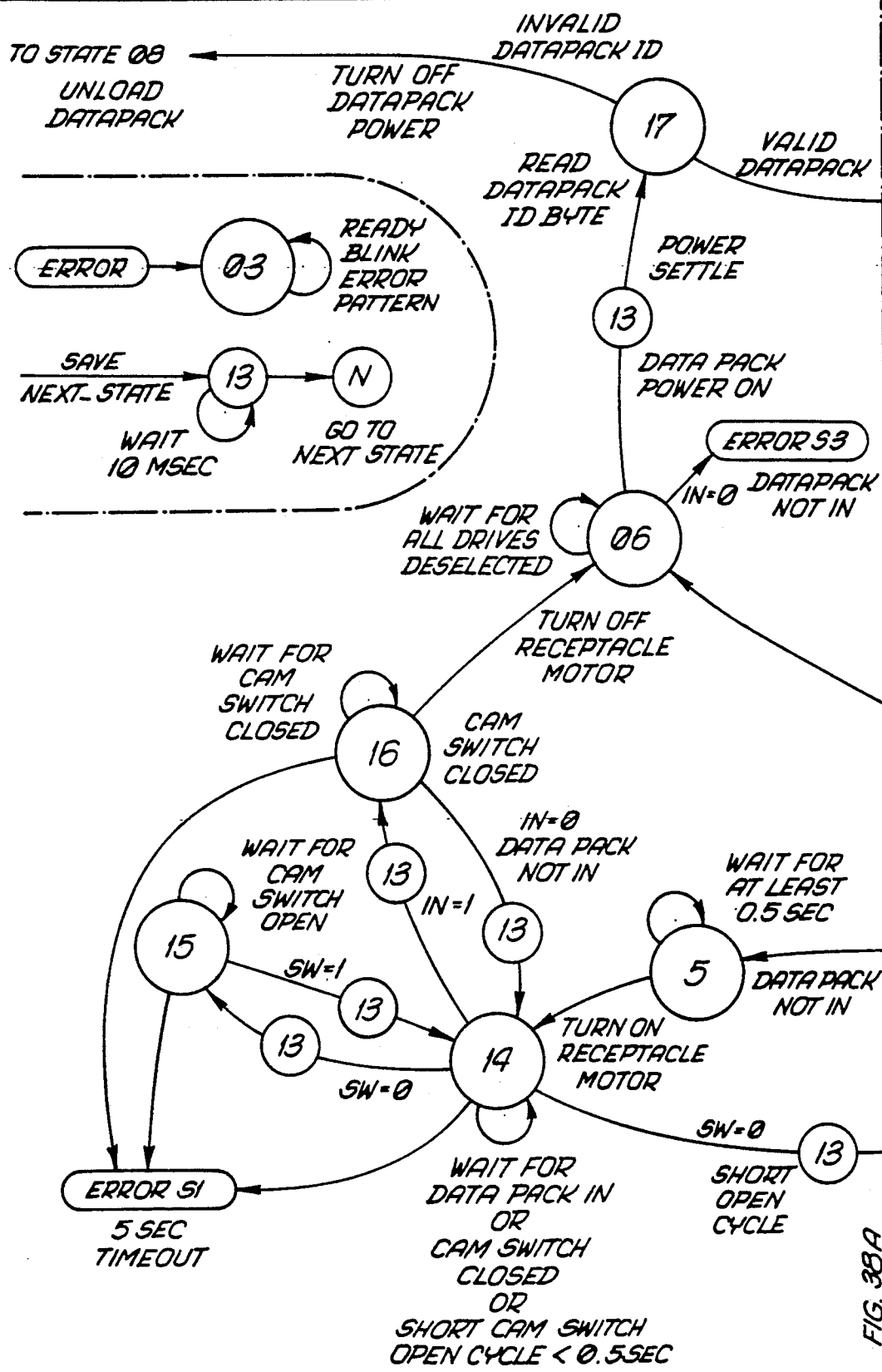

The receptacle state diagrams are illustrated in FIGS. 38 and 39 to which reference is now made. It is noted by way of general background that state 13 is a 10 millisecond wait state which in most instances is utilized for switch debounce purposes. The one notable exception is the occurrence of state 13 between states 06 and 17 during which time a power settle delay is executed. At power on, execution of the state sequence begins at state 00 at which processor 154 tests for the presence of a removable data pack 24 in the corresponding receptacle 0 or 1. From state 00 the processor 154 checks for the proper insertion of a removable data pack or an open condition of the home sense switch which suggests that a removable data pack has been partially inserted and is waiting to be pulled into the fully inserted position. If a data pack is installed or is waiting to be installed, control passes through delay state 13 to state 04. Alternatively, if a data pack is neither properly installed nor waiting to be installed, control passes to state 01. State 01 is an idle state at which processor 154 waits for a data pack to be partially inserted. While in state 01 processor 154 monitors the state of signal IN and an error condition is indicated if the signal goes to 1 to indicate that a data pack is properly installed.

Upon the partial insertion of a removable data pack 24, the home sense or cam switch is opened to indicate the partial insertion of a removable data pack and processor 154 proceeds to state 04. From state 04 the processor tests for test signal IN for the proper full insertion of a data pack. Under normal circumstances this signal will indicate non-insertion and processor 154 will proceed to state 05. In the event that a full insertion is indicated, control proceeds to state 06 which is a wait state.

At state 05 the processor waits one-half second for the user to release or react to the insertion of a removable data pack and then turns on the receptacle motor to pull the data pack into the receptacle. From this point control proceeds to state 14.

At state 14 processor 154 monitors the three signals data pack IN, cam switch closed and cam switch opened for a time period of less than 0.5 seconds which would suggest that the cam has cycled to an ejected position. Under normal operating circumstances, signal data pack IN will be asserted first and state passes through a delay state 13 to state 16 at which processor 154 waits for the cam to continue to cycle until the cam switch is closed. In the event that no data pack has actually been properly inserted into the receptacle, state 14 will sense the cam switch being closed as it passes through the fully loaded position without the occurrence of the pack IN signal and in that case passes through a delay state 13 to state 15. At state 15 the processor 154 waits for the cam switch to again open as the cam cycles through the eject portion of its cycle and then passes through a delay 13 back to state 14. At state 14, if a cam switch open cycle of less than one-half second is detected, it is presumed that the cam has cycled to the home position and transfer of control passes through a delay state 13 back to state 01. It is noted that state 05 sets the time out counter to a value greater than 0.5 seconds so that state 14 cannot falsely detect a short cycle. If state 14 senses a cam closure and a time out count greater than 0.5 seconds, it proceeds to state 15 where the time out count is reset to zero and control is returned to state 14 when the cam switch is sensed as being open. It is after this reset that state 14 can sense the short cam open cycle and return control to state 01. In any of the states 14, 15 or 16, if a 5 second time out occurs, it is presumed that a jam has been incurred in loading the removable data pack and error condition S1 transfers control to state 03 where the status lights on the receptacle are blinked to indicate the error condition and the system waits for system reset or a subsequent command from the data processor 40.

Under normal circumstances the IN signal will be asserted while in state 14 and control will pass through a delay state 13 to state 16 which will sense cam switch closure shortly after the pack IN signal is asserted and before the occurrence of the 5 second time out to pass control of the processor 154 to state 06.

State 06 is essentially a wait state at which processor 154 waits for all drives to be deselected so that identification register data may be transferred over the multiplexed head select lines. If the pack IN signal goes to zero during this time, an error condition S3 is indicated and control is transferred to state 03. Because processor 154 controls the assertion of the drive select lines, it retains in memory the status of each line and, if no lines have been selected, processor 154 can immediately power up the data pack and transfer control through a power settle delay 13 to state 17. In the event that at least one drive has been selected, processor 154 remains in state 06 until it receives a command from the data processor 40 to deselect all drives. Upon receipt of this command, processor 154 can execute a power on for the data pack and proceed through the power settle delay 13 to state 17.

In state 17 processor 154 first asserts the ID shift register load signal and then toggles the clock signal to serially receive the 8 bits of the ID shift register. These bits are stored for future reference. At this point processor 154 checks the validity of the ID data and, if the data indicates a valid drive for this controller, control proceeds to state 07. In the event that invalid data is detected, processor 154 turns off the power to the data pack and exits to state 08, which is the beginning of the unload data pack state.

Upon detection of valid ID data, state 17 releases the reset signal to the 8049 analog position control processor 226 and releases the head load line to the position control processor 226. The head load line is a signal line which can be pulled low by either processor. When released by the digital processor 154 it becomes an enable signal to the position control processor 226 to proceed to enable the head loading sequence. The position controller 226 pulls the head load line low to indicate to the digital processor 154 an error condition.

While in state 07, the digital processor 154 waits for the position control processor 226 to complete the head loading process and signal this completion by asserting the seek complete signal. While waiting in state 07, digital processor 154 monitors three possible error conditions. First, it sets a 20 second time out during which the position control processor 226 is expected to complete the loading of the heads and assert the seek complete signal. If this does not occur within 20 seconds, an error condition S4 is indicated and control passes to error state 03.

Digital control processor 154 also monitors the head load line and if the position control processor 226 senses an error condition and aborts the head load procedure it will pull this line low. Upon detecting a low condition for the head load line processor 154 asserts a U2 error condition and transfers control to error state 03.

Processor 154 also monitors the data pack IN signal which should remain at one under all normal operating conditions. In the event of an unusual condition which causes the signal to go to zero, an error state U3 is asserted and control is passed to the error state 03. Upon normal receipt of the seek complete signal from the 8049 analog position control processor 226 control passes to state 02 which is a ready state. In state 02 digital processor 154 monitors the head load line to check for an abort condition from the analog position control processor 226. In state 02 the system is fully ready and is capable of executing seeks and data transfers as well as other commands from the data processing system 40. Upon the occurrence of a low state on the head load line, digital processor 154 asserts error condition U1 and transfers control to error state 03.

The error indication nomenclature is selected such that a U indicates that the error occurs while the heads are in a loaded or unsafe condition and the S indicates that the error occurs while the heads are in a safe condition which would normally be an unloaded condition. The numeral following the error character indicates the number of blinks of the LED receptacle status light within a 2 second time interval.

It is noted that at step 484 as shown in FIG. 36 the digital control processor 154 monitors the receipt of commands from processing system 40 and sets the next state signal to reflect receipt of a receptacle related command such as a load data pack command or an unload data pack command. For example, receipt of a load data pack command causes the next state variable to be set to 04 so that transfer of control is forced into state 4. Similarly, receipt of an unload data pack command causes the next state signal to be set to 08 to force control of the state process to state 8 as indicated in FIG. 39.

Referring now to FIG. 39 the unload process begins at state 08 at which several status conditions are checked. If no data pack has been inserted as indicated by the signal IN, control is transferred immediately to state 01 which is the ejected or no pack inserted state. During state 08 digital processor 154 determines whether or not the heads have been loaded. If the heads are unloaded, processor 154 turns off the spindle motor by issuing a reset signal to the position control processor 226 and proceeds to state 11. In the event that the heads are loaded, processor 154 pulls down the head load line to signal the analog position control processor 226 to unload the heads and then proceeds to state 09. State 09 is a 0.5 second wait state during which the digital controller 154 waits for the position control processor 226 to execute some initialization procedures and de-assert the seek complete line. After one-half second control passes to state 10 at which controller 154 sets a five second time out signal upon entry and proceeds to monitor the seek complete signal. If seek complete does not occur within 5 seconds, an error status U4 is asserted and control is transferred to error state 03. In the event that the received unload command was actually a park head command variation of this command, state 10 asserts error condition S0 to cause the status lights to slowly blink and transfers control to error state 03 without shutting down the spindle motor. Under normal conditions a seek complete signal will be received before the 5 second time out and without a park head variation of the unload data pack signal. In this event, upon receipt of the seek complete signal from the position control processor 226, the digital processor 154 resets the position control processor 226 to turn off the spindle motor and proceeds to wait state 11.

At state 11 the digital control processor 154 waits for 5 seconds for the spindle motor to shut down and then proceeds to state 18 after actuating the receptacle motor command to turn on the motor and begin the ejection of a data pack. At state 18 processor 154 waits for the cam switch to open to indicate that ejection of the data pack has begun. If the cam unload signal is not indicated within a period of 3 seconds, an error signal S2 is asserted and control is transferred to error state 03. Under normal circumstances the cam switch will open within 3 seconds and control passes through a 10 millisecond debounce to state 19. At state 19 processor 154 sets a 5 second time out period and waits for the cam switch to close to indicate that the cam has rotated to a synchronization lobe which immediately precedes the short open period before the ejected lobe. If the 5 second time out occurs, error condition S2 is set and control passes to error state 03. Under normal circumstances the cam switch will close as the synchronization lobe is reached and control passes through a 10 millisecond debounce interval state 13 to state 20. At state 20 a 5 second time out counter is set and processor 154 waits for the cam switch to open upon occurrence of the short period open condition.

Upon opening of the cam switch, control passes through debounce wait state 13 to state 21.

In state 21 the receptacle motor is driven at half power by pulse width modulating the command signal and processor 154 waits for the home sense switch to close to indicate rotation to the fully ejected position. If the 5 second time out occurs before the cam switch indicates the ejected position, the error signal S2 is asserted and control passes to error state 03. Normally the cam switch will close before occurrence of the time out and control passes through debounce state 13 to the ejected state 01 at which processor 154 awaits a further command. Before proceeding through state 13 to state 01, the digital processor 154 upon exiting state 21 turns off the receptacle motor by deactuating the receptacle motor command.

Figure 40:
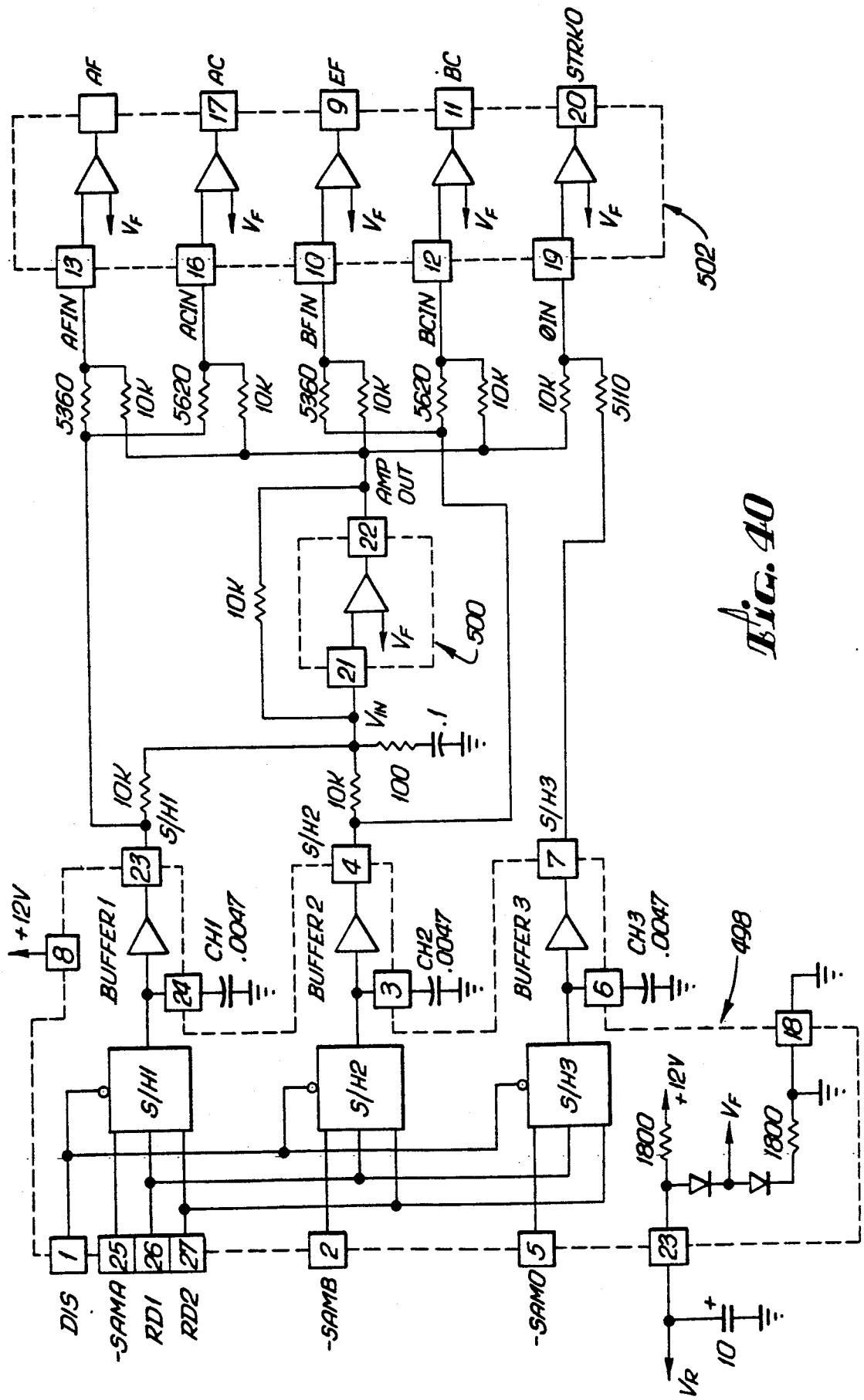
FIG. 40 is a block diagram representation of a stepper motor controller chip used in the invention.

STEPPER MOTOR CONTROLLER, Item 302;

The stepper motor controller 302 is an analog semicustom chip in a 28 pin PLCC package. Refer to FIG. 40 for a block diagram of the chip. The purpose of this chip is to sample the read data at various times during track revolution and generate error signals which can be used to determine the position of the head on the track. Its inputs are differential read data from video amplifier 300 as well as some timing signals that are generated by the sequence controller 304. The five outputs go to the 8049 Position Control microprocessor 226 (analog 8049) which samples these signals once per revolution to determine the position of the heads on the track. From this information it will readjust the winding current in the stepper motor to position the heads more accurately.

Referring to the block diagram on FIG. 40, it can be seen that there are three sample and hold channels referred to as item 498. These have rectifiers which take the differential read data and generate a voltage on the external hold caps CH1, 2 and 3 which represents the amplitude of read data during the sampling time. This voltage is then buffered and goes off the chip as S/H1, S/H2 and S/H3 The summing amplifier 500 generates AMP_OUT which is a signal that represents the average of S/H1 and S/H2. Lastly there are five error comparators 502 which take weighted versions of S/H1, S/H2 and S/H3 and generate TTL position signals to be used by the 8049.

Soon after index, the sequence controller 304 activates the DIS line which discharges the hold caps CH1, 2 and 3 on each of the sample and hold channels. Some time later, —SAM0 from the sequence controller enables sampling hold channel 3 to acquire differential read data on CH3. Then that is disabled and either —SAMA or —SAMB is activated to acquire read data on CH1 or CH2. These events happen soon after the index pulse and are timed by the sequence controller 304 so that the sample and hold channels will sample the track 0 servobursts, then the A and B servobursts, and hold those values of the amplitude of read data until the next index pulse when the process is repeated.

The external components around this chip are used to provide weighted versions and combinations of the S/H1, S/H2 and S/H3 signals to generate five output position signals, AF,AC, BF,BC and STRK0. STRK0 represents a track 0 signal which, if during the time SAM0 was active, the amplitude of the read data was high, then the STRK0 signal would be activated indicating that the heads are positioned on track 0. Every other track on the disk is written in such a way that the amplitude of read data during this time is roughly zero.

AF, BF, AC and BC represent position signals of the head on the track. The F represents a fine measurement, the C represents a coarse measurement, the A represents the voltage that was sampled on sample hold channel 1, the B represents the signal sampled on channel 2. The external resistors are designed so that the AF and BF will be active whenever the heads are positioned within roughly 3% of the desired on track position. The AC and the BC will be active when the heads are within 6% of the desired position. These TTL signals will be used by the analog 8049 226 to generate a new winding current in the stepper motor. Of course, every sample and hold chip does have leakage on the hold caps CH1, 2 and 3, so these error signals are only valid for a short while after the index pulse. Therefore the analog 8049 226 samples these signals relatively soon after the index.

The last feature on the chip is an internal voltage reference signal that is used by all of the comparators to place roughly a 6-volt bias on all the comparators.

SEQUENCE CONTROLLER AND ST-506 INTERFACE ARRAY, 304

Figure 41A:
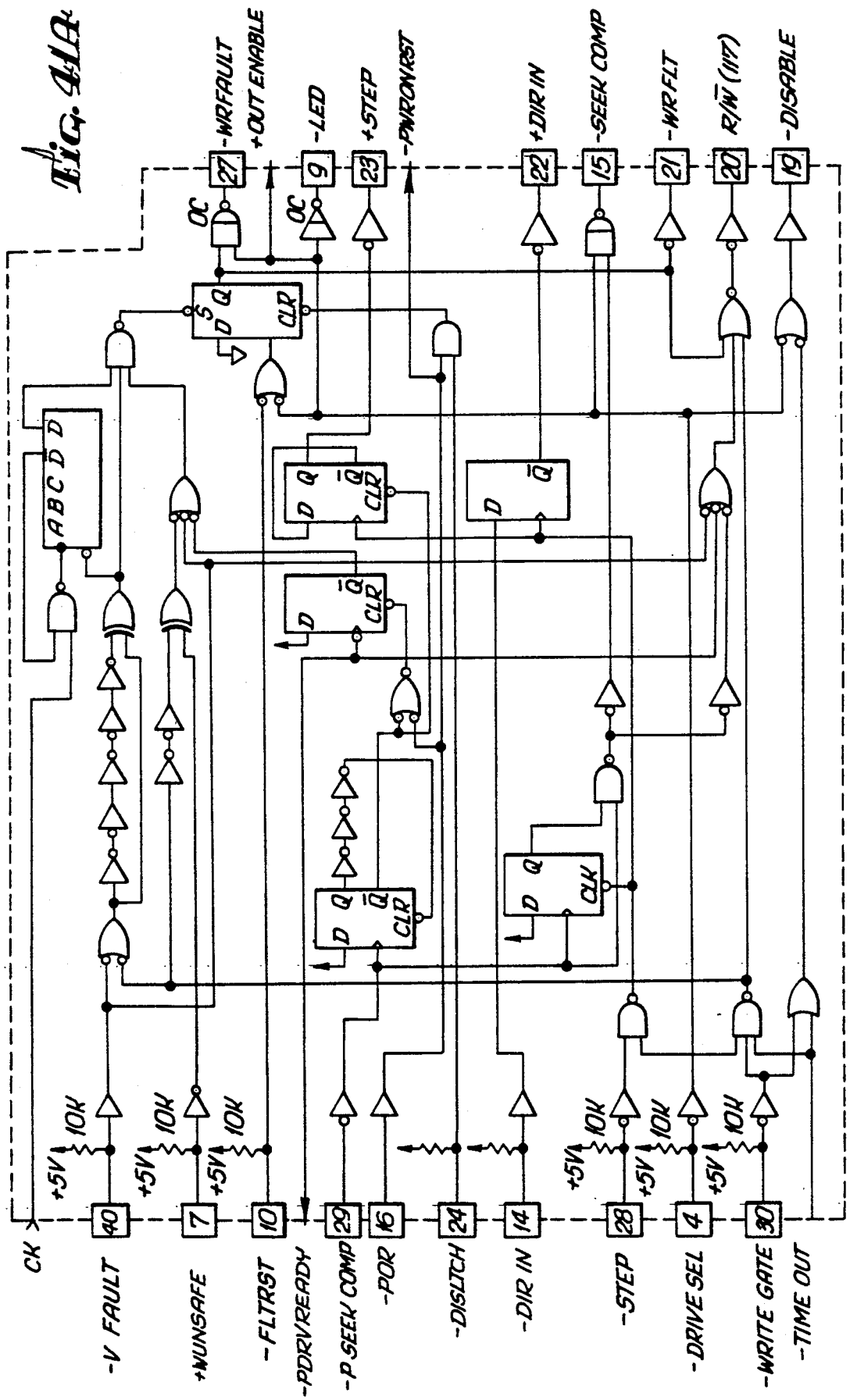
FIG. 41A is a block diagram of a sequence controller and ST-506 interface circuit used in the invention.
Figure 41B:
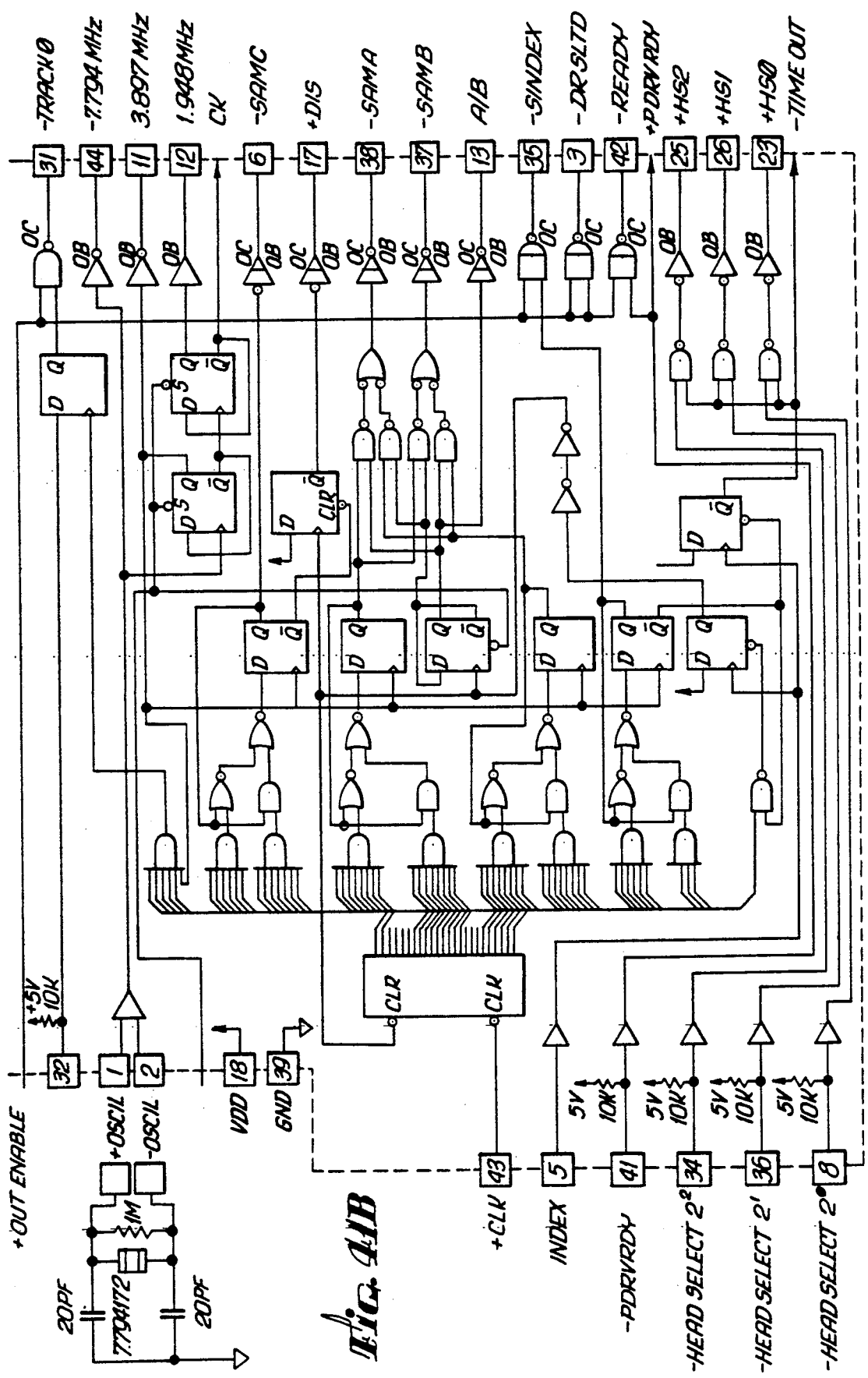
FIG. 41B is a block diagram representation of a further portion of the sequence controller and ST-506 interface shown in FIG. 41A.

The sequence controller and ST-506 interface array 304 (sequence controller) is a digital gate array in a 44-pin PLCC package. The block diagram of this chip can be found in FIG. 41A and 41B and timings for this chip can be found in FIGS. 42 and 43. The purpose of this sequence controller is two-fold. One function is to generate all the timing and control signals necessary for the analog portion of the controller and, two, to interface between the ST-506 bus and the analog portion of the controller.

The inputs to this chip from the ST-506 interface are —HEAD SELECT $2_0$, $2_1$ and $2_2$, —DRIVE SEL, —STEP, —DIR IN and —WRITE GATE. When the —DRIVE SEL line is active, the sequence controller outputs versions of these signals to the rest of the controller. These are +HS0, 1, and 2, —DR SEL, +STEP, +DIR IN and R/W(117). Likewise, signals from the analog portion of the controller such as +INDEX, —PDRVRDY, +STRK0, —PSEEKCOMP, —VFAULT, +WUNSAFE, —FLTRST are used to generate ST-506 outputs, —SINDEX, —READY, —TRACK0, SEEKCOMP, —WRFLT and —WRFAULT. The timing of several events on the analog controller is generated by the sequence controller using a 7.79 MHz oscillator as well as a divided-by 2 and a divided-by 4 version of that clock. A large bank of counters, which is reset every index, generates the disable and the sample signals for the sample and hold channels of the stepper motor controller chip 302. These tell the stepper motor controller chip 302 when to discharge the sample and hold channels and then when to sample for servobursts 0, A and B. Likewise, another signal is generated, A/B, which tells the analog 8049 226 which sample and hold channel 498 on the stepper motor controller 302 is used to sample servoburst A and which is used to sample servoburst B. These are alternated after every index so that the voltage offsets within the stepper motor controller 302 can be averaged out over time. FIG. 42 shows the timing of these outputs with reference to the index input. The index input comes straight from an LM393 comparator and the falling edge of that signal acts as the start of the counter/sequencers. From that time, a delayed index pulse is generated for the ST-506 as well as the sample signals and the discharge signal. Again, these can be found on FIG. 41.

Figure 43A:
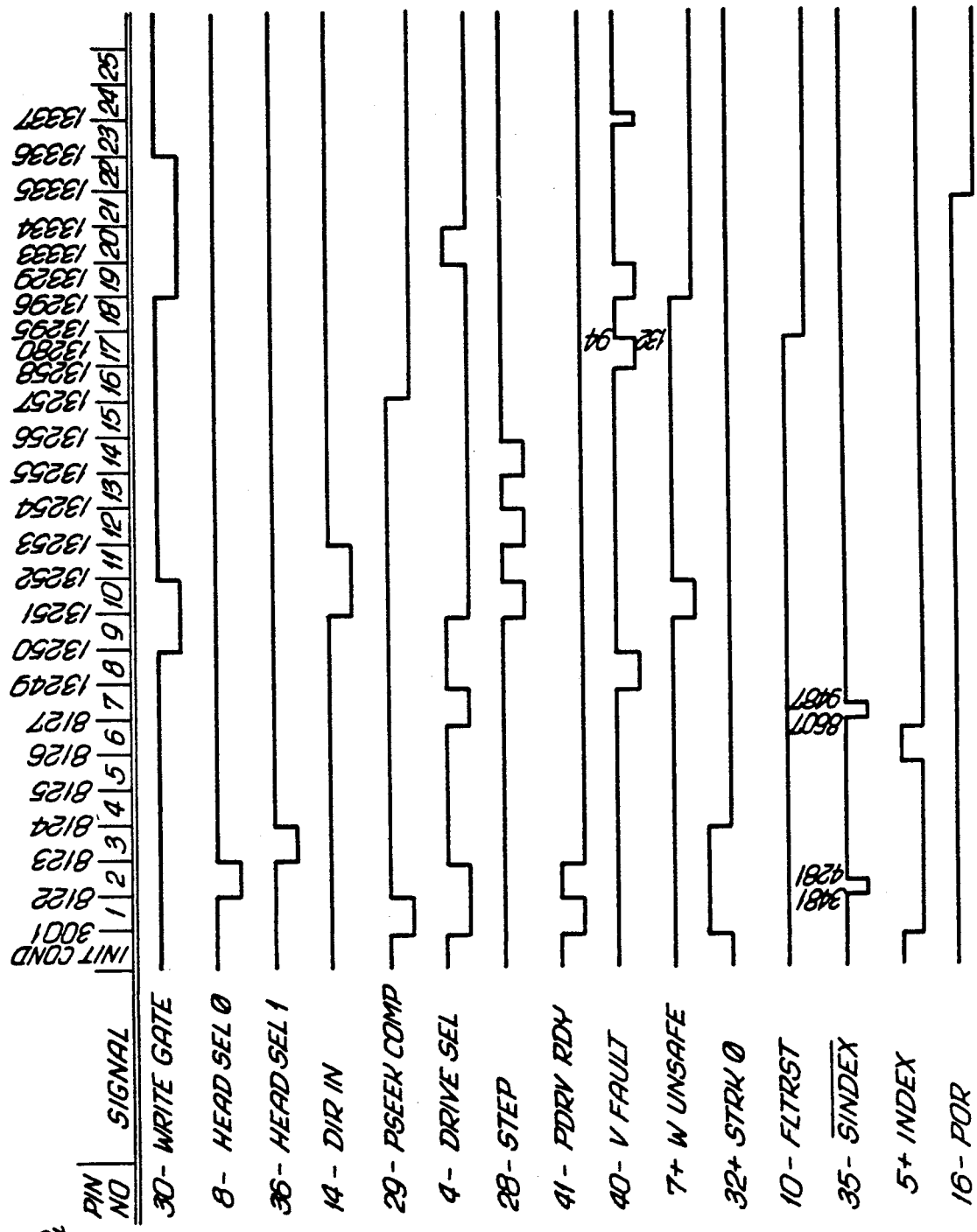
FIG. 43 A and B is an illustration of further timing signals used in the sequence controller and ST-506 interface circuit shown in FIGS. 41A and 41B.
Figure 43B:
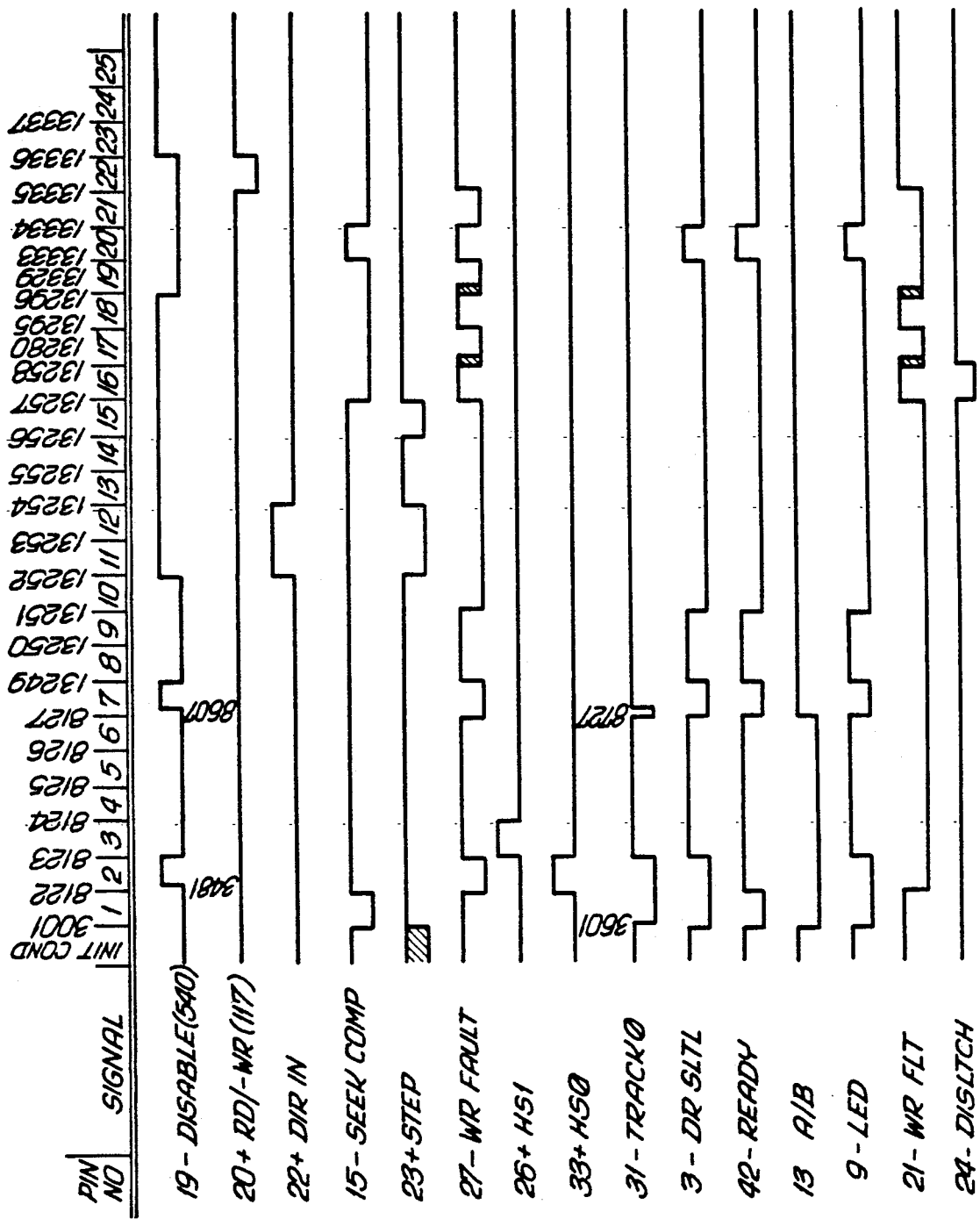
Figure 44:
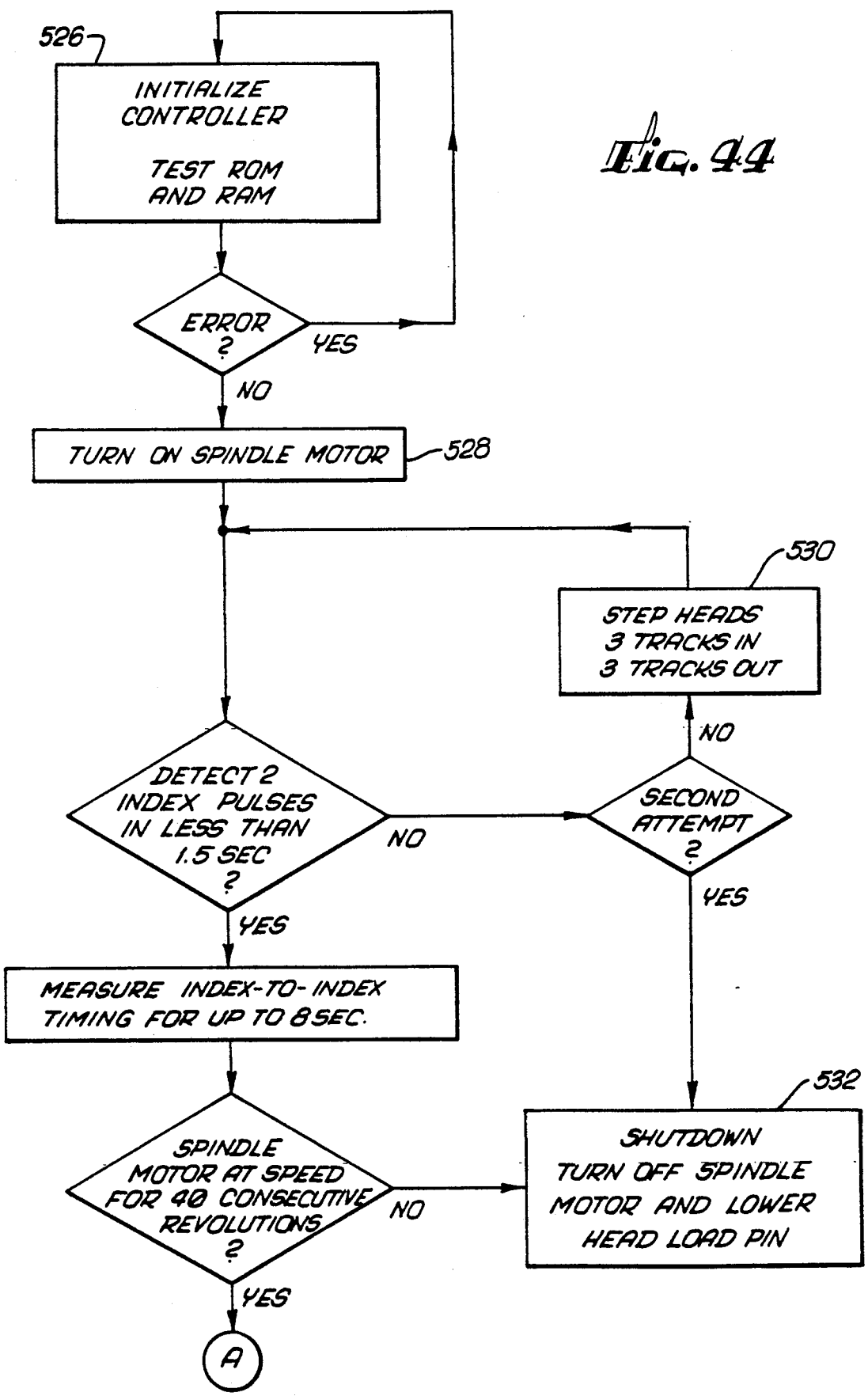
FIGS. 44 and 45 show a flow chart illustrating a main execution loop for an analog position control processor used in the invention.

The timing for various internal and external signals can also be found on FIG. 43. These include ST-506 inputs and outputs as well as the remainder of the control signals.

A few key items referring to the ST-506 bus should be noted here. Firstly, the head select outputs from the sequence controller 304 will always be set to head 0 soon after index because the servoburst information sampled by the stepper motor controller is located only on head 0. It is not located on other heads of the drive. Consequently, regardless of which head is being selected during the time that the servoburst is sampled, the head select outputs will select head 0. Secondly, the ST-506 bus requests motion of the head by using the −STEP and the +DIR IN inputs to move the heads in or out a number of tracks. Since the step input pulses happen very fast, much faster than the heads can possibly move, they are buffered by the analog 8049 226. After the heads have moved the specified number of steps, the analog 8049 226 will issue a −PSEEKCOMP signal which is then output to the ST-506 bus. Consequently, the first pulse on the step line sets a flip-flop inside the sequence controller 304 which deactivates the −SEEKCOMP line indicating that the drive is still seeking. After the analog 8049 226 has issued all the step pulses and settled the heads, its −PSEEKCOMP signal is passed through the sequence controller to clear the flip-flop and, consequently, the −SEEKCOMP signal on the ST-506 bus is activated. Thirdly, to protect the drive from writing over the servoburst or to protect it from writing during a period where the power is not sufficient to insure a proper write, a variety of signals into the digital gate array can disable the −R/W(117) output to prevent a write to the drive during times when it would be hazardous to do so. The inputs to this circuit are −VFAULT, indicating a voltage fault of maybe a low +5. or +12 volt input, the +WUNSAFE which is a signal from the SSI-117 in the head mechanism indicating that some hardware error has occurred and makes it unsafe to write at that time; and internal to the chip for a period after index the read/write output, R/W(117), will be disabled during the time of sampling the servobursts. These three mechanisms are combined to generate the R/W(117) line as well as to generate the write fault outputs to the ST-506 and to the analog 8049 226. Furthermore, these write fault signals are latched internally to the sequence controller and the latches can only be cleared by toggling the −FLTRST or by deselecting the drive. In the current embodiment, however, the −FLTRST line is not active; only the drive select mechanism is used for clearing this latch.

Also, one minor feature is the LED output. This open collector output is used to drive an LED on the front of the receptacle which indicates to the user that there is activity on the drive.

This is a description of how the entire system works to perform a write operation to the disk. Three major steps are needed. First is to send the heads to the desired cylinder on the selected drive. Secondly, the data to be written must be transferred from the system board to the sector buffer 176 on the digital board. Lastly, the data must be transferred from the RAM sector buffer 176 through the disk controller 182 on the digital board 48 and out to the drive.

WRITE OPERATION STEP 1;

The data processing system 40 will issue I/0 writes to the status/command buffer 158 of the digital 8049 154 in order to tell the digital 8049 154 to issue step pulses in order to move the head mechanism to the desired cylinder on the selected drive. This is done by issuing three commands to the status/command buffer 158 in the digital gate array. The act of writing to the control port automatically generates an interrupt to the digital 8049 154 which will stop what it is doing and read the status/command buffer 158, thereby clearing the interrupt. Soon afterwards the 8049 will write to the status/command buffer 158 to indicate that it is busy as well as to send status information back to the system.

Three commands are needed to set the desired address of the cylinder as well as to select the drive. The 8-bit port, it is broken into two 4-bit portions. The upper 4 bits would essentially be the command while the lower 4 bits would be the data associated with that command. This requires that three commands would be issued, SEEK_LOW, SEEK_MIDDLE and SEEK_N, which would send the desired cylinder number to the 8049 158 as well as the drive number. The lower 4 bits of the cylinder number would be sent with the SEEK_LOW; the middle 4 bits would be sent with the SEEK_MIDDLE; and the upper 3 bits would be sent with the SEEK_N command. The remaining bit in the SEEK_N command refers to whether the seek is to be a read seek or write seek. A read seek differs from a write seek in that it ends earlier because the analog controller will issue a short seek pulse as soon as the heads have gotten to the track prior to settling. At that time this pulse will be issued in the digital 8049 158, if it's a read seek, will issue seek complete. This tells the system that it can do a read, however, it should not do a write because the heads have not settled on the track; so they are not in correct position to perform a write. If, however, a write is requested then the digital 8049 158 will only issue seek-complete interrupt after the heads have been completely settled and the write operation is safe to be performed.

Lastly, the command SEEK_N also has 2 bits which select the desired drive. Upon receipt of the SEEK_N command the digital 8049 will compare the desired cylinder address, which is 11 bits, with the actual location of the heads on the selected drive. It will then select the drive by writing to the drive select latch 156 and it will set the direction line to point either inward or outward as needed. Lastly, it will issue as many pulses as necessary to move the heads from the present location to the desired location. The issuing of seek-complete will end step one.

WRITE OPERATION STEP 2;

The system 40 must now transfer data from the system board to the sector buffer 176. It does this by setting up the RAM buffer controller 172 (RB1002) chip to allow accesses to the sector buffer and to enable the RB1002 172 to automatically generate the addresses of where the data is to be stored in the sector buffer 176. The system will do an I/O write to the RB1002 to select either channel 1 or 2 by which is can transfer data from the system to the sector buffer. This I/O writes will set up the starting address and also the number of bytes to be transferred into the sector buffer. The last thing to be done is to set up the control port associated with channel 1 or 2 to enable the counter to count data transfers.

Now that RB1002 is set up and ready to go, the system will perform I/0 writes of write data to the data port which is an I/0 address (584H channel 1 or 58AH channel 2). The system bus interface 152 will decode this I/0 address and issue a −DMARQ1 or −DMARQ2 to the RB1002. The RB1002 will sample these inputs on the rising edge of the MUX clock and issue an acknowledge signal, −ACKEN, ACK1, and ACK2, when the MUX clock goes low indicating to the system bus interface 152 that the transfer is taking place and that it should drive the data bus with the write data. At the same time the RB1002 will output on the RA lines, the RAM address lines, the address in the sector buffer where that data is to be stored. Upon completion of the access to the sector buffer, the RB1002 will increment the address in the counter associated with channels 1 or 2 and decrement the number of bits to be transferred. In this way the system 40 will repeatedly perform I/0 writes to the data port and transfer as many sectors of information as needed from the system to the sector buffer. This completes step 2.

WRITE OPERATION STEP 3:

The system 40 must set up the controller to allow the sector buffer data to be transferred to the disk. Channel 3 on the RB1002 is reserved for use by the disk controller chip 182 (DC1001), to transfer data to and from the sector buffer and the disk. Therefore, the system 40 must set up the RB1002 172 channel 3 in order that data can be transferred from the sector buffer 176 to the DC1001 182. In order to do this it will perform I/0 writes to the RAM controller 1722 and set up the starting address and the number of bytes to be transferred on channel 3. Then it will enable counter channel 3.

Next it will have to set up the DC1001 182 to find the desired sectors and transfer them automatically to the sector buffer 176. This is done by I/0 writes to the DC1001 182 (592H and 583H) to set up the cylinder address and the head address so that the DC1001 182 can compare those fields with the ID field on the disk. If a match occurs then the DC1001 knows that it is operating with the desired sector and it will request data from the sector buffer 176 to be transferred to the disk. This is done by the DC1001 182 by generating a —DMARQ3 which will go directly to the RB1002 172. The RB1002 samples this signal on the rising edge of MUX and will output ACK1, ACK2 and −ACK to indicate that the DC1001 182 will have the next sector buffer cycle. The system bus interface 152 then generates an ACK3 signal indicating to the DC1001 that it has possession of the bus and should transfer data to or from the sector buffer at that time. The address for the data in the sector buffer is generated by the RB1002 172 and the data is transferred from the sector buffer 176 to the DC1001 182. The cycle is ended by the rising edge of the MUX clock and the DC1001 182 will latch the data to be read from the sector buffer and written to the disk. The DC1001 182 will serialize the write data and synchronize it to the write clock and send it to the disk automatically. Then it will issue another —DMARQ3 and the cycle will repeat until the number of sectors desired has been transferred. Upon completion of this the DC1001 will deactivate the DCBUSY line which will generate a interrupt IRQ14 to the system indicating that the write operation has taken place. At that time the system would read the RB1002 172 in the DC1001 182 status ports to ensure that the write operation occurred correctly and that all is in order. This completes step 3. The write has been performed to the disk.

A read operation would be very similar to a write operation. The three steps, however, would be reorganized in this manner.

READ OPERATION STEP 1;

The system would send the heads to the correct cylinder, just as before.

READ OPERATION STEP 2;

The data would be transferred from the disk to the sector buffer 176 in the similar fashion to Write Operation Step 3 above.

READ OPERATION STEP 3;

The data would be transferred from the sector buffer 172 to the system memory in a fashion similar to Write Operation Step 2 above.

The flow charts for operation of the 8049 analog or position control processor are shown in FIG. 44-47 to which reference is now made. Upon receiving a reset command at power up or otherwise, processor 226 initializes the controller and tests its ROM and RAM memory at step 526. This initialization procedure is repeated until no errors are found. Once no errors are found, the spindle motor is turned on at step 528 and processor 226 then attempts to detect the occurrence of two indexes pulses within less than 1.5 seconds to confirm that the spindle has actually begun rotating. If the spindle has not begun rotating, a counter is incremented and, if the counter does not indicate a second attempt to detect rotation, the heads are stepped three tracks in and three tracks out at step 630 before processor 226 again tries to detect initial rotation of the disk. Normally the heads would not be loaded at the time the spindle motor is turned on, but step 630 physically moves the disks to eliminate any static friction between the disk and the heads in the event that the heads are in fact loaded and the static friction may be preventing startup of this rotation. If after the second attempt to detect disk rotation a failure occurs, the disk controller 46 is shut down, the spindle motor is turned off and the head load pin signal to the digital processor 154 is pulled load to signal the error condition at step 532.

Normally rotation of the disk will be detected and position control processor 226 sets a timer for 8 seconds and then attempts to count 40 consecutive revolutions of the disk at nominal operating speed before the 8 second timer times out. If the head speed condition cannot be confirmed within 8 seconds, control passes to step 532 to shut down the system.

Figure 45:
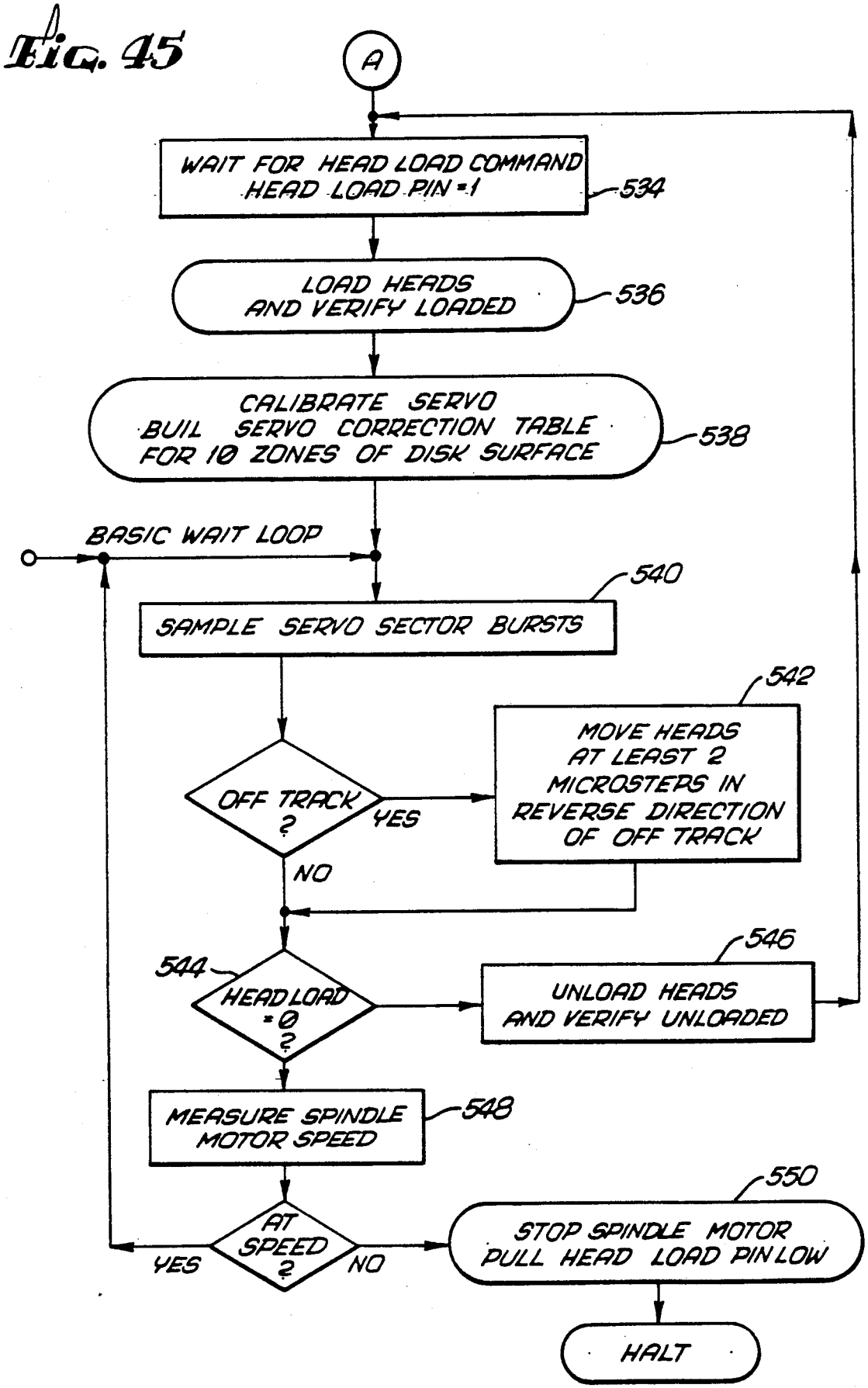

Normally rotation at speed will be confirmed and at step 534 as shown in FIG. 45, processor 226 waits for digital processor 154 to issue a head load command by releasing the head load pin to logic one. Upon the occurrence of a head load command, the heads are loaded and verified at step 536 as explained previously and track calibration is then executed at step 538.

While the integer steps of the positioning or stepper motor 94 place the heads at nominal track center, in fact, variations in temperature, spindle rotation and other environmental conditions cause offsets to occur between actual track center and nominal track center. Because the stepper motor 94 is a microstepping stepper motor, there are in fact 64 microsteps between each nominal track center position. The servo sector data can be utilized for detecting offtrack conditions and microstepping the heads to a position very close to actual track center.

However, to save time during normal disk operation, the calibrate servo step 538 builds a table of anticipated microstep offsets for the different tracks so that the anticipated offset can be implemented before even reading the servo sector for the first time. The time interval required for fine positioning can thus be significantly reduced.

The calibration step builds a servo-correction table for each of 10 zones which are radially distributed across the disk. This table stores correction data derived for four consecutive tracks corresponding to the four different phases of the stepping motor at a location near the center of each zone. Because a small backlash occurs in the head drive mechanism, two sets of data are maintained for each of the four tracks in each of the 10 zones. One set of data is derived by moving the heads from a radial outward direction toward the center of the disk and the other set of data is derived by moving the heads from the center of the disk toward the periphery of the disk.

Once the servo-correction table is built, the processor 226 goes into a basic wait loop until an interrupt produces a seek command or an unusual status condition is detected.

As the wait loop is executed, processor 226 samples the servo sector bursts at step 540. If the servo bursts indicate that the heads are off track, the heads are moved at least 2 microsteps toward the ontrack position at step 542 and the head load signal is tested at step 544. If the heads were detected as being initially on track, the head load step 544 is executed directly and, if the digital processor 154 has pulled the head load signal low, processor 226 acts at step 546 to unload the heads and verify the unload before proceeding to step 534 where it simply waits for a new head load command.

Normally the head load signal will not be pulled low and processor 226 measures the speed of the spindle motor at step 548 by determining the time interval between successive index pulses. Normally the spindle motor will be at speed and processor 226 returns to the sample servo sector burst step 540 to continue execution of the basic wave loop. In the event that a speed error condition is detected for the spindle motor processor 226 stops the spindle motor and pulls the head load pin low at step 550 to signal the error condition to the digital processor 154.

Figure 46:
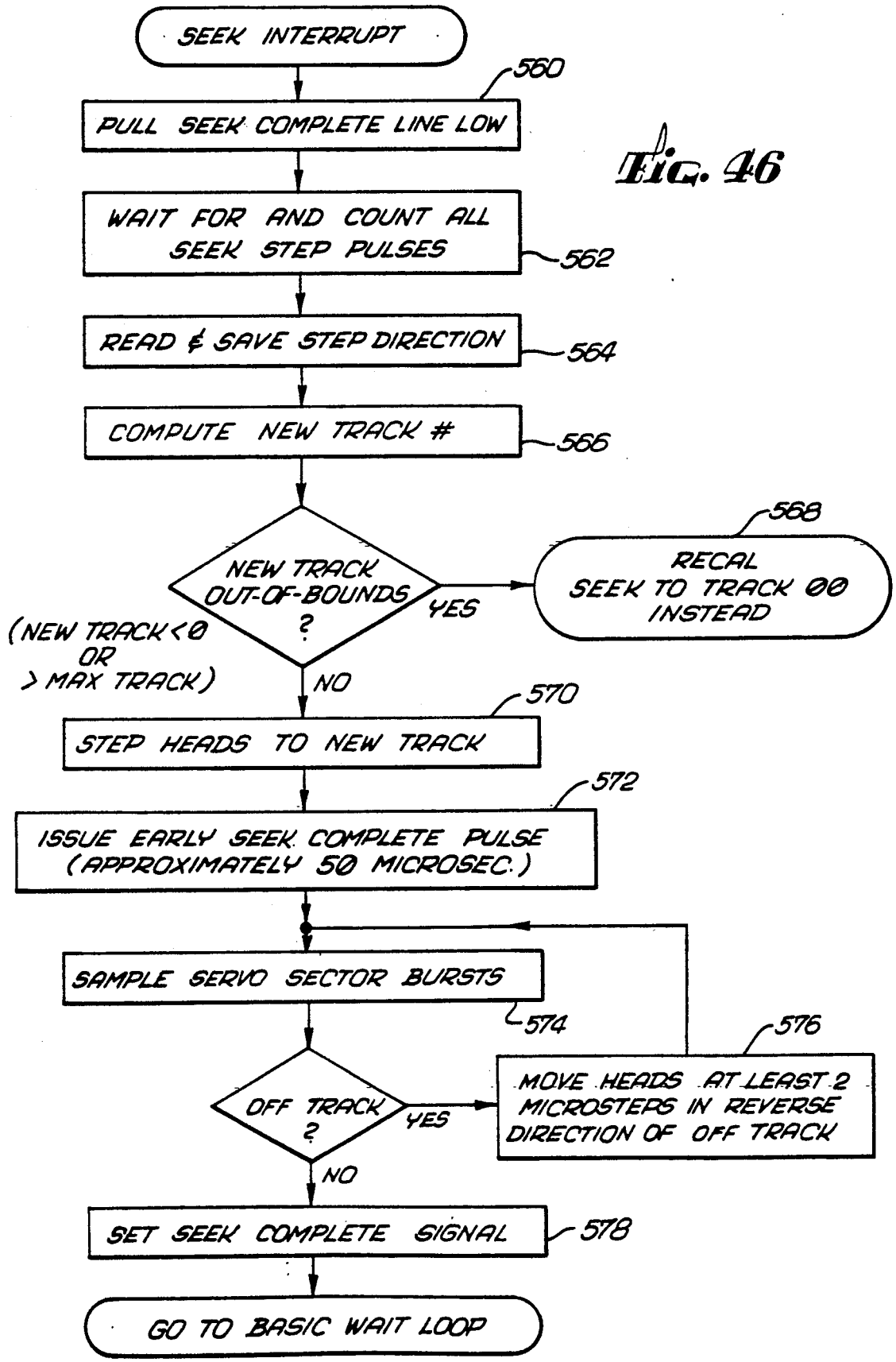
FIG. 46 shows a flow chart illustrating a seek interrupt procedure used by the analog position control processor in accordance with the invention.

Operation of the position control processor 226 in response to a seek interrupt from the digital processor 154 is illustrated in FIG. 46 to which reference is now made. At step 560 the position control processor 226 pulls the seek complete line low to signal to the digital processor 154 that a seek is in progress and then waits for receipt of all seek step pulses at step 562. It will be recalled that the position control processor 226 receives at an input thereof 1 pulse for each track through which the heads are to be moved. The step direction signal is read and saved at step 564 and the counted step pulses are utilized to compute the new track number at step 566. If the computed new track number is found to be out of bounds, that is less than zero or greater than the max track number, processor 222 executes a recalibration and seeks to tracks 00 instead of executing the commanded seek at step 568.

Normally the computed new track will be within bounds and at step 570 position control processor 226 commands stepping of the heads to the computed new track. After reaching the new track processor 226 issues the early seek complete pulse of approximately 50 microseconds duration at step 572 to enable reading of data from the new track even before fine positioning has been completed.

The position control processor 226 then enters a fine positioning loop by sampling the servo sector burst at step 574. If the servo sector bursts indicate an off track condition step 576 is executed to move the heads at least 2 microsteps toward the on track position and the sample servo bursts are then detected again at step 574. As soon as the on track condition is detected, the seek complete signal is set at step 578 and processor 226 returns to the basic wait loop which was interrupted by the seek interrupt.

Figure 47:
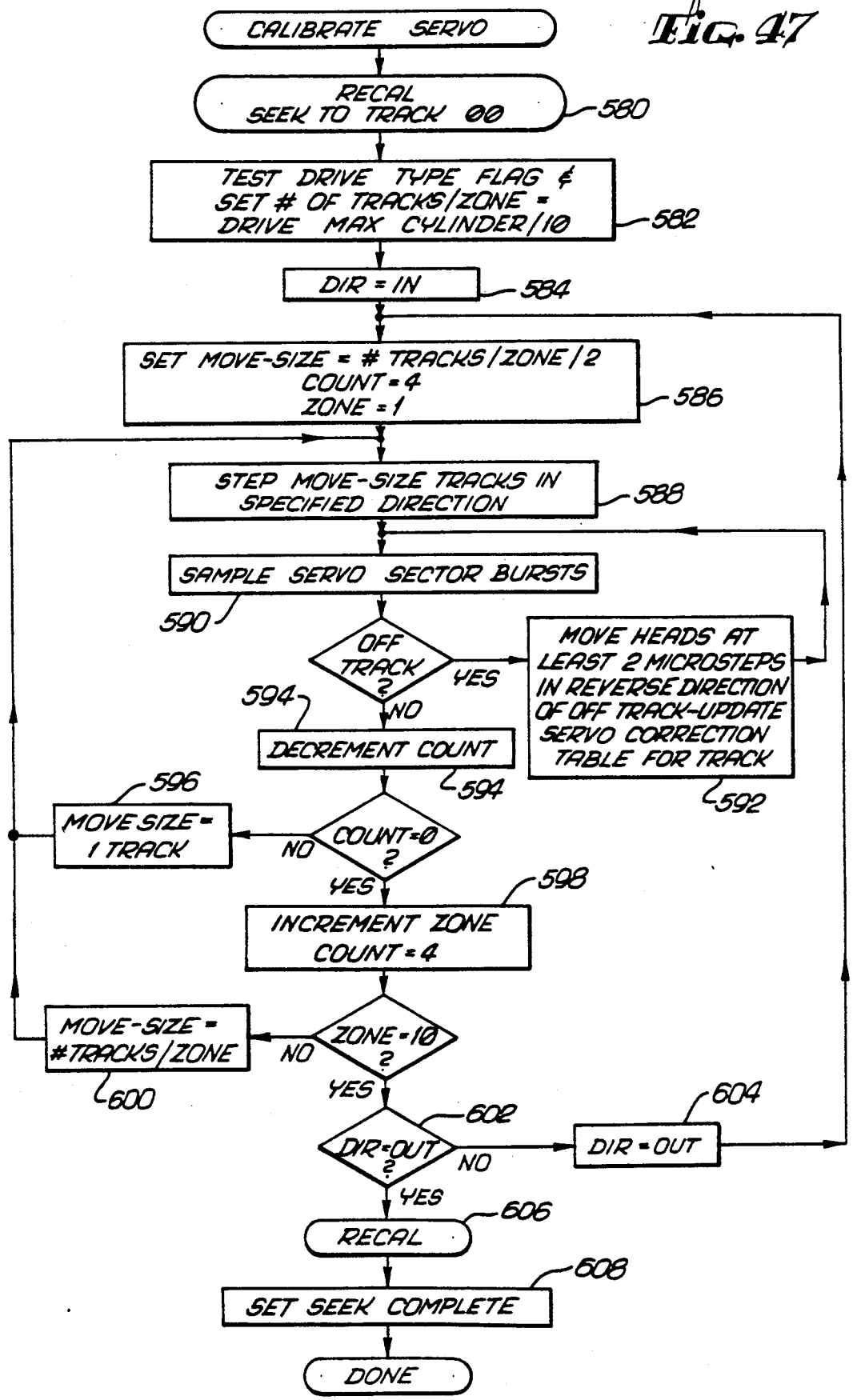
FIG. 47 shows a flow chart illustrating a calibrate servo procedure used by the analog position control processor.

Reference is now made to FIG. 47 which provides a more rigorous explanation of the calibrate servo procedure. At step 580 processor 226 does a recalibration and seeks to track 00. The drive type flag is then tested and in response processor 226 sets a variable representing the number of tracks per zone to the drive maximum number of cylinders indicated by the drive type flag divided by 10.

At step 584 the direction flag is set to in and at step 586 the MOVE_SIZE variable is set to one-half the number of tracks per zone, a counter labeled count is set to 4 and a variable zone is set to 1. At step 588 processor 226 then commands the heads to step MOVE_SIZE tracks in the direction specified by the direction flag. This direction is initially inward. The A and B servo bursts are then sampled at step 590 and a track centering loop is entered. As soon as the heads are centered on track the count variable is decremented at step 594. If count has not been decremented to zero variable MOVE_SIZE is set to 1 at step 596 and control loops back to the step tracks procedure at step 588.

Note that during the track centering loop as the heads are microstepped at step 592 toward track center the servo correction table is updated for the current track at each execution of step 592. The servo correction table thus stores the required offset data at any given time that the heads are found to be on track and the positioning loop is exited.

As soon as the four consecutive tracks for a given zone have been calibrated a step 598 is executed to increment the zone number and again set the count value to 4. Variable MOVE_SIZE is updated to the number of tracks per zone at step 600 before returning to the step procedure at step 588 to calibrate the four tracks in the next zone.

As soon as the zone count indicates that four tracks in each of the ten zones have been calibrated the direction flag is tested at step 602. If set to in the direction flag is set to out at step 604 and the calibration of four tracks per zone in each of the ten zones is repeated while the heads are moved in the radially inward to outward direction. Upon completion of recalibration in the outward direction recalibration is performed at step 606 and the seek complete signal is then set at step 608 to inform digital processor 154 that processor 226 is ready to receive a new command before processor 226 exit the calibrate servo procedure and returns to the calling procedure.

Figure 48:
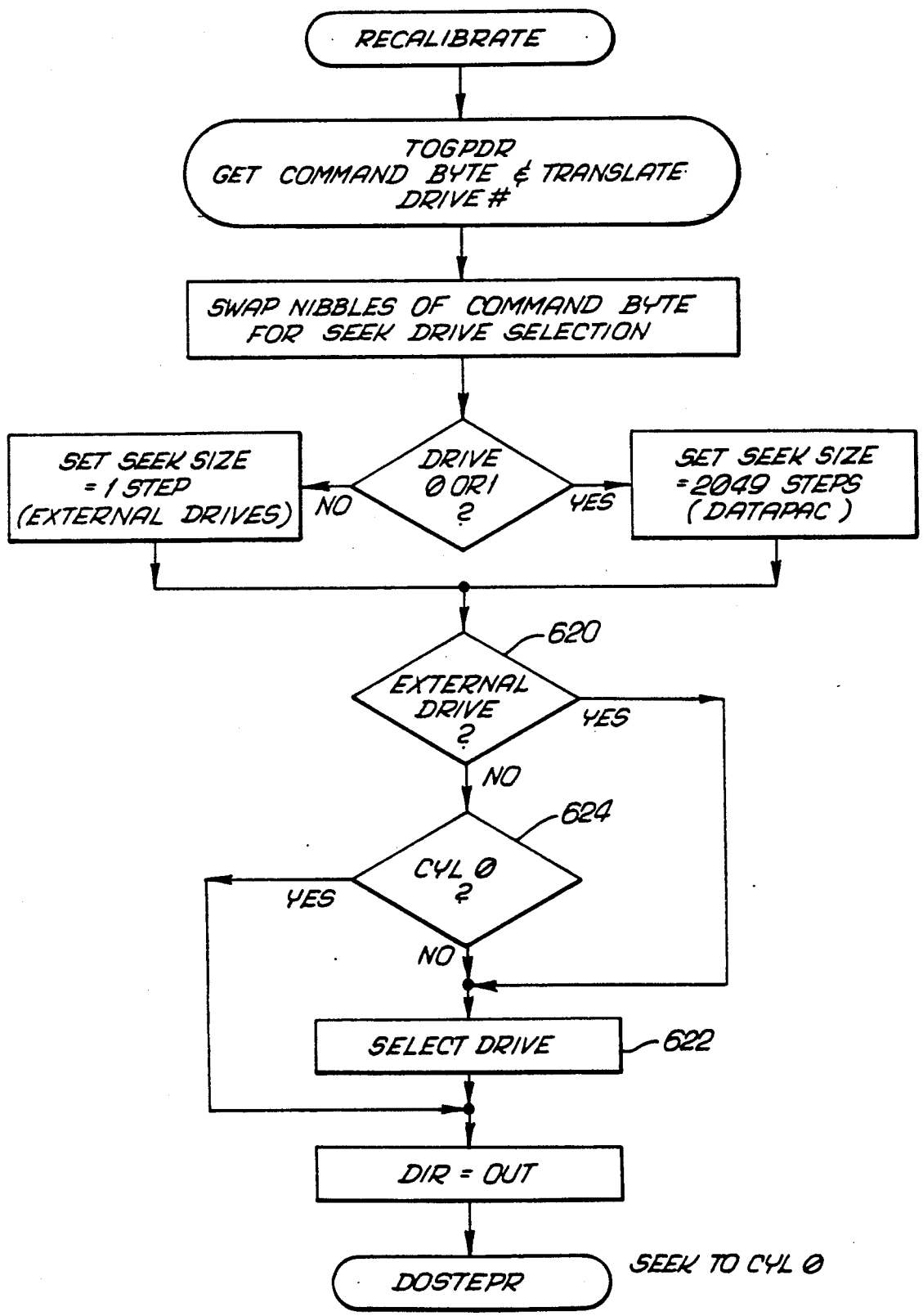
FIG. 48 is a flow diagram illustrating a RECALIBRATE procedure.

The digital processor 154 limits access to tracks 0 and 1 by checking for termination at track 0 or 1 in response to each command received from the data processor 40 and deselecting the drive, asserting write inhibit or both as appropriate whenever track 0 or 1 is the destination track. For example, as shown in FIG. 48, in response to a recalibrate command, the digital processor 154 checks at step 620 to see if the command pertains to a removable drive or an external ST-506 drive. If the command pertains to an external drive, the drive is selected at step 622 and the calibration proceeds. On the other hand, if the command pertains to a removable drive, the cylinder number is tested at step 624 and the select drive step 622 is skipped over if the drive is at cylinder 0.

As shown in FIG. 6, a write inhibit NAND gate 186 receives the original write gate signal, WGATE, from disk controller 182 as well as the complement of the write inhibit signal, −WRINH, from the drive select latch 156 and generates the final write gate signal, −WRTGATE, in response thereto. Assertion of signal −WRINH active low thus blocks the output write gate signal from NAND gate 186. The inability of interface circuit 152 to pass the write gate signal means that NAND gate 298 in FIG. 12 will block the output of write data to a drive.

Figure 49:
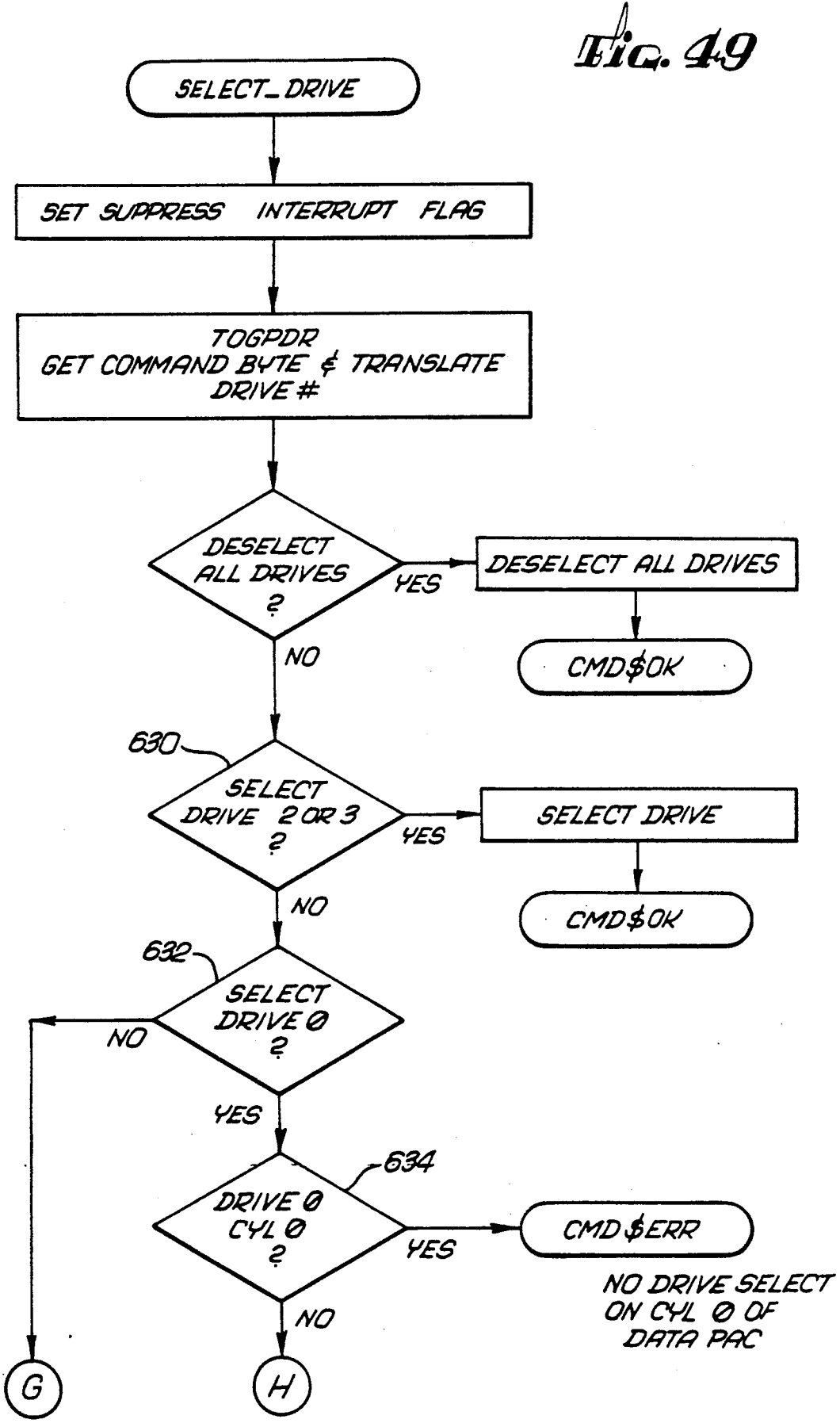
FIG. 49 and FIG. 50 are a flow diagram illustrating a SELECT_DRIVE procedure.
Figure 50:
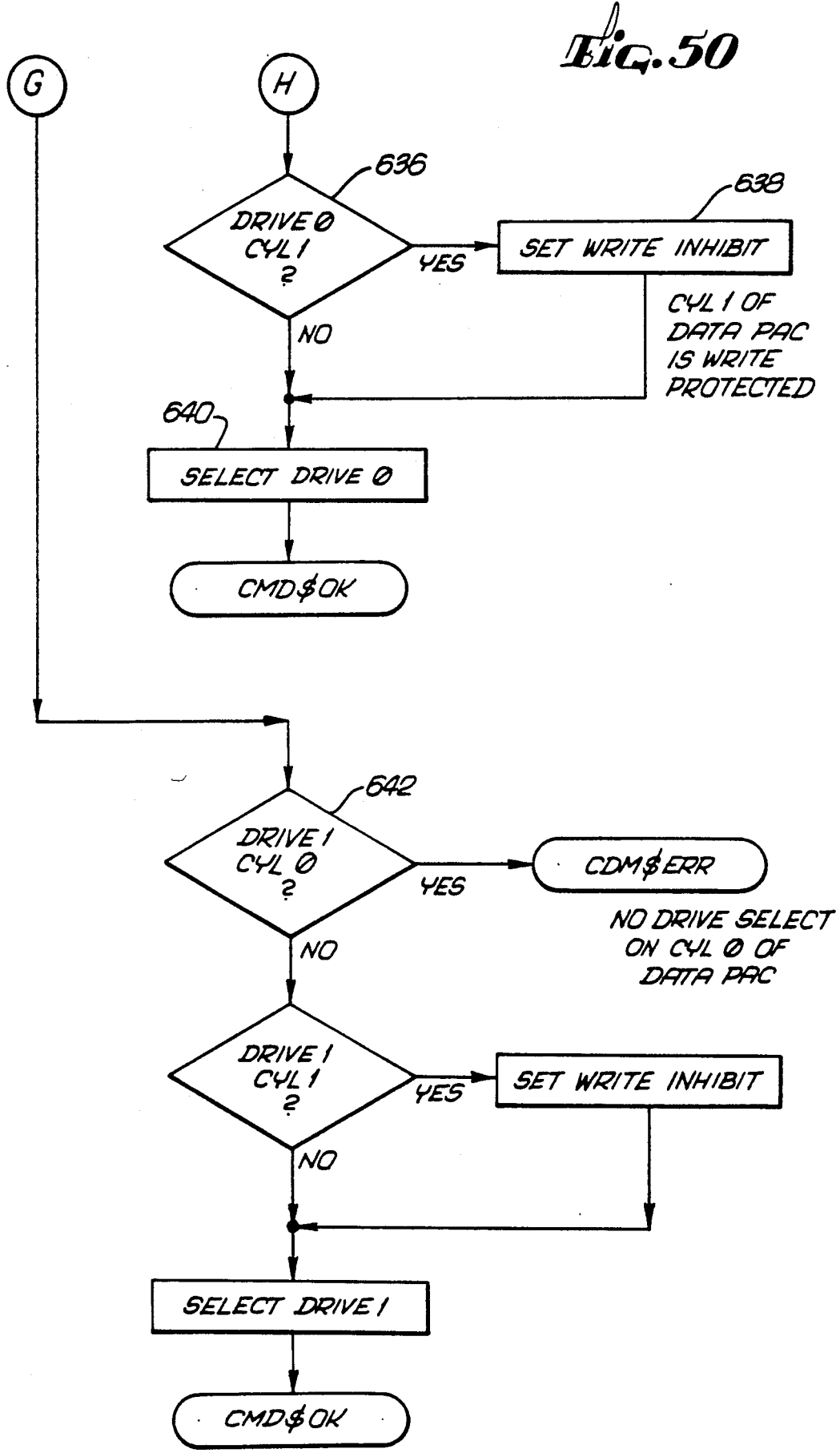
Figure 51:
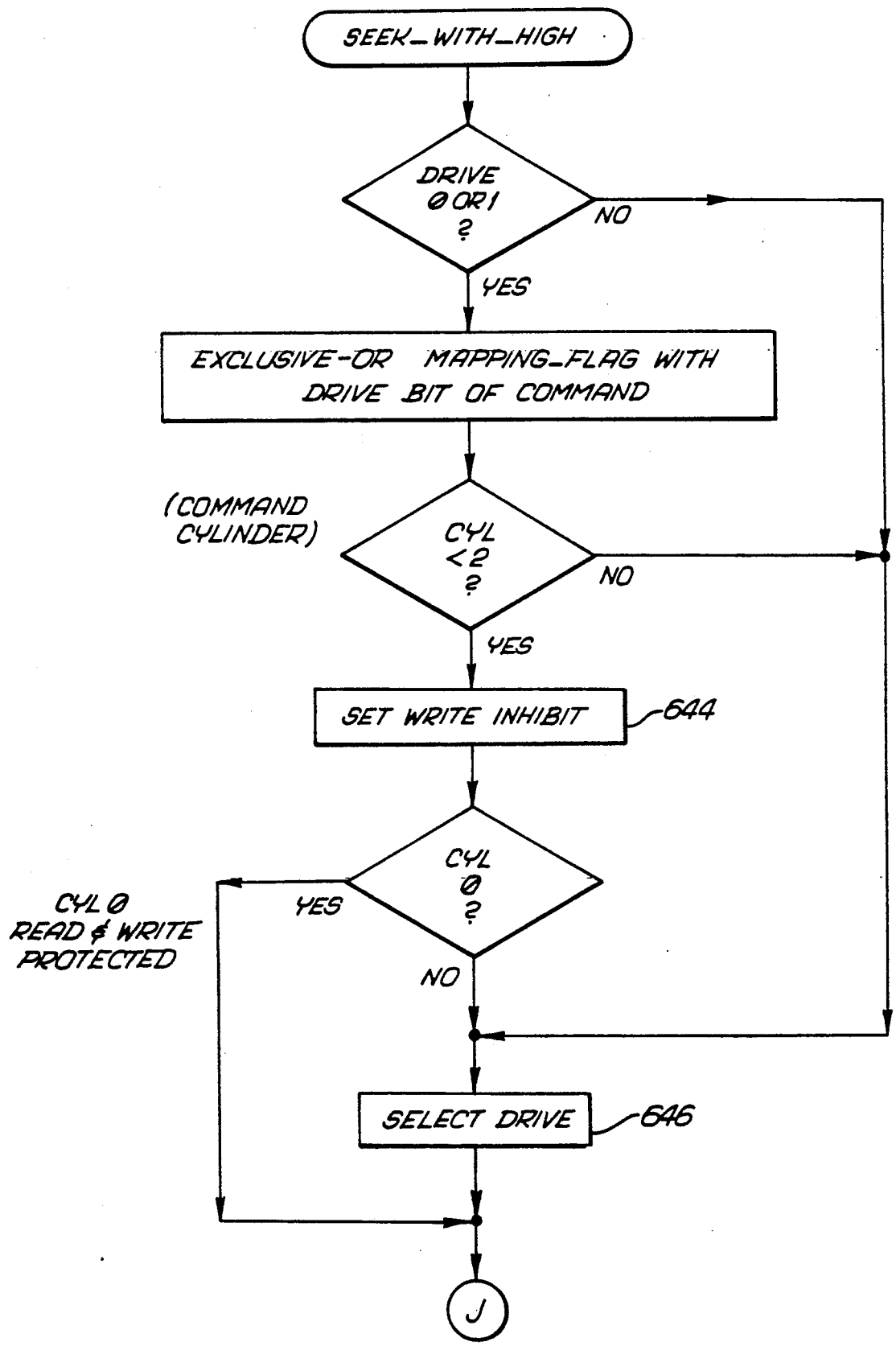
Figure 52:
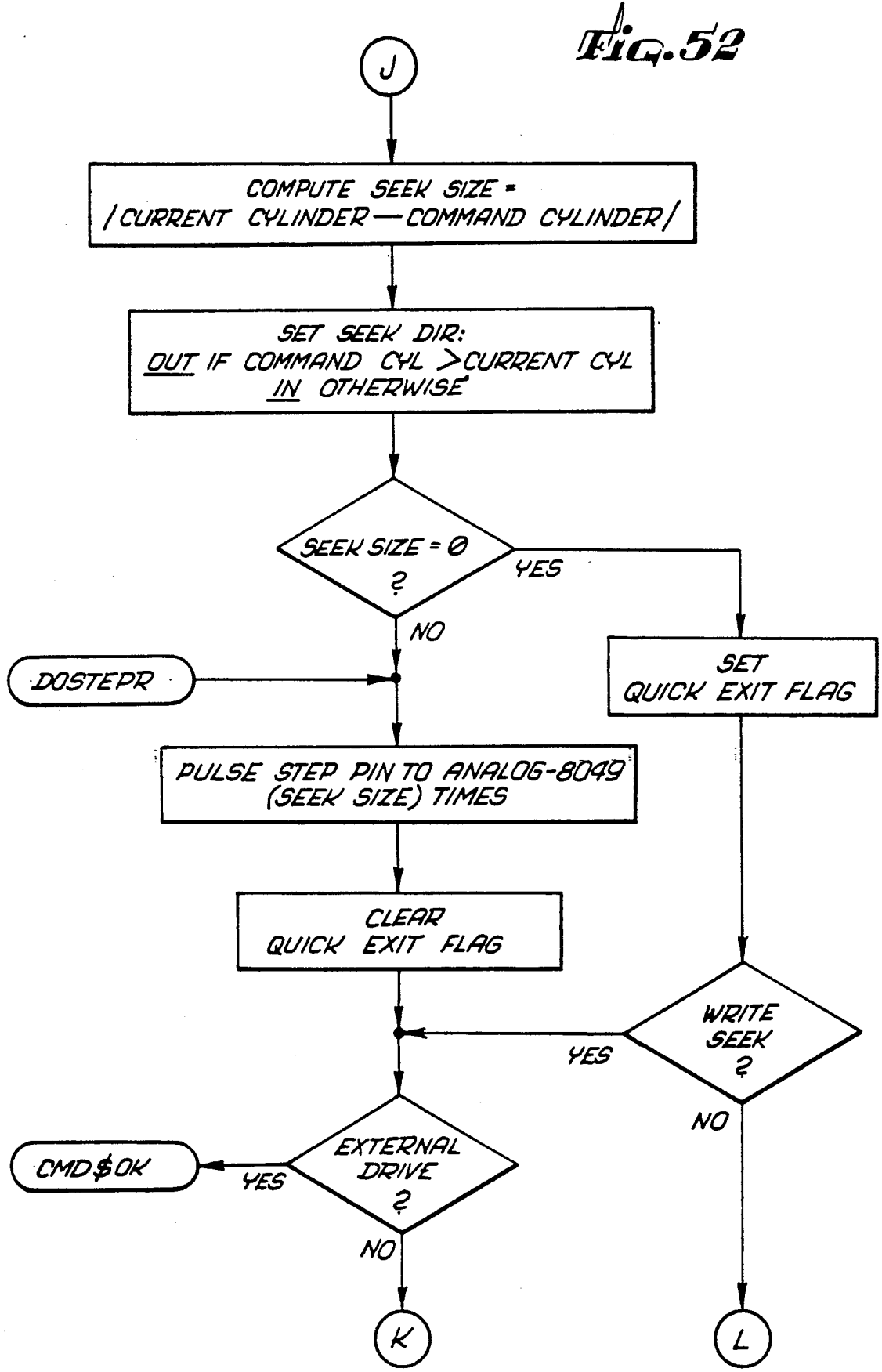
Figure 53:
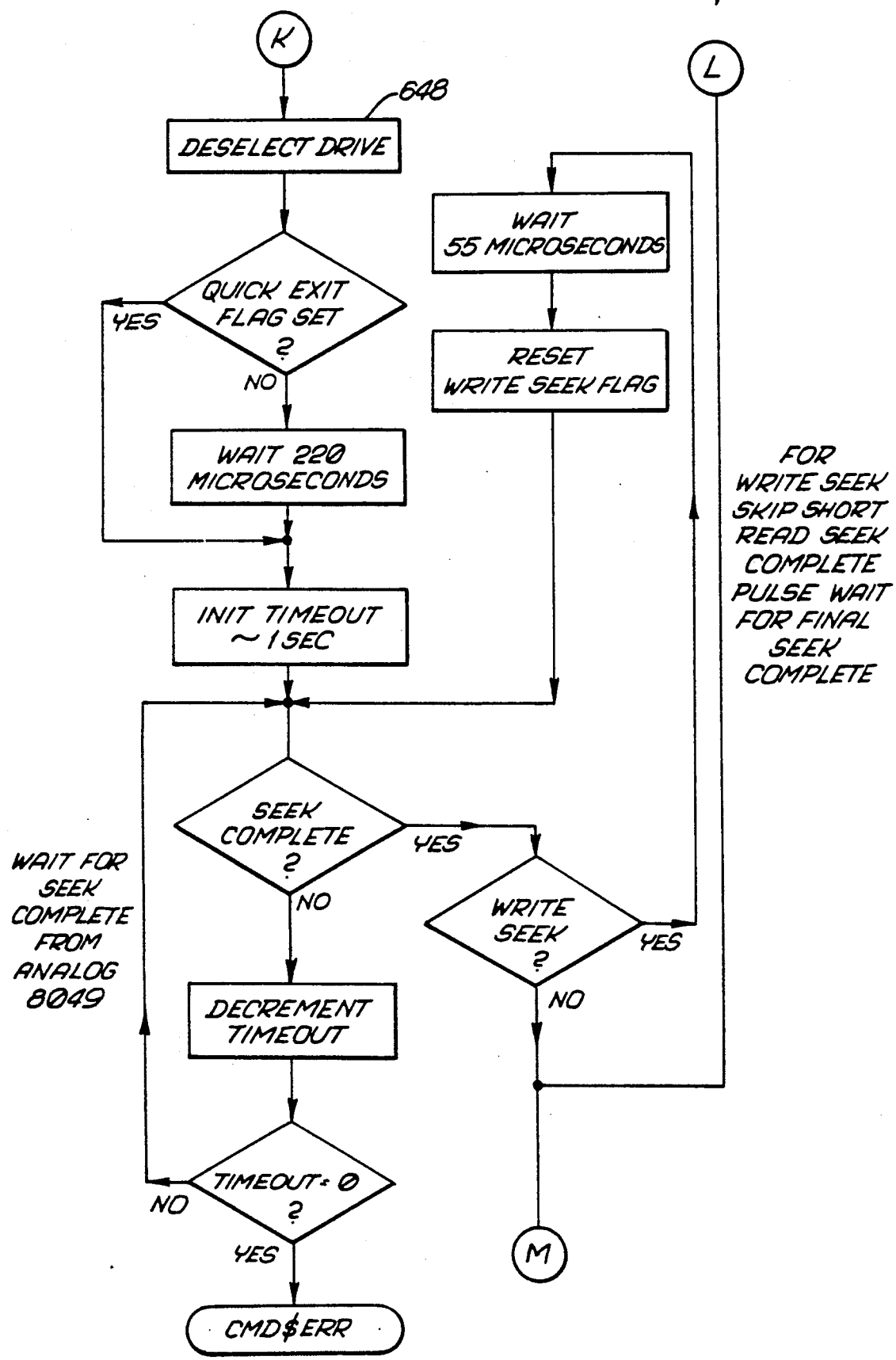

FIGS. 49 and 50 illustrate the select drive procedure. Again, at step 630, the processor tests to determine if selection of drive 2 or 3 has been commanded. If yes, the indicated drive is selected and the procedure continues. If no, then the command pertains to one of the removable drives and a test is made for drive 0 at step 632. If drive 0 is indicated, a test is made at step 634 for cylinder 0. If at cylinder 0, the procedure terminates without selecting the drive. If not at cylinder 0, a test is made for cylinder 1 at step 636. If drive 0 is at cylinder 1, the write inhibit signal is set at step 638 before the drive is selected at step 640. If drive 1 has been indicated, a procedure similar to the select for drive is executed for drive 1 starting at step 642.

FIGS. 51-55 illustrate the response of the digital processor 154 to a SEEK_HIGH command from the data processing system 40. It will be recalled that the middle and low nibbles of the destination cylinder must be set before asserting this command. This command transfers the high 4 bits and actually causes execution of the seek. At step 644 the write inhibit signal is set if drive 1 or 0 is involved in the command and the destination cylinder number is less than 2. Further, if the destination cylinder is cylinder 0, a select drive step 646 is skipped. In addition, the drive is deselected at step 648 and then again selected at step 650 only if the drive is not positioned at cylinder 0 before exiting the procedure. At step 652 the drive is specifically deselected if the seek is to cylinder 0.

RLL(2,7) CODING;

The use of RLL(2,7) coding allows 50% more data storage than traditional MFM coding. This scheme converts 8-bits of data into sixteen bits of write data which guarantee a minimum of two and a maximum of seven zeros between flux transitions on the drive. A unique encoding tree is shown in FIG. 56 along with the code conversion table. The serial data bit stream traverses the encoding tree, starting at the root. On each leaf of the tree the RLL(2,7) code for that data stream is displayed. As an example, if the data was 1100110 the code would be 1000 for 11, 001000 for 001 and 0100 for 10 which combines to 10000010000100.

What is claimed is:

1. A hard disk drive system compromising:
    a disk drive having a rotatable storage media and at least one data transducer that is movable radially relative to a center of rotation of rotatable storage media to write data to and retrieve data from the storage media, the data being stored on the media in a plurality of sectors which are sequentially disposed circumferentially about the storage media;
    a disk drive controller coupled to communicate information over a central processing unit system bus and to control information transfers with the disk drive in response to information received form the system bus, the controller including a RAM sector store which is large enough to store all of the data that may be stored in a plurality of sectors on the media, a positioning subsystem that controls the positioning of the data transducer relative to the storage media in response to information received over the system bus and a data transfer subsystem controlling data transfers between the sector store and the storage media and between the sector store and the system bus in response to information received from the system bus and wherein the sector store transfers data sufficiently fast that data for a plurality of sectors can be continually sequentially exchanged with a plurality of physically sequential sectors on the media without physical sector interleave; and
    a second disk drive having a rotatable storage media and at least one data transducer that is movable radially relative to a center of rotation of the rotatable storage media to write date to and retrieve data from the storage media, the data being stored on the media in a plurality of sectors which are sequentially disposed circumferentially about the storage media, the disk drive controller being coupled to control information transfers with the second disk drive in response to information received from the system bus including separate sets of control registers for the first mentioned and second disk drives and being capable of commanding overlapping seeks to selected cylinders by the first mentioned and second disk drives.

2. A disk drive system according to claim 1 wherein the disk drive has a manually activatable write protect switch having a write protect position indicating that new data should not be written to the disk drive and a write enable position indicating that writing of data to the disk drive is enabled, the switch providing an indication of the state of activation thereof; and
    the disk drive controller is coupled to receive read data and status signals from the disk drive and to provide write data and control signals to the disk drive, the status signals including the indication of the state of activation of the write protect switch and the controller responding thereto by disabling communication of write data to the drive when the write protect state of the write protect switch is indicated.

3. A disk drive system according to claim 1 wherein the disk drive further includes:

a disk drive interface connector providing communication of signals between the disk drive and a disk drive controller, said signals including data that is being read from and data that is being written to the storage media;

a spindle motor coupled to rotate the rotating storage media, the spindle motor having at least one position sensor providing position information to the interface connector and at least one drive winding coupled to receive drive current from the interface connector; and a positioning motor having at least one drive winding and coupled to position the at least one data transducer at a selected radial position in response to a current for the at least one drive winding received from the interface connector, and wherein the disk drive controller further includes:

a controller interface connector engaging the disk drive interface connector and communicating signals therebetween;

a spindle motor control circuit receiving spindle motor position information from the controller interface connector and including a current drive generating and providing to the controller interface the drive current for the at least one spindle motor winding in response to the received position information;

a positioning motor control circuit including a current drive generating and providing to the controller interface a current for the at least one positioning motor drive winding in response to positioning commands;

a positioning subsystem coupled to provide positioning commands to the positioning motor control circuit in response to commands received from a data processing system; and a data transfer subsystem coupled to communicate data between the controller intrace and the data processing system in response to commands received from the data processing system.

4. A disk drive system comprising:

a disk drive having a rotatable storage media and at least one data transducer that is movable radially relative to a center of rotation of the rotatable storage media to write data to and retrieve data from the storage media, and the data being stored in the media in a plurality of sector which are sequentially disposed circumferentially about the storage media; and a disk drive controller coupled to communicate information over a central processing unit system bus and to control information transfers with the disk drive in response to information received from the system bus, the controller including:

(a) a sector store which is large enough to store all of the data that may be stored in a plurality of sectors on the media;

(b) a positioning subsystem that controls the positioning of the data transducer relative to the storage media in response to information received over the system bus;

(c) a data transfer subsystem controlling data transfers between the sector store and the storage media and between the sector store and the system bus in response to information received from the system bus, the data transfer subsystem passing data read from the storage media only when enabled by a selected state of a drive select signal and writing data to the disk drive only when enabled by a selected state of a write inhibit signal;

(d) a first latch storing the drive select signal; and (e) a second latch storing the write inhibit signal, the positioning subsystem storing a read inhibit state of the drive select signal in response to a command to position the data transducer at a location that is predetermined to be a nonreadable location and storing write inhibit state of the write inhibit signal in the second latch in response to a command to position the data transducer at a location that is predetermined to be a nonwriteable location.

5. A disk drive system comprising:

a plurality of disk drives, each disk drive having a rotatable storage media and at least one data transducer that is movable radially relative to a center of rotation of the rotatable storage media to write data to and retrieve data from the storage media, the data being stored on the media in a plurality of sectors which are sequentially disposed circumferentially about the storage media; and a disk drive controller coupled to communicate information over a central processing unit system bus and to control information transfers with the disk drive in response to information received from the system bus, the controller including:

(a) a sector store which is large enough to store all of the data that may be stored in a plurality of sectors on the media;

(b) a positioning subsystem that controls the positioning of the data transducer relative to the storage media in response to information received over the system bus;

(c) a data transfer subsystem controlling data transfers between the sector store and the storage media and between the sector store and the system bus in response to information received from the system bus;

(d) a drive select latch;

(e) a digital control processor coupled to receive commands from a data processing system over the central processing unit system bus and control the position of the data transducers at the disk drives in response thereto, the digital control processor clearing any drive select signal for a given disk drive from the drive select latch in response to a receipt of a command to position a transducer for the given drive to a location that is predetermined to be neither readable nor writeable and setting a write inhibit signal in the drive select latch in response to a receipt of a command to position a transducer for the given drive to a location that is predetermined to be a read only position;

(f) a plurality of gates, each associated with a different disk drive and passing read data from the associated drive only when enabled by a drive select signal for the associated drive;

(g) a disk controller circuit generating a write gate signal during times that data can be properly written to a selected disk;

(h) a first gate coupled to block passage of write data to a disk drive unless enabled by the write gate signal;

(i) a second gate disposed between the disk controller and the first gate to block communication of the write gate signal to the first gate when the write inhibit signal is asserted;

(j) a multiplexer coupled to receive read data from a selected one of the plurality of gates; and (k) a read data circuit coupled to read received data from the multiplexer.

6. A hard disk drive system for receiving data from and furnishing requested data to a data processing system via a system bus, the disk drive system providing high speed, continuous reading and writing of at least a plurality of sectors arranged in sequential, non-interleaved fashion, the hard disk drive system including:

a hard disk drive having at least one magnetic disk rotatable about a central axis and a transducer associated with each disk surface, the transducers being movable radially relative to the axis of rotation to write data to and retrieve data from the associated disk surface, the data being stored on the disk surface in a plurality of sectors disposed along a plurality of circular tracks concentric with the axis;

a sector store bus;

an interface providing bidirectional communication of commands and data between the system bus and the sector store bus;

a RAM sector store coupled to receive data from and furnish stored data to said sector store bus, the RAM sector store being large enough to store all of the data that may be stored in at least a plurality of said sectors;

a RAM sector store controller responsive to command signals from said sector store bus and connected to said RAM sector store for controlling accessing of said RAM sector store;

a disk controller coupled to the sector store bus for controlling data transfer between said disk drive and said RAM sector store; and means responsive to data processing system commands for counting a predetermined number of sectors of data to be transferred between the disk drive and the RAM sector store.

7. A hard disk drive system, as set forth in claim 6, further including:

a plurality of hard disk drives;

means coupled to said drives for selecting a drive to be written to or read from;

means coupled to said drives for controlling the position of the transducers of said drive; and a bus coupling said interface with said transducer position controlling means and said drive selecting means, said bus providing bidirectional communication of status and command information.

8. A hard disk drive system, as set forth in claim 6, in which:

the interface includes a page register responsive to system bus data and coupled to select a page in said RAM sector store for receiving data to be stored, the counting means including a loadable sector counter coupled to receive a predetermined sector count value from the system bus and count down the sector values as sectors of data are transferred between the disk and said RAM sector store, the sector counter generating an interrupt signal to the data processing system upon counting down to zero.

9. A hard disk drive system for receiving data from and furnishing requested data to a data processing system via a system bus, the disk drive system including:

a hard disk drive having at least one magnetic disk rotatable about a central axis and a transducer associated with each disk surface, the transducers being movable radially relative to the axis of rotation to write data to and retrieve data from the associated disk surface, the data being stored on the disk surface in a plurality of sequential, non-interleaved sectors disposed along a plurality of circular tracks concentric with the axis;

a disk drive controller subsystem including a controller board having;

a sector store bus;

a RAM sector store coupled to receive data from and furnish stored data to said sector store bus, the RAM sector store being large enough to store all of the data that may be stored along at least one track;

a RAM sector store controller responsive to command signals from said sector store bus and connected to said RAM sector store for controlling accessing of said RAM sector store; and a disk controller coupled to the sector store bus for controlling date transfer between said disk drive and said RAM sector store; and an interface providing bidirectional communication of commands and data between the system bus and the sector store bus.

* * * * *